(12) United States Patent
Yamamoto et al.

(10) Patent No.: US 11,867,242 B2
(45) Date of Patent: Jan. 9, 2024

(54) POWER TRANSMISSION PATH SWITCHING DEVICE AND TWO-STAGE TRANSMISSION

(71) Applicant: NSK Ltd., Tokyo (JP)

(72) Inventors: Akihiro Yamamoto, Fujisawa (JP); Hirotaka Kishida, Fujisawa (JP)

(73) Assignee: NSK LTD., Tokyo (JP)

( * ) Notice: Subject to any disclaimer, the term of this patent is extended or adjusted under 35 U.S.C. 154(b) by 30 days.

(21) Appl. No.: 17/790,583

(22) PCT Filed: Jun. 29, 2021

(86) PCT No.: PCT/JP2021/024614
§ 371 (c)(1),
(2) Date: Jul. 1, 2022

(87) PCT Pub. No.: WO2022/019063
PCT Pub. Date: Jan. 27, 2022

(65) Prior Publication Data
US 2023/0040408 A1 Feb. 9, 2023

(30) Foreign Application Priority Data

Jul. 22, 2020 (JP) .................................. 2020-125596
Dec. 7, 2020 (JP) .................................. 2020-202935

(51) Int. Cl.
*F16D 47/04* (2006.01)
*F16D 13/52* (2006.01)
(Continued)

(52) U.S. Cl.
CPC ............. *F16D 47/04* (2013.01); *F16D 13/52* (2013.01); *F16D 41/12* (2013.01); *F16H 3/54* (2013.01);
(Continued)

(58) Field of Classification Search
CPC ......... F16D 41/12–16; F16D 13/00–76; F16D 47/04
See application file for complete search history.

(56) References Cited

U.S. PATENT DOCUMENTS

2002/0020596 A1* 2/2002 Monahan .............. F16D 41/064
192/84.7
2006/0278487 A1* 12/2006 Pawley ................. F16D 41/125
192/43.1
(Continued)

FOREIGN PATENT DOCUMENTS

DE  10 2016 105 991 A1  10/2017
DE  102011101792 B4 *  1/2019  ............. F16D 47/04
(Continued)

OTHER PUBLICATIONS

International Search Report for PCT/JP2021/024614 dated Sep. 14, 2021 [PCT/ISA/210].
(Continued)

*Primary Examiner* — Ernesto A Suarez
*Assistant Examiner* — Lillian T Nguyen
(74) *Attorney, Agent, or Firm* — Sughrue Mion, PLLC

(57) ABSTRACT

A power transmission path switching device has a friction engaging device; a rotation transmission state switching device comprising a first member and a second member arranged coaxial with each other and having: a free mode and/or a one-way clutch mode allowing rotation of the first member with respect to the second member, and a lock mode preventing rotation of the first member with respect to the second member; and a control device that, when connecting the friction engaging device and setting the rotation transmission state switching device to the lock mode, has a function of connecting the friction engaging device, and then while maintaining the friction engaging device in a connected state, switches the rotation transmission state switching device to the lock mode.

18 Claims, 32 Drawing Sheets

(51) Int. Cl.
  *F16D 41/12* (2006.01)
  *F16H 3/54* (2006.01)
(52) U.S. Cl.
  CPC ............. *F16H 2200/0034* (2013.01); *F16H 2200/2005* (2013.01); *F16H 2200/2033* (2013.01); *F16H 2200/2035* (2013.01)

(56) References Cited

U.S. PATENT DOCUMENTS

| | | | |
|---|---|---|---|
| 2011/0147155 A1* | 6/2011 | Heitzenrater | F16H 63/3026 192/55.1 |
| 2017/0009820 A1* | 1/2017 | Itagaki | F16D 41/125 |
| 2019/0276006 A1 | 9/2019 | Kasahara | |

FOREIGN PATENT DOCUMENTS

| | | |
|---|---|---|
| JP | 5-116549 A | 5/1993 |
| JP | 2008-082477 A | 4/2008 |
| JP | 2019-156016 A | 9/2019 |

OTHER PUBLICATIONS

JPO Office Action for Application No. 2021-568573 dated Jan. 18, 2022.

\* cited by examiner

FIG. 4A
FIG. 4B
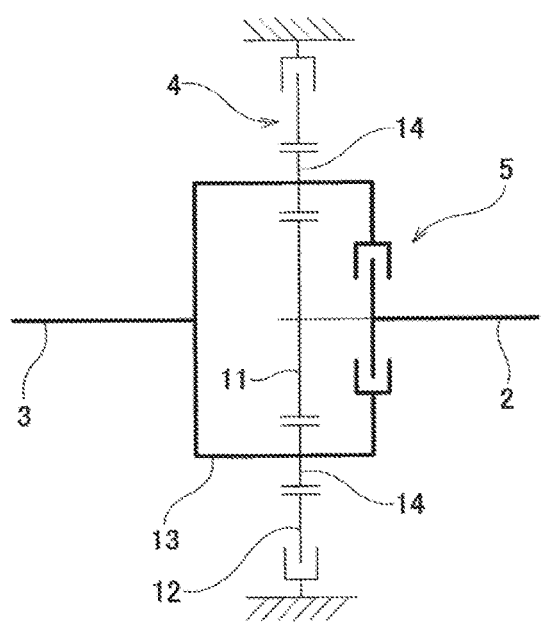
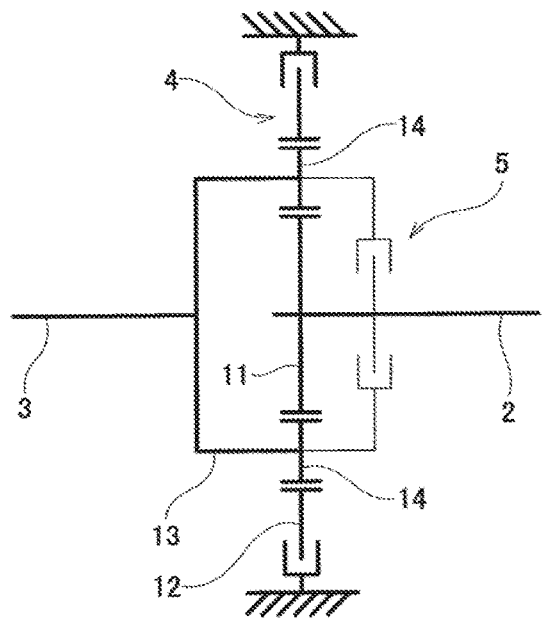

← OTHER SIDE IN THE AXIAL DIRECTION

ONE SIDE IN THE AXIAL DIRECTION →

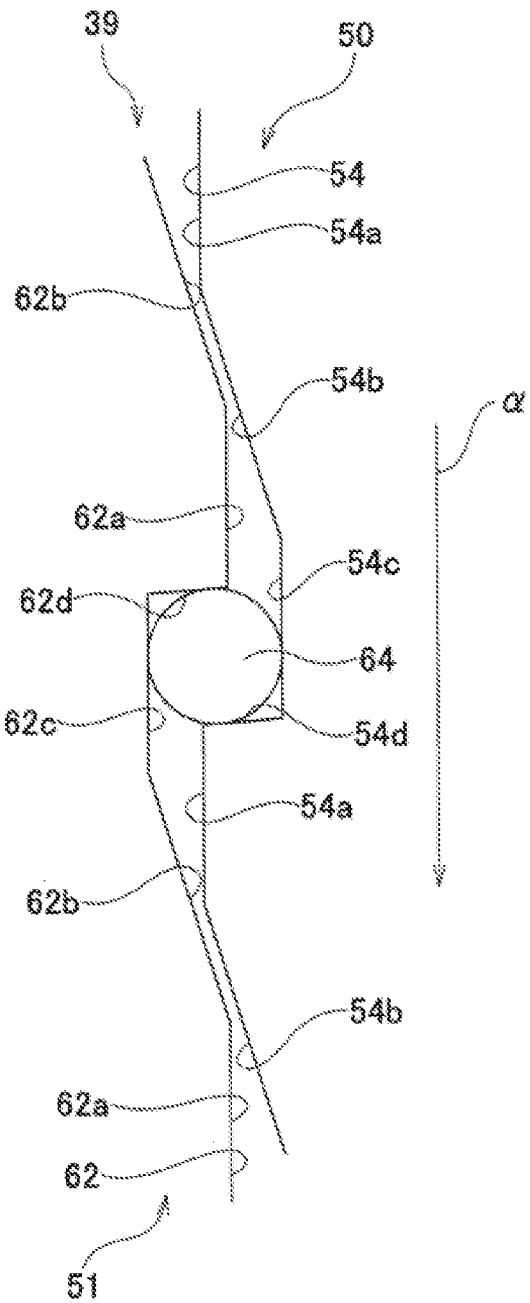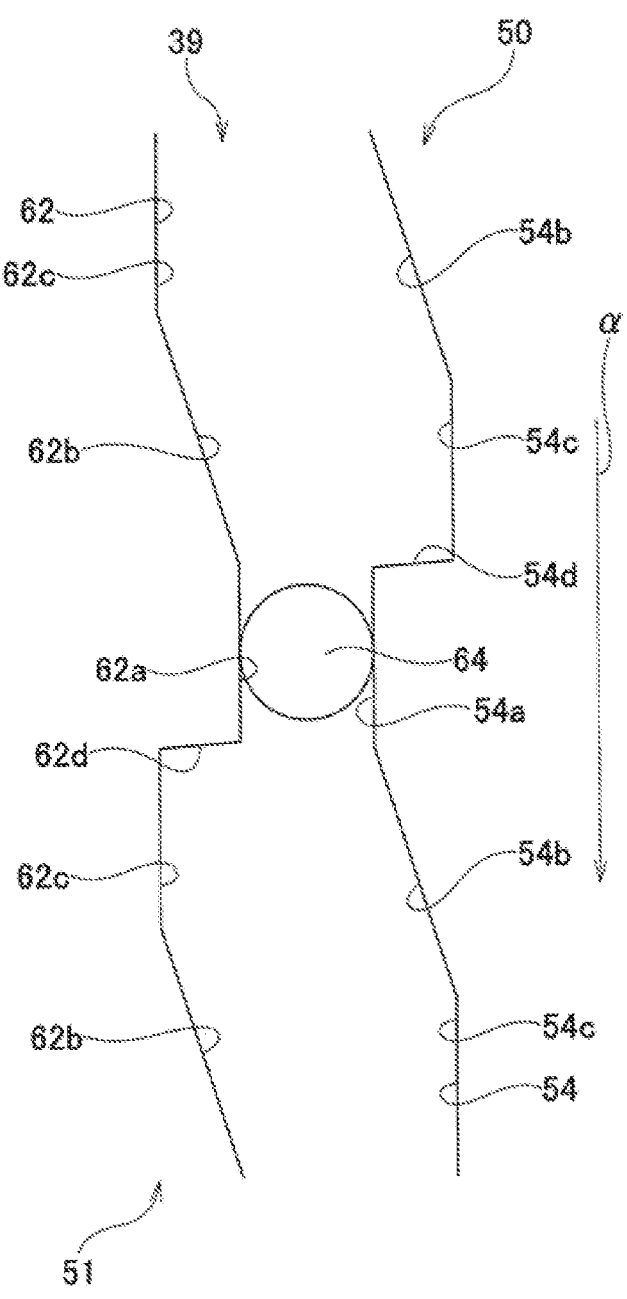

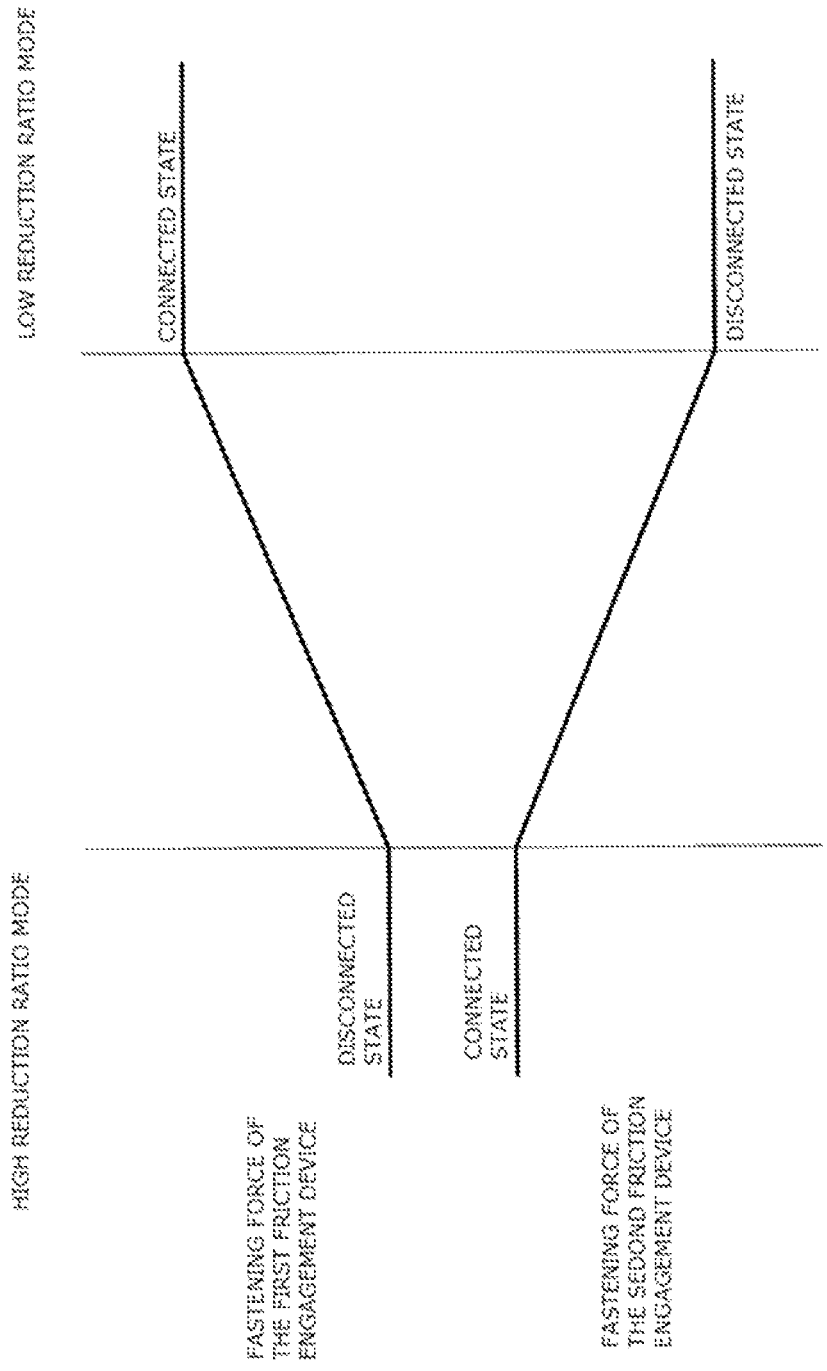

OTHER SIDE IN THE AXIAL DIRECTION ←

→ ONE SIDE IN THE AXIAL DIRECTION

POWER TRANSMISSION PATH SWITCHING DEVICE AND TWO-STAGE TRANSMISSION

CROSS REFERENCE TO RELATED APPLICATIONS

This application is a National Stage of International Application No. PCT/JP2021/024614, filed on Jun. 29, 2021, which claims priority from Japanese Patent Application No. 2020-125596, filed on Jul. 22, 2020, and Japanese Patent Application No. 2020-202935, filed on Dec. 7, 2020.

TECHNICAL FIELD

The present invention relates to a power transmission path switching device for switching a power transmission path between an input member and an output member, and relates to a two-stage transmission that includes the power transmission path switching device.

BACKGROUND ART

Due to a trend in recent years to reduce the consumption of fossil fuels, research of electric automobiles and hybrid automobiles is advancing, and is partially being implemented. Electric motors are the power source of electric automobiles and hybrid automobiles and differ from internal combustion engines (engines) that work by directly burning fossil fuel, and since the torque and rotational speed characteristics (generally, maximum torque generation at startup) of the output shaft of electric motors are desirable for automotive applications, it is not absolutely necessary to provide a transmission such as in typical automobiles having an internal combustion engine as a driving source. However, even in a case of using an electric motor as a driving source, by providing a transmission, it is possible to improve accelerating performance and high-speed performance. More specifically, by providing a transmission, the relation between traveling speed and acceleration of a vehicle can be made smooth to approximate that of an automobile in which a gasoline engine is mounted and in which a transmission is provided in the power transmission system. This aspect will be described with reference to FIG. 32.

For example, by arranging a power transmission device having a relatively large reduction ratio between the output shaft of an electric motor and the input portion of a differential gear connected to drive wheels, the relation between the acceleration (G) and the traveling speed (km/h) of an electric automobile is as indicated by the solid line a in FIG. 32. In other words, the acceleration performance at low speed is excellent; however, traveling at high speed is not possible. On the other hand, by arranging a power transmission device having a relatively small reduction ratio between the output shaft and the input portion, the relation is as indicated by the chain line b in FIG. 32. In other words, traveling at high speed becomes possible; however, acceleration performance at low speed is impaired. On the other hand, by providing a transmission between the output shaft and the input portion and changing the reduction ratio of the transmission according to the vehicle speed, characteristics can be obtained such that the portion of solid line a on the left side of point P is continuous with the portion of the chain line b on the right side of point P. These characteristics, as indicated by the dashed line c in FIG. 32, are mostly identical with those of a gasoline engine car having the same amount of output, and it can be seen that in regard to acceleration performance and high-speed performance, performances equivalent to those of a gasoline engine car in which a transmission is provided in the power transmission system can be obtained.

JPH05-116549A discloses construction of a drive apparatus for an electric automobile that transmits torque of an output shaft of an electric motor to a differential gear by way of a two-stage transmission that is a combination of a pair of planetary gear mechanisms and a pair of brakes (speed is reduced by a two-stage transmission). In this drive apparatus for an electric automobile, it is possible to switch the reduction ratio between the output shaft of the electric motor and the differential gear in two stages: low and high, by switching between a state in which the components of the pair of planetary gear mechanisms are able to rotate and a state in which the components are not able to rotate based on switching the disconnected/connected state of the pair of brakes.

DE102016105991A1 discloses construction of a shift drum apparatus that is capable of switching the reduction ratio of a transmission in at least two stages. In this apparatus, it is possible to switch the reduction ratio of a transmission based on rotating a shift drum by an actuator such as an electric motor or the like.

CITATION LIST

Patent Literature

[PTL1] JPH05-116549A
[PTL2] DE102016105991A1

SUMMARY OF INVENTION

Technical Problem

The apparatus described in JPH05-116549A is configured such that brakes are connected (engaged) by hydraulically operated servo pistons PL, PH pushing together a friction engaging element supported by a component of a planetary gear mechanism and a friction engaging element supported by a housing. However, in an electric automobile and hybrid automobile, in order to be able to reduce costs and improve electrical performance by simplifying the system, it is desired that the need for a hydraulic system be eliminated by performing switching of the reduction ratio of a two-stage transmission with an electric actuator.

The apparatus described in DE102016105991A1 includes a mechanism that is capable of switching to a parking-lock mode that locks rotation of the output shaft of the transmission, and prevents an undesirable load from being applied to the transmission due to the transmission being switched accidentally to the parking-lock mode while the vehicle is traveling. More specifically, by engaging a pin in a groove that is formed in the outer circumferential surface of the shift drum and extending in the circumferential direction, the mechanism prevents the shift drum from being rotated accidentally, which prevents the transmission from being switched accidentally to the parking-lock mode. In a case such as a shift lever being shifted to select a parking range (P range), the pin is moved outward in the radial direction to release the engagement with the groove and make it possible to switch to the parking-lock mode.

However, in the shift drum apparatus described in DE102016105991A1, in order to prevent the transmission from being switched accidentally to the parking-lock mode, it is necessary to form a groove extending in the circumferential direction in the shift drum, provide a disengageable pin in the groove, and provide an actuator for engaging the pin in or disengaging the pin from the groove. Therefore, the size of the shift drum apparatus becomes large and the manufacturing cost of the shift drum increases.

Taking into consideration the circumstances described above, an object of the present invention is to provide construction of a power transmission path switching device capable of switching a two-stage transmission that is able to switch a reduction ratio in two stages: low and high, to a parking-lock mode; is capable of preventing the two-stage transmission from being switched accidentally to the parking-lock mode; and is further capable of reducing a force required for releasing the parking-lock mode as necessary.

Solution to Problem

The power transmission path switching device according to a first aspect of the present invention includes a friction engaging device, a rotation transmission state switching device, and a control device.

The friction engaging device has at least one each of a friction plate and a separation plate that are supported so as to be able to displace in an axial direction relative to each other. The friction engaging device is configured so as to be connected by pressing the friction plate and the separation plate against each other, and to be disconnected by releasing a force pressing the friction plate and the separation plate against each other.

The rotation transmission state switching device has a first member and a second member that are arranged coaxial with each other. Moreover, the rotation transmission state switching device has:

at least one mode of a free mode in which, regardless of a relative rotational direction of the first member and the second member, rotation of the first member with respect to the second member is allowed; and a one-way clutch mode in which rotation of the first member with respect to the second member is allowed in only a specified direction, and rotation of the first member with respect to the second member in a direction opposite to the specified direction is prevented; and a lock mode in which, regardless of a relative rotational direction of the first member and the second member, rotation of the first member with respect to the second member is prevented.

The control device, when connecting the friction engaging device and setting the rotation transmission state switching device to the lock mode, has a function of connecting the friction engaging device, and then switching the rotation transmission state switching device to the lock mode, while maintaining the friction engaging device in a connected state.

In the power transmission path switching device according to an aspect of the present invention, the control device, in a state in which the friction engaging device is connected and the rotation transmission state switching device is set to the lock mode, has a function of disconnecting the friction engaging device, while maintaining the rotation transmission state switching device in the lock mode.

In this case, the control device, in a state in which the friction engaging device is disconnected and the rotation transmission state switching device is set to the lock mode, has a function of preventing the friction engaging device from being switched from a disconnected state to a connected state, while the rotation transmission state switching device is maintained in the lock mode. More specifically, for example, the control device may have a stopper portion for preventing false locking that in this state prevents the friction engaging device from being switched from a disconnected state to a connected state while the rotation transmission state switching device is maintained in the lock mode.

In the power transmission path switching device according to an aspect of the present invention, in a case where the rotation transmission state switching device has a one-way clutch mode, the control device has a function of setting the rotation transmission state switching device to the one-way clutch mode, while switching the friction engaging device from a disconnected state to a connected state and/or while switching the friction engaging device from a connected state to a disconnected state.

In the power transmission path switching device according to an aspect of the present invention, the control device, in a state in which the friction engaging device is connected and the rotation transmission state switching device is set to the lock mode, has a function of preventing the rotation transmission state switching device from switching from the lock mode to the free mode or the one-way clutch mode while the friction engaging device is connected. More specifically, for example, the control device may have a lock release prevention mechanism that in this state prevents the rotation transmission state switching device from being switched from the lock mode to the free mode or the one-way clutch mode with the friction engaging device connected.

In the power transmission path switching device according to an aspect of the present invention, the control device may include a drive cam supported so as to be able to rotate and so as not to be able to displace in the axial direction. In this case, the control device switches the disconnected/connected state of the friction engaging device and the mode of the rotation transmission state switching device due to rotation of the drive cam.

In the power transmission path switching device according to an aspect of the present invention, the control device includes a cam device having the drive cam, and a driven cam supported so as to be able to relatively rotate to the drive cam and displace in the axial direction, the driven cam displacing in the axial direction as the drive cam rotates.

In this case, the cam device has a plurality of rolling bodies held between the drive cam and the driven cam.

In this case the rolling bodies may be configured by rollers having a rotation axis oriented in a radial direction and supported by the driven cam so as to freely rotate about the rotation axis thereof.

Alternatively, the rolling bodies may be configured by balls.

In a case where the control device has a stopper portion for preventing false locking, the stopper portion for preventing false locking may be provided on the drive cam and/or on driven cam.

The control device, by causing the drive cam to rotate, connects the friction engaging device by causing the driven cam to displace in a direction increasing a gap in the axial direction between the driven cam and the drive cam, and disconnects the friction engaging device by causing the driven cam to displace in a direction reducing the gap in the axial direction between the driven cam and the drive cam. In other words, the friction engaging device may be configured by a so-called normally-open type clutch.

In this case, the control device may include an elastic member arranged between the driven cam and the friction engaging device and configured to elastically bias the driven cam and the friction engaging device in directions away from each other.

Alternatively, the control device, by causing the drive cam to rotate, connects the friction engaging device by causing the driven cam to displace in a direction reducing the gap in the axial direction between the driven cam and the drive cam, and disconnects the friction engaging device by causing the driven cam to displace in a direction increasing a gap in the axial direction between the driven cam and the drive cam. In other words, the friction engaging device may be configured by a so-called normally-closed type clutch.

In the power transmission path switching device according to an aspect of the present invention, one member of the first member and the second member may have concave engaging portions at a plurality of locations in a circumferential direction thereof.

In this case, the rotation transmission state switching device may include:
- a mode-selection portion having protruding portions at a plurality of locations in the circumferential direction that protrude in a radial direction or the axial direction;
- a first pawl member having a first base portion pivotally supported by the other member of the first member and the second member, and a first engaging pawl extending from the first base portion toward one side in the circumferential direction;
- a second pawl member having a second base portion pivotally supported by the other member of the first member and the second member, and a second engaging pawl extending from the second base portion toward the other side in the circumferential direction;
- a first pawl biasing member configured to elastically bias the first engaging pawl in a direction engaging with the concave engaging portion; and
- a second pawl biasing member configured to elastically bias the second engaging pawl in a direction engaging with the concave engaging portion.

In the lock mode, by engaging the first engaging pawl and the second engaging pawl with the concave engaging portions without being pressed by the protruding portions, rotation of the first member with respect to the second member is prevented regardless of the direction of relative rotation of the first member and the second member.

In a case where the power transmission path switching device has a free mode, in the free mode, by the protruding portions pressing the first engaging pawl and the second engaging pawl so as not to allow engagement with the concave engaging portions, the first member is allowed to rotate with respect to the second member regardless of the direction of relative rotation of the first member and the second member.

In a case where the power transmission path switching device has the one-way clutch mode, in the one-way clutch mode, the selection plate is rotated or displaced in the axial direction, which causes one engaging pawl of the first engaging pawl and the second engaging pawl to engage with the concave engaging portion without being pressed by the protruding portions, and the other engaging pawl of the first engaging pawl and the second engaging pawl is pressed by the protruding portions and not allowed to engage with the concave engaging portion, allowing the first member to rotate with respect to the second member in only a specified direction, and preventing rotation of the first member with respect to the second member in a direction opposite to the specified direction.

In the power transmission path switching device, the mode-selection portion may rotate or displace in the axial direction together as the drive cam rotates.

In this case, the rotation transmission state switching device may include a selection plate having the mode-selection portion.

Alternatively, the drive cam may include the mode-selection portion.

In the power transmission path switching device according to an aspect of the present invention, the friction engaging device may have a return spring configured to elastically bias the friction plate and the separation plate in directions away from each other.

The two-stage transmission according to an aspect of the present invention, includes:
- an input member;
- an output member coaxially arranged with the input member;
- a planetary gear mechanism arranged between the input member and the output member in a direction of power transmission; and
- a power transmission path switching device configured to switch a power transmission path between the input member and the output member.

Particularly, in the two-stage transmission according to an aspect of the present invention, the power transmission path switching device is configured by a power transmission path switching device according to an aspect of the present invention.

The planetary gear mechanism includes:
- a sun gear connected to the input member so as to integrally rotate with the input member;
- a ring gear arranged around the sun gear and coaxial with the sun gear;
- a carrier coaxially arranged with the sun gear and connected to the output member so as to integrally rotate with the output member; and
- a plurality of pinion gears configured to engage with the sun gear and the ring gear, and supported by the carrier so as to respectively freely rotate about an own center axis.

One of the friction plate and the separation plate is supported so as to be able to relatively displace in the axial direction but not to be able to relatively rotate with respect to the sun gear or the input member;
the other of the friction plate and the separation plate is supported so as to be able to relatively displace in the axial direction but not to be able to relatively rotate with respect to the carrier or the output member;
one of the first member and the second member is supported so as not to be able to rotate with respect to a portion that does not rotate even during operation; and
the other of the first member and the second member is supported so as not to be able to rotate with respect to the ring gear.

In the two-stage transmission according to an aspect of the present invention, in a case of including the cam device as the power transmission path switching device and adopting a configuration where the selection plate rotates or displaces in the axial direction with the rotation of the drive cam, the two-stage transmission may include an electric actuator that rotates and drives the drive cam.

Effects of Invention

With the power transmission path switching device according to an aspect of the present invention, a two-stage transmission capable of switching the reduction ratio between two stages: high and low, can be switched to a parking-lock mode, and the two-stage transmission can be prevented from being accidentally switched to the parking-lock mode. Furthermore, in the power transmission path switching device according to an aspect of the present invention, it is possible to reduce the force required for releasing the parking-lock mode as necessary.

BRIEF DESCRIPTION OF DRAWINGS

FIG. 4A is a schematic diagram of the two-stage transmission in the first example, and illustrates a power transmission path in a low reduction ratio mode. FIG. 4B is a schematic diagram of the two-stage transmission in the first example, and illustrates a power transmission path in a high reduction ratio mode.

FIG. 9A is a schematic diagram as seen from the outside in the radial direction of a cam device in the first example in a state in which the dimension in the axial direction is the shortest.

FIG. 9B is a schematic diagram as seen from the outside in the radial direction of the cam device in the first example in a state in which the dimension in the axial direction is the longest.

FIG. 18 is a graph schematically illustrating the disconnected/connected state of the first friction engaging device and second friction engaging device in the comparative example of a power transmission path switching device.

DESCRIPTION OF THE EMBODIMENTS

First Example

Figure 1:
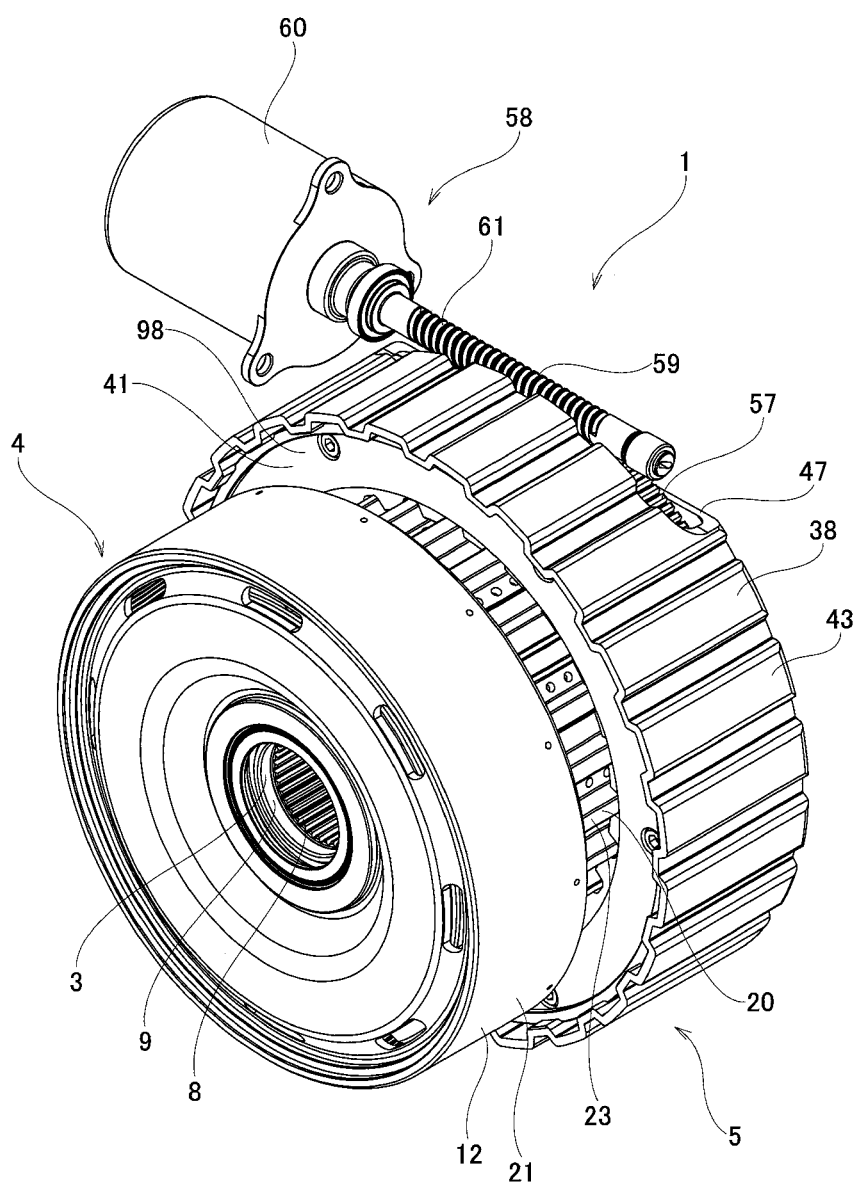
FIG. 1 is a perspective view of a two-stage transmission in a first example of an embodiment of the present invention.
Figure 2:
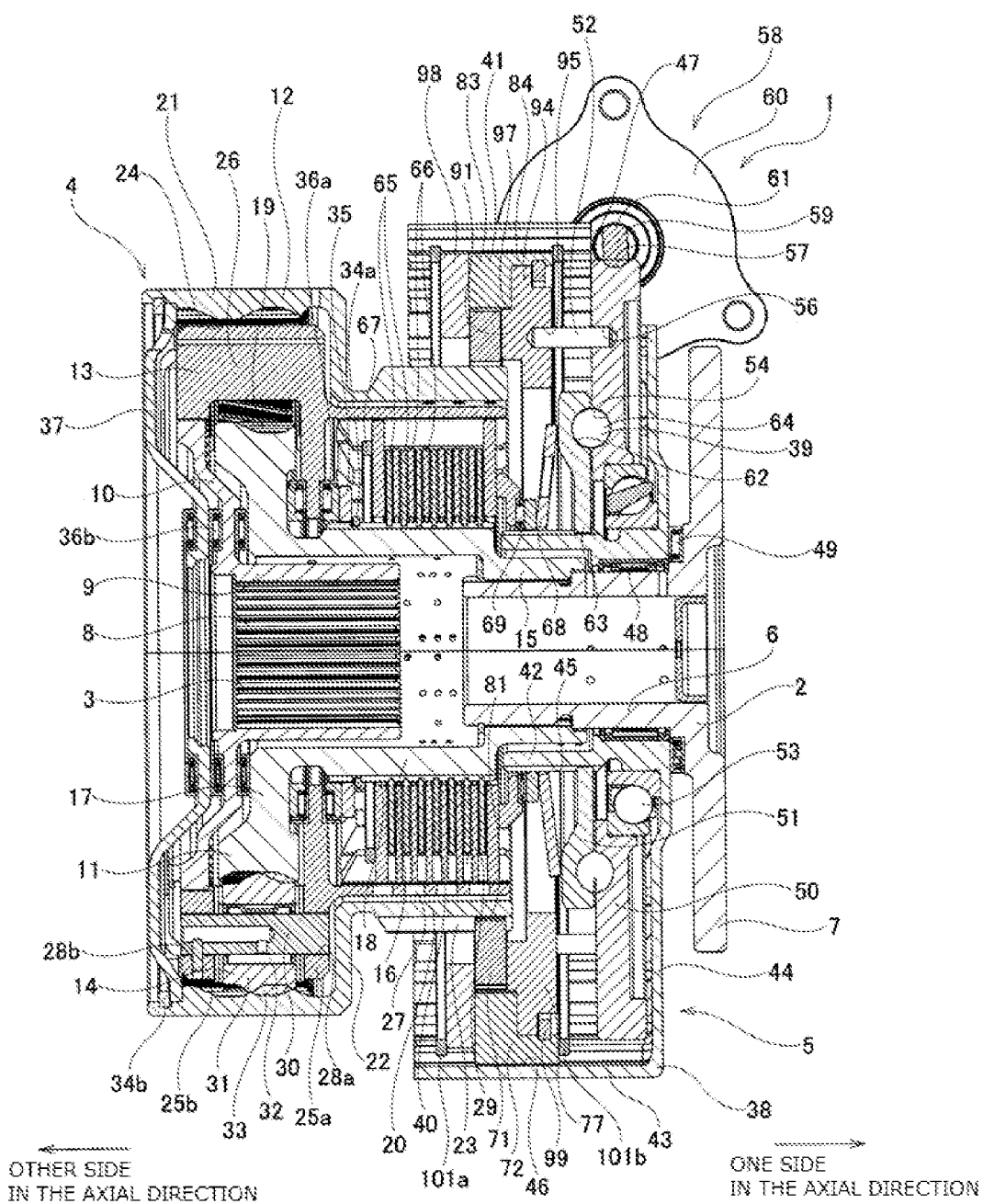
FIG. 2 is a cross-sectional view of a two-stage transmission in the first example.
Figure 3:
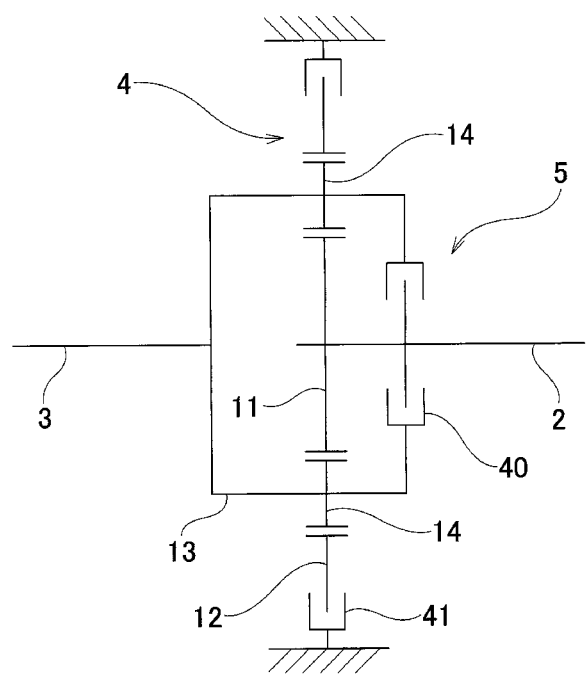
FIG. 3 is a schematic diagram illustrating the two-stage transmission in the first example.

FIG. 1 to FIG. 16 illustrate a first example of an embodiment of the present invention. A two-stage transmission 1 in this example, is arranged, for example, between an output shaft of an electric motor as the power source of an electric automobile or hybrid automobile and a differential gear, and transmits torque from the output shaft of the electric motor to the differential gear after increasing (decelerating) the torque, or transmits the torque to the differential gear as is without increasing (decelerating) the torque. The two-stage transmission 1 of this example includes an input member 2, an output member 3, a planetary gear mechanism 4, and a power transmission path switching device 5. This kind of two-stage transmission 1 is configured to be able to switch between a low reduction ratio mode having a small reduction ratio between the input member 2 and the output member 3 and a high reduction ratio mode having a large reduction ratio compared to that of the low reduction ratio mode, and is also able to switch to a parking-lock mode that locks rotation of the output member 3.

The input member 2 is connected to a drive shaft such as an output shaft of an electric motor or the like (not illustrated), and torque (power) is inputted to the input member 2. In this example, the input member 2 includes an input cylindrical portion 6, and an input flange portion 7 that is bent toward the outer side in the radial direction from an edge portion on one side (right side in FIG. 2 to FIG. 9B) in the axial direction of the input cylindrical portion 6. The drive shaft, for example, is internally fitted to the inner-circumferential surface of the input cylindrical portion 6 so as to be able to transmit torque, or is coupled with the input flange portion 7 with bolts or the like so as to be able to transmit torque.

The output member 3 is coaxially arranged with the input member 2 and connected to a driven shaft (not illustrated) of a differential gear, propeller shaft or the like, and outputs torque to the driven shaft. In this example, the output member 3 includes an output cylindrical portion 9 having a female spline portion 8 on the inner-circumferential surface, and an output flange portion 10 that is bent toward the outer side in the radial direction from an edge portion on the other side (right side in FIG. 2 to FIG. 9B) in the axial direction of the output cylindrical portion 9. A male spline portion is provided on the outer-circumferential surface of the tip end portion of the driven shaft, and by engaging the male spline portion with the female spline portion 8 of the output cylindrical portion 9 with a spline engagement, the driven shaft is connected to the output member 3 so as to be able to transmit torque.

The planetary gear mechanism 4, as illustrated in FIG. 2 to FIG. 4B, is arranged in the power transmission direction between the input member 2 and the output member 3, and includes a sun gear 11, a ring gear 12, a carrier 13, and a plurality of pinion gears 14.

The sun gear 11 is connected to the input member 2 and integrally rotates with the input member 2. In this example, the sun gear 11 includes a small-diameter cylindrical portion 15 on the one side in the axial direction, a large-diameter cylindrical portion 16 on the other side in the axial direction, and a flange portion 17 that is bent toward the outer side in the radial direction from an edge portion on the other side in the axial direction of the large-diameter cylindrical portion 16. The sun gear 11 includes a sun-side male spline portion 18 on an outer-circumferential surface of the large-diameter cylindrical portion 16, and a gear portion 19 composed of a spur gear or a helical gear on an outer-circumferential surface of the flange portion 17. The small-diameter cylindrical portion 15 of the sun gear 11 is externally fitted with the input cylindrical portion 6 of the input member 2 using construction such as a spline engagement or the like so as to be able to transmit torque.

The ring gear 12 is supported around the sun gear 11 coaxially with the sun gear 11 so as to be able to rotate relative to the sun gear 11. In this example, the ring gear 12 includes a small-diameter cylindrical portion 20 on the one side in the axial direction, a large-diameter cylindrical portion 21 on the other side in the axial direction, and an annular portion 22 that connects an end portion on the other side in the axial direction of the small-diameter cylindrical portion 20 with an end portion on the one side in the axial direction of the large-diameter cylindrical portion 21. The ring gear 12 includes a ring-side male spline portion 23 on an outer-circumferential surface of the small-diameter cylindrical portion 20, and includes a gear portion 24 composed of a spur gear or a helical gear on an inner-circumferential surface of the large-diameter cylindrical portion 21.

The carrier 13 is supported coaxially with the sun gear 11 and the ring gear 12, and is connected to the output member 3 so as to be able to integrally rotate with the output member 3. In this example, the carrier 13 includes a pair of rim portions 25a, 25b that each have an annular shape and that are arranged spaced apart in the axial direction, column portions 26 that span between the pair of rim portions 25a, 25b at a plurality of locations aligned with each other in the circumferential direction, and a cylindrical portion 27 around the entire circumference that protrudes from an intermediate portion in the radial direction of a surface on the one side in the axial direction of the rim portion 25a on the one side in the axial direction toward the one side in the axial direction.

The carrier 13 includes circular holes 28a at a plurality of locations in the circumferential direction of a portion of the rim portion 25a on the one side in the axial direction that is farther on the outer side in the radial direction than the cylindrical portion 27 and that penetrate through the rim portion 25a in the axial direction. The carrier also includes a carrier-side female spline portion 29 around the inner-circumferential surface of the cylindrical portion 27. The carrier 13 also includes circular holes 28b at portions of the rim portion 25b of the pair of rim portions 25a, 25b that is on the other side in the axial direction that are aligned with the circular holes 28a in the rim portion 25a on the one side in the axial direction. The carrier 13 is configured such that, by connecting the rim portion 25b on the other side in the axial direction to the output flange portion 10 of the output member 3 with construction such as a spline engagement or the like so as to be able to transmit torque, it is possible to integrally rotate with the output member 3.

Each of the pinion gears 14 engages with the sun gear 11 and ring gear 12, and is rotatably supported by the carrier 13 so as to be able to freely rotate around its own center axis. In this example, each of the pinion gears 14 includes a support shaft 30 having a circular columnar shape, and a main portion 31 having a cylindrical shape that is rotatably supported around an intermediate portion in the axial direction of the support shaft 30 by a radial needle bearing 32. The main portion 31 includes a gear portion 33 that is composed of a spur gear or a helical gear on the outer-circumferential surface, and the gear portion 33 engages with the gear portion 19 of the sun gear 11 and the gear portion 24 of the ring gear 12. End portions on both sides in the axial direction of the support shaft 30 are internally fitted and fastened to the circular holes 28a, 28b of the carrier 13, respectively.

In this example, a retaining ring 34a locks to the outer-circumferential surface of an intermediate portion in the axial direction of the large-diameter cylindrical portion 16 of the sun gear 11. A spacer 35 is prevented from displacing toward the one side in the axial direction due to the retaining ring 34a. A surface on the other side in the axial direction of the spacer 35 comes in contact with a surface on the one side in the axial direction of a portion on the inner side in the radial direction of the rim portion 25a on the one side in the axial direction by way of a thrust bearing 36a. Furthermore, a retaining ring 34b locks to the inner-circumferential surface of the end portion on the other side in the axial direction of the large-diameter cylindrical portion 21 of the ring gear 12. A pressure plate 37 is prevented from displacing toward the other side in the axial direction due to the retaining ring 34b. A surface on the one side in the axial direction of a portion on the inner side in the radial direction of the pressure plate 37 comes in contact with a surface on the other side in the axial direction of a portion on the inner side in the radial direction of the rim portion 25b on the other side in the axial direction (output flange portion 10 of the output member 3) by way of a thrust bearing 36b. As a result, in the assembled state of the planetary gear mechanism 4, the sun gear 11, the ring gear 12, the carrier 13, and the pinion gears 14 are prevented from separating. In other words, the planetary gear mechanism 4 is able to be integrally handled as a sub assembly.

The power transmission path switching device 5 switches the power transmission path between the input member 2 and the output member 3. The power transmission path switching device 5 of this example includes a housing 38 that does not rotate even during operation, a cam device 39 constituting a control device, a friction engaging device 40, and a rotation transmission state switching device 41.

The housing 38 includes an inner-diameter-side cylindrical portion 42, an outer-diameter-side cylindrical portion 43, and a side plate portion 44 having an annular shape that connects an end portion on the one side in the axial direction of the inner-diameter-side cylindrical portion 42 and an end portion on the one side in the axial direction of the outer-diameter-side cylindrical portion 43. The housing 38 includes a stationary-side male spline portion 45 on an outer-circumferential surface of the inner-diameter-side cylindrical portion 42, and a stationary-side female spline portion 46 on an inner-circumferential surface of the outer-diameter-side cylindrical portion 43. Moreover, the housing 38 includes a through hole 47 that penetrates in the radial direction through a portion on the one side in the axial direction of the outer-diameter-side cylindrical portion 43, and extends in the circumferential direction.

In this example, by arranging a radial needle bearing 48 between the inner-circumferential surface of the inner-diameter-side cylindrical portion 42 of the housing 38 and the outer-circumferential surface of the input cylindrical portion 6 of the input member 2, and arranging a thrust needle bearing 49 between a surface on the one side in the axial direction of the side plate portion 44 and a surface on the other side in the axial direction of the input flange portion 7, the input member 2 is rotatably supported with respect to the housing 38.

Figure 5:
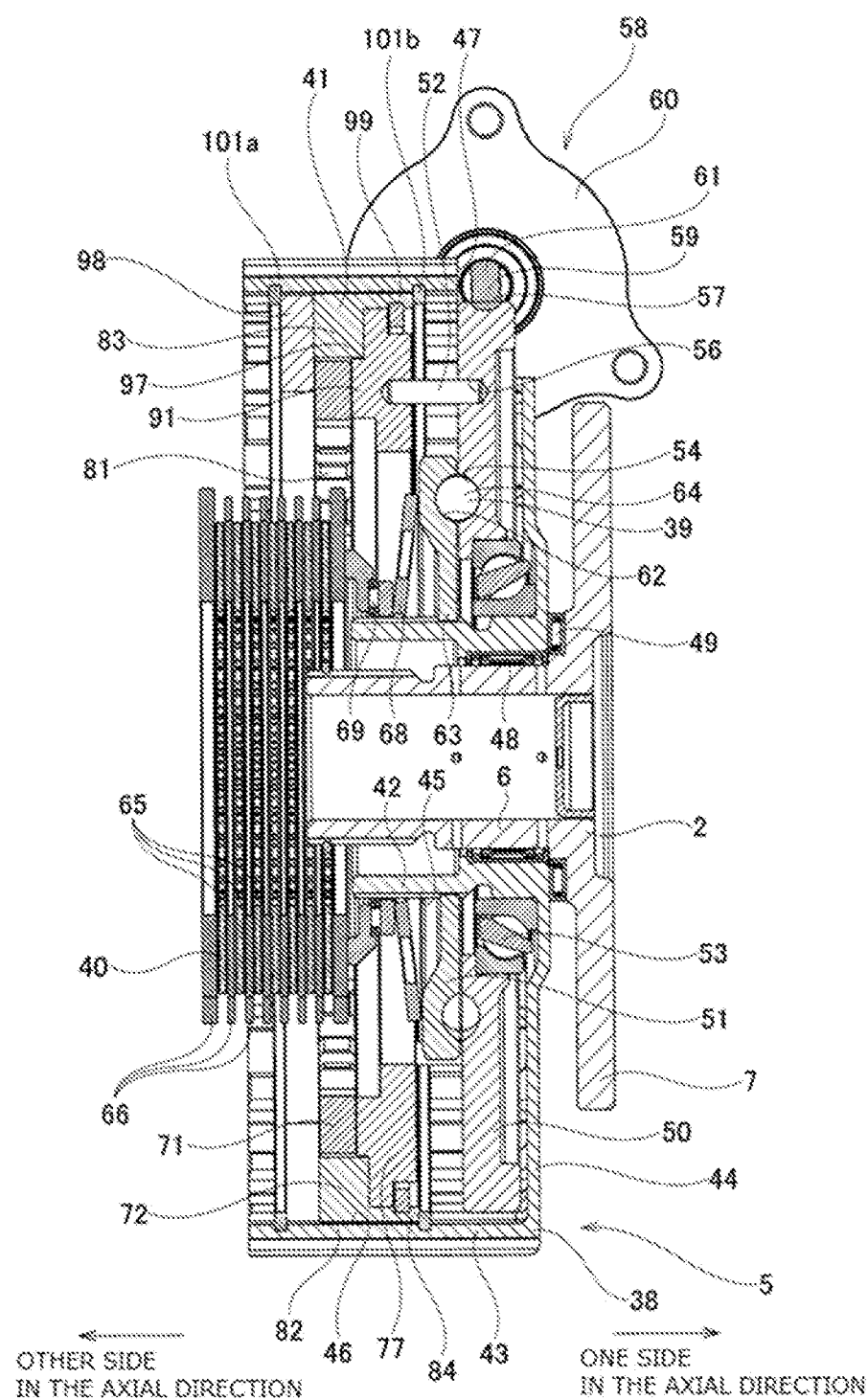
FIG. 5 is a cross-sectional view of a power transmission path switching device of the two-stage transmission in the first example.
Figure 7:
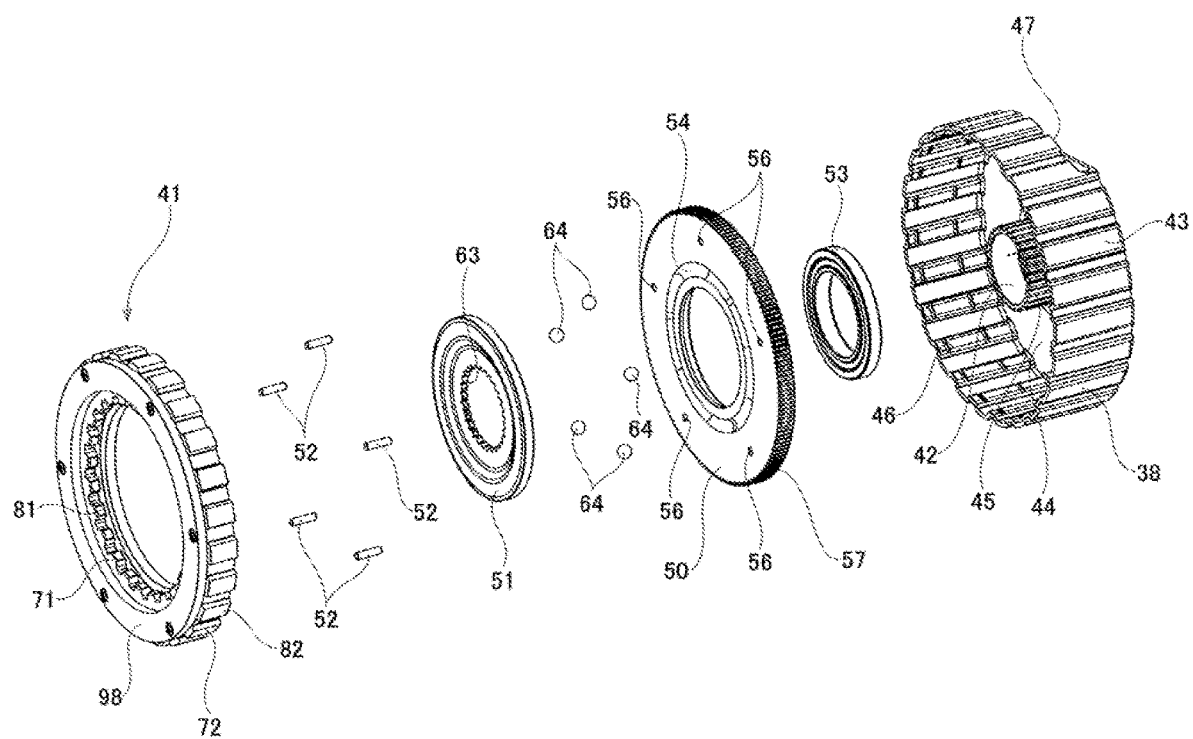
FIG. 7 is an exploded perspective view of a cam device and rotation transmission state switching device of the power transmission path switching device in the first example.

The cam device 39, as illustrated in FIG. 5 and FIG. 7, includes a drive cam 50 that is supported so as to be able to rotate and so as not to be able to displace in the axial direction, a driven cam 51 that is supported so as to be able to rotate relative to the drive cam 50 and so as to be able to displace in the axial direction, and that displaces in the axial direction as the drive cam 50 rotates, and a plurality of engaging pins 52 (five in the illustrated example).

The drive cam 50 has an annular shape, and is supported by the outer-circumferential surface of an end portion on the one side in the axial direction of the inner-diameter-side cylindrical portion 42 of the housing 38 by way of an angular ball bearing 53 capable of supporting a radial load and a thrust load so as to be able to freely rotate but not to be able to displace in the axial direction.

The drive cam 50 has a drive cam surface 54 on a portion on the inner side in the radial direction of the surface on the other side in the axial direction so that the same number of concave portions and convex portions are alternately arranged in the circumferential direction. The drive cam surface 54, as illustrated in FIG. 9A and FIG. 9B, is such that a flat surface portion 54a located farthest on the other side in the axial direction (located on the tip end portion of the convex portion), a gently sloping surface portion 54b, a bottom portion 54c located farthest on the one side in the axial direction, and a steep sloping surface portion 54d constituting a stopper portion for preventing false locking are repeatedly arranged in that order in the circumferential direction.

The drive cam 50 has cam-side engaging holes 56 that are open on the surface on the other side in the axial direction and located at a plurality of locations (five location in the illustrated example) uniformly spaced in the circumferential direction of a portion on the outer side in the radial direction, and has a wheel gear portion 57 on the outer circumferential surface composed of a helical gear having a spiral shaped tooth lead.

Figure 6:
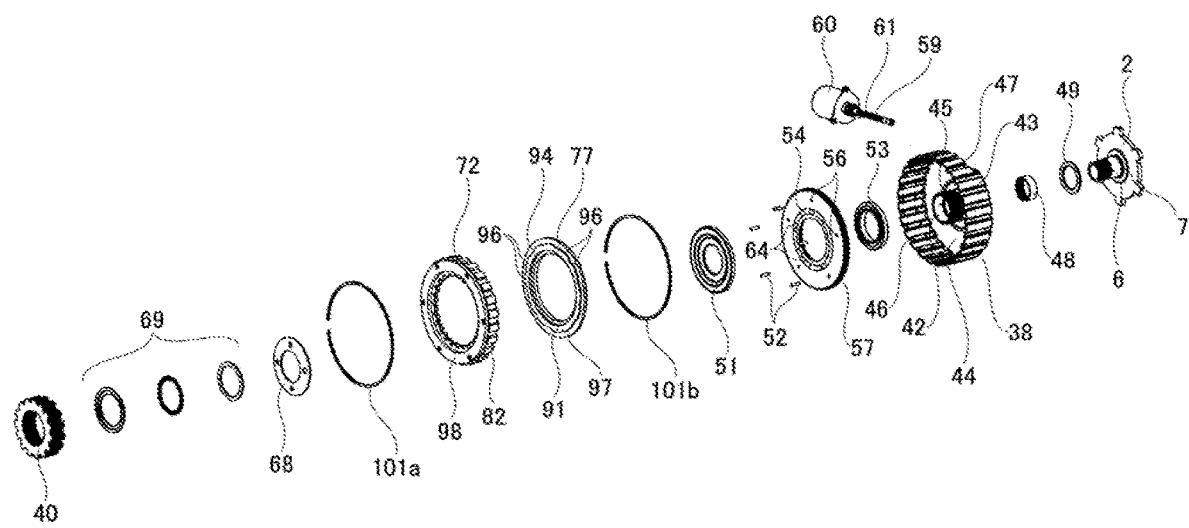
FIG. 6 is an exploded perspective view of the power transmission path switching device in the first example.

The drive cam 50 is rotated and driven by an electric actuator 58. The electric actuator 58, as illustrated in FIG. 1 and FIG. 6, includes a worm 59 and a gear-shift motor 60. The worm 59 has a worm gear portion 61 around an outer-circumferential surface of an intermediate portion in the axial direction, and engages with a portion of the wheel gear portion 57 of the drive cam that is exposed from the through hole 47 in the housing 38. The gear-shift motor 60 rotates and drives the worm 59. In other words, the drive cam 50 is rotated and driven by the gear-shift motor 60 by way of a worm reducer that engages the wheel gear portion 57 and the worm gear portion 61.

The driven cam 51, as illustrated in FIG. 5 and FIG. 7, is arranged facing in the axial direction a portion on the inner side in the radial direction of the drive cam 50. The driven cam 51 has a driven cam surface 62 with concave portions and convex portions alternately arranged in the circumferential direction on the surface on the one side in the axial direction facing the drive cam surface 54 of the drive cam 50, with the number of concave portions and convex portions being the same as the number of the concave portions and convex portions of the drive cam surface 54 (five each in the example). The driven cam surface 62, as illustrated in FIG. 9A and FIG. 9B, is such that a flat surface portion 62a located farthest on the one side in the axial direction (located on the tip end portion of the convex portion), a gently sloping surface portion 62b, a bottom portion 62c located farthest on the other side in the axial direction, and a steep sloping surface portion 62d constituting the stopper portion for preventing false locking are repeatedly arranged in that order in the circumferential direction. However, the driven cam surface 62 facing the drive cam surface 54 can also be configured by a flat surface that is orthogonal to the center axis.

The driven cam 51 has a driven-side female spline portion 63 on the inner-circumferential surface, and by engaging the driven-side female spline portion 63 with the stationary-side male spline portion 45 of the housing 38, the driven cam 51 is supported so as to only be able to displace in the axial direction with respect to the housing 38.

The cam device 39 includes a plurality (five in the illustrated example) of rolling bodies 64 that are arranged between the drive cam surface 54 and the driven cam surface 62 so as to be able to freely roll. In other words, in this example, by increasing or reducing the amount that the rolling bodies 64 ride up from bottom portions 54c of the drive cam surface 54, and the amount that the rolling bodies 64 ride up from bottom portions 62c of the driven cam surface 62 as the drive cam 50 rotates, the driven cam surface 51 displaces in the axial direction. Note that, in this example, balls are used as the rolling bodies 64; however, it is also possible to use rollers or conical rollers as the rolling bodies.

The cam device 39 of this example is configured so that the rolling bodies 64 are able to roll down over the steep sloping surface portions 54d of the driven cam surface 54 and steep sloping surface portions 62d of the driven cam surface 62, but are not able to ride up. In other words, the angle of inclination of the steep sloping surface portions 54d of the drive cam surface 54 and the steep sloping surface portions 62d of the driven cam surface 62 (the angle of inclination with respect to a virtual plane that is orthogonal to the center axis of the cam device 39) is a size such that the rolling bodies 64 are not able to ride up as the drive cam 50 is rotated and driven by the electric actuator 58.

In each engaging pin 52, an end portion on the one side in the axial direction is internally fitted (engaged) without looseness in a cam-side engaging hole 56 in the drive cam 50, and an end portion on the other side in the axial direction protrudes toward the other side in the axial direction from the surface on the other side in the axial direction of the drive cam 50.

Figure 8:
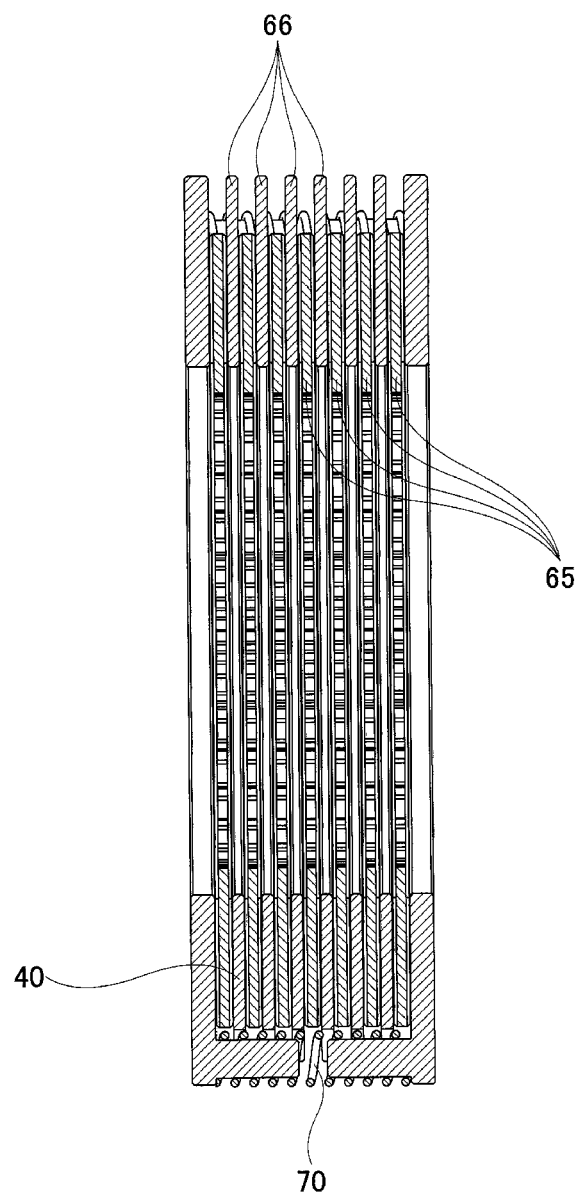
FIG. 8 is a cross-sectional view of a friction engaging device of the power transmission path switching device in the first example.

The friction engaging device 40, as illustrated in FIG. 5 and FIG. 8, has a plurality of friction plates 65 and separation plates 66. Each friction plate 65 and each separation plate 66 has a substantially annular shape. The friction plates 65 and the separation plates 66 are alternately arranged.

Figure 10A:
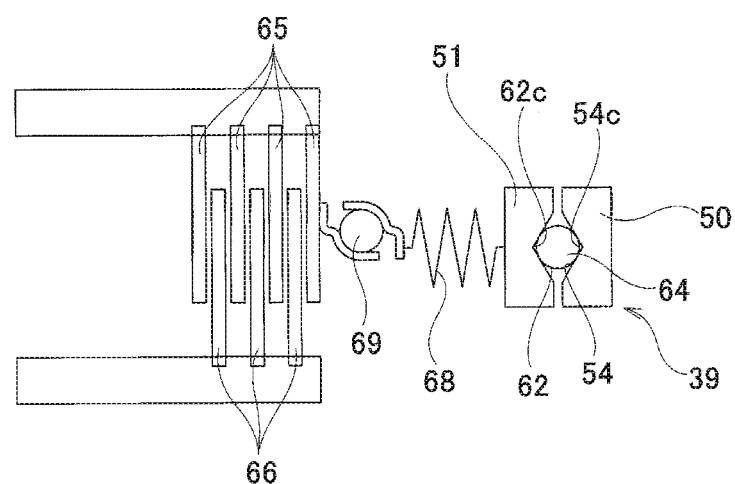
FIG. 10A is a schematic diagram of the friction engaging device and the cam device in the first example, and illustrates a state in which the friction engaging device is disconnected.
Figure 10B:
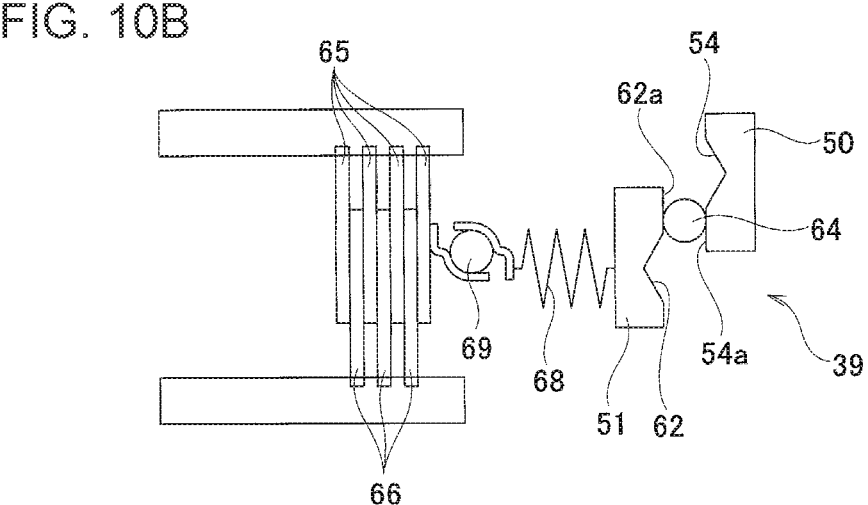
FIG. 10B is a schematic diagram of the friction engaging device and the cam device in the first example, and illustrates a state in which the friction engaging device is connected.
Figure 11:
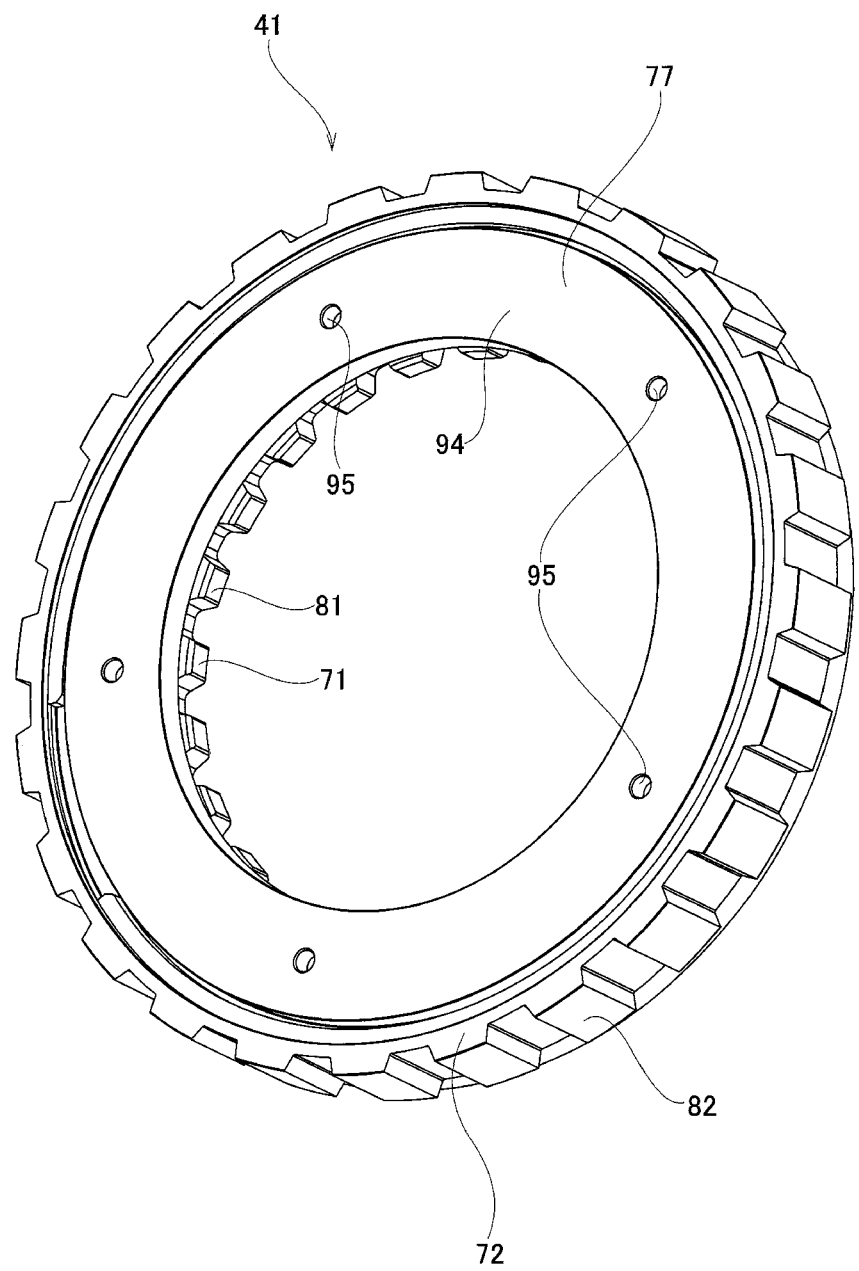
FIG. 11 is a perspective view as seen from one side in the axial direction of the rotation transmission state switching device in the first example.

The friction engaging device 40, as illustrated in FIG. 9B and FIG. 10B, is connected by the friction plates 65 and the separation plates 66 being pressed together due to the rolling bodies 64 of the cam device 39 being made ride up onto the flat surface portions 54a of the drive cam surface 54 and the flat surface portions 62a of the driven cam surface 62, which causes the driven cam 51 to displace in a direction that widens the gap in the axial direction between the driven cam 51 and the drive cam 50. On the other hand, the friction engaging device 40, as illustrated in FIG. 9A and FIG. 10A, is disconnected by the force pressing the friction plates 65 and the separation plates 66 together being released due to the rolling bodies 64 being made to move to the bottom portions 54c of the drive cam surface 54 and to the bottom portions 62c of the driven cam surface 62, which causes the driven cam 51 to displace in a direction that reduces the gap in the axial direction between the driven cam 51 and the drive cam 50.

In this example, the friction engaging device 40 is arranged between the sun gear 11 and the carrier 13. In other words, by connecting the friction engaging device 40, the sun gear 11 and the carrier 13, both of which are rotating bodies, integrally rotate, and by disconnecting the friction engaging device 40, the sun gear 11 and carrier 13 rotate relative to each other. That is, the friction engaging device 40 functions as a clutch that switches the power transmission mode (disconnected/connected state) between the sun gear 11 and the carrier 13.

Each friction plate 65 has a female spline portion on the inner-circumferential surface, and by engaging the female spline portion with the sun-side male spline portion 18 of the sun gear 11 with a spline engagement, the friction plate 65 is supported so as to only be able to displace in the axial direction with respect to the sun gear 11.

Each separation plate 66 has a male spline portion on the outer-circumferential surface, and by engaging the male spline portion with the carrier-side female spline portion 29 of the carrier 13 with a spline engagement, the separation plate 66 is supported so as to only be able to displace in the axial direction with respect to the carrier 13.

Of the separation plates 66, the separation plate 66 that is located farthest on the other side in the axial direction is prevented from displacing toward the other side in the axial direction by a retaining ring 67 that is locked to an end portion on the other side in the axial direction of the cylindrical portion 27 of the carrier 13.

An elastic member 68 and a thrust rolling bearing 69 are held in that order from the one side in the axial direction between the separation plate 66 located farthest on the one side in the axial direction of the separation plates 66 and the driven cam 51. The elastic member 68 is elastically biased in a direction that acts to separate the friction engaging device 40 and the driven cam 51 in the axial direction. In this example, the elastic member 68 is configured by a disc spring. However, the elastic member 68 may also be configured by a torsion coil spring or the like.

The friction engaging device 40, as illustrated in FIG. 8, includes a return spring 70 that is elastically biased in a direction that acts to separate the friction plates 65 and the separation plates 66, and to release a force pressing the friction plates 65 and separation plates 66 together. In this example, the return spring 70 spans between the separation plate 66 located farthest on the one side in the axial direction and the separation plate 66 located farthest on the other side in the axial direction, and is elastically biased in a direction that acts to separate the separation plate 66 located farthest on the one side in the axial direction and the separation plate 66 located farthest on the other side in the axial direction.

In other words, the friction engaging device 40, in a stand-alone state, is disconnected in a state in which electric power to the electric actuator 58 is stopped, and is connected by increasing the gap in the axial direction between the drive cam 50 and the driven cam 51 due to electric power supplied to the electric actuator 58, or in other words, is configured by a so-called normally-open type clutch. However, in a state in which the friction engaging device 40 is assembled in the power transmission path switching device 5, as will be described later, by providing a flat surface portion 54a on the drive cam surface 54 and/or by providing a self-lock function to a worm reducer composed of the wheel gear portion 57 of the drive cam 50 and the worm gear portion 61 of the worm 59, the friction engaging device 40 can be maintained in the connected state even after electric power to the electric actuator 58 is stopped.

The rotation transmission state switching device 41, as illustrated in FIG. 11 to FIG. 14, includes a first member 71 and a second member 72 that are arranged coaxially with each other, a first pawl member 73 and a second pawl member 74, a first pawl biasing member 75 and a second pawl biasing member 76, and a selection plate 77.

The first member 71 has concave engaging portions 78 at a plurality of locations in the circumferential direction on the outer-circumferential surface. In other words, the first member 71 has a gear-shaped concave-convex portion 80 in which concave engaging portions 78 and convex portions 79 are alternately arranged in the circumferential direction on the outer-circumferential surface. Moreover, the first member 71 has a female spline portion 81 on the inner-circumferential surface. The first member 71, by engaging the female spline portion 81 with the ring-side male spline portion 23 of the ring gear 12 with a spline engagement, is supported so as not to be able to rotate relative to the ring gear 12. In other words, the first member 71 integrally rotates with the ring gear 12.

The second member 72 is supported around the first member 71 and is coaxial with the first member 71, and is supported so as to be able to rotate relative to the first member 71. In other words, the inner-circumferential surface of the second member 72 faces the outer-circumferential surface of the first member 71 (tip-end surfaces of the convex portions 79) through a gap. The second member 72 has a male spline portion 82 on the outer-circumferential surface. The second member 72, by engaging the male spline portion 82 with the stationary-side female spline portion 46 of the housing 38 with a spline engagement, is supported so as not to be able to rotate relative to the housing 38.

The second member 72 includes a base portion 83 having a rectangular cross-sectional shape, and a cylindrical portion 84 that protrudes around the entire circumference from an end portion on the outer side in the radial direction of a surface on the one side in the axial direction of the base portion 83 toward the one side in the axial direction.

The base portion 83 has a plurality (six each in the illustrated example) of first concave holding portions 85 and second concave holding portions 86 that are alternately arranged in the circumferential direction.

Each first concave holding portion 85 opens to the inner-circumferential surface of the base portion 83 and to a surface on the one side in the axial direction. Each first concave holding portion 85 includes a spring holding portion 87a and a seat portion 88a. The spring holding portion 87a has a substantially rectangular opening shape as seen from the one side in the axial direction with the major axis being arranged in a direction so as to extend in a direction toward the outer side in the radial direction while going toward one side in the circumferential direction (front side in the clockwise direction in FIG. 13). The seat portion 88a has a substantially circular opening shape as seen from the one side in the axial direction and is arranged adjacent to the other side in the circumferential direction of the spring holding portion 87a (rear side in the clockwise direction in FIG. 13).

Each second concave holding portion 86 opens to the inner-circumferential surface of the base portion 83 and to a surface on the one side in the axial direction. Each second concave holding portion 86, when viewed from the one side in the axial direction, has a symmetrical shape with the first concave holding portion 85 about a virtual plane that includes the center axis of the second member 72. In other words, each second concave holding portion 86 includes a spring holding portion 87b and a seat portion 88b. The spring holding portion 87b has a substantially rectangular opening shape as seen from the one side in the axial direction with the major axis being arranged in a direction so as to extend in a direction toward the outer side in the radial direction while going toward the other side in the circumferential direction. The seat portion 88b has a substantially circular opening shape as seen from the one side in the axial direction, and is arranged adjacent to the one side in the circumferential direction of the spring holding portion 87a.

Each first pawl member 73 includes a first base portion 89 and a first engaging pawl 90.

The first base portion 89 is configured into a substantially circular columnar shape, and is supported (pivot support) by the seat portion 88a of the first concave holding portion 85 so as to be able to pivot about a pivot axis that is parallel to the center axis of the second member 72.

The first engaging pawl 90 is configured into a substantially flat plate shape and extends out toward the one side in the circumferential direction from the first base portion 89. The first engaging pawl 90 is such that a portion on the one side in the axial direction faces an outer-circumferential surface of a ring-shaped convex portion 91 of the selection plate 77, and a portion on the other side in the axial direction faces the concave-convex portion 80 of the first member 71 (allows engagement/disengagement with respect to the concave engaging portion 78).

Each second pawl member 74 includes a second base portion 92 and a second engaging pawl 93.

The second base portion 92 is configured into a substantially circular columnar shape, and is supported by the seat portion 88b of the second concave holding portion 86 so as to be able to pivot about a pivot axis that is parallel to the center axis of the second member 72.

The second engaging pawl 93 is configured into a substantially flat plate shape and extends out toward the other side in the circumferential direction from the second base portion 92. The second engaging pawl 93 is such that a portion on the one side in the axial direction faces an outer-circumferential surface of a ring-shaped convex portion 91 of the selection plate 77, and a portion on the other side in the axial direction faces the concave-convex portion 80 of the first member 71.

The first pawl biasing member 75 elastically biases the first engaging pawl 90 of the first pawl member 73 in a direction that causes the first engaging pawl 90 to engage with the concave engaging portion 78 of the first member 71. In other words, the first pawl biasing member 75 applies a bias force to the first pawl member 73 in a direction that pivots the first pawl member 73 in the clockwise direction in FIG. 14 about the center axis (pivot axis) of the first base portion 89 of the first pawl member 73. More specifically, the first pawl biasing member 75 is configured by an elastic member such as a torsion coil spring or the like, and is held in an elastically compressed state between a bottom surface (surface facing the inner side in the radial direction) of the spring holding portion 87a of the first concave holding portion 85 and an outer-side surface in the radial direction of the first engaging pawl 90.

The second pawl biasing member 76 elastically biases the second engaging pawl 93 of the second pawl member 74 in a direction that causes the second engaging pawl 93 to engage with the concave engaging portion 78 of the first member 71. In other words, the second pawl biasing member 76 applies a bias force to the second pawl member 74 in a direction that pivots the second pawl member 74 in the counterclockwise direction in FIG. 14 about the center axis of the second base portion 92 of the second pawl member 74. More specifically, the second biasing member with pawl 76 is configured by an elastic member such as a torsion coil spring or the like, and is held in an elastically compressed state between a bottom surface (surface facing the inner side in the radial direction) of the spring holding portion 87b of the second concave holding portion 86 and an outer-side surface in the radial direction of the second engaging pawl 93.

Figure 12:
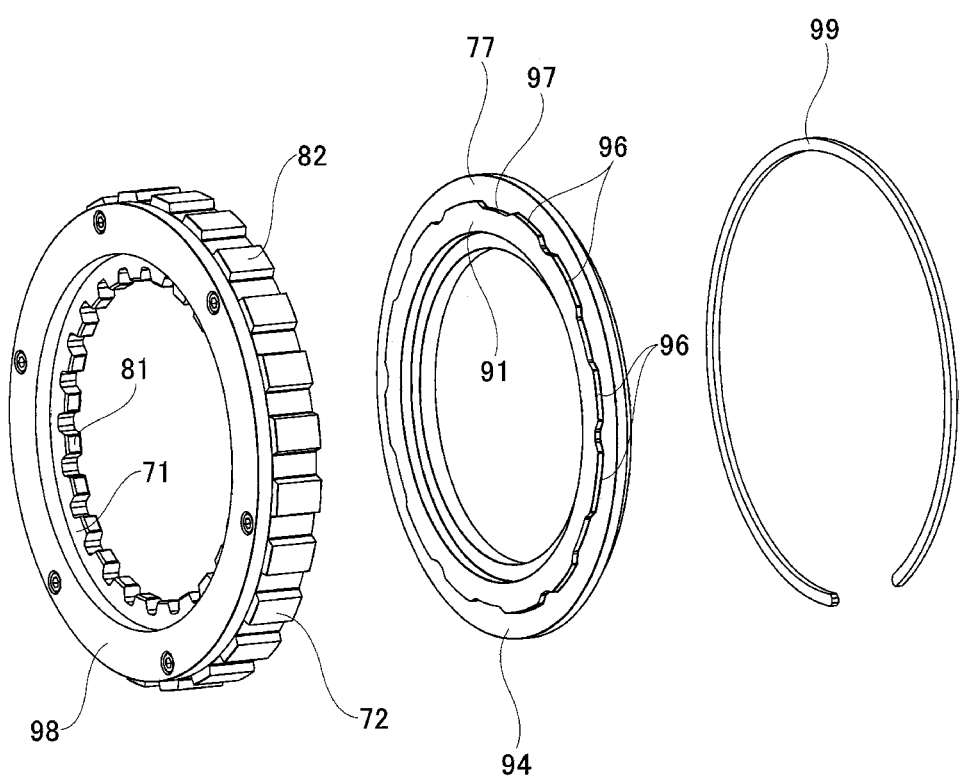
FIG. 12 is an exploded perspective view of the rotation transmission state switching device in the first example.
Figure 13:
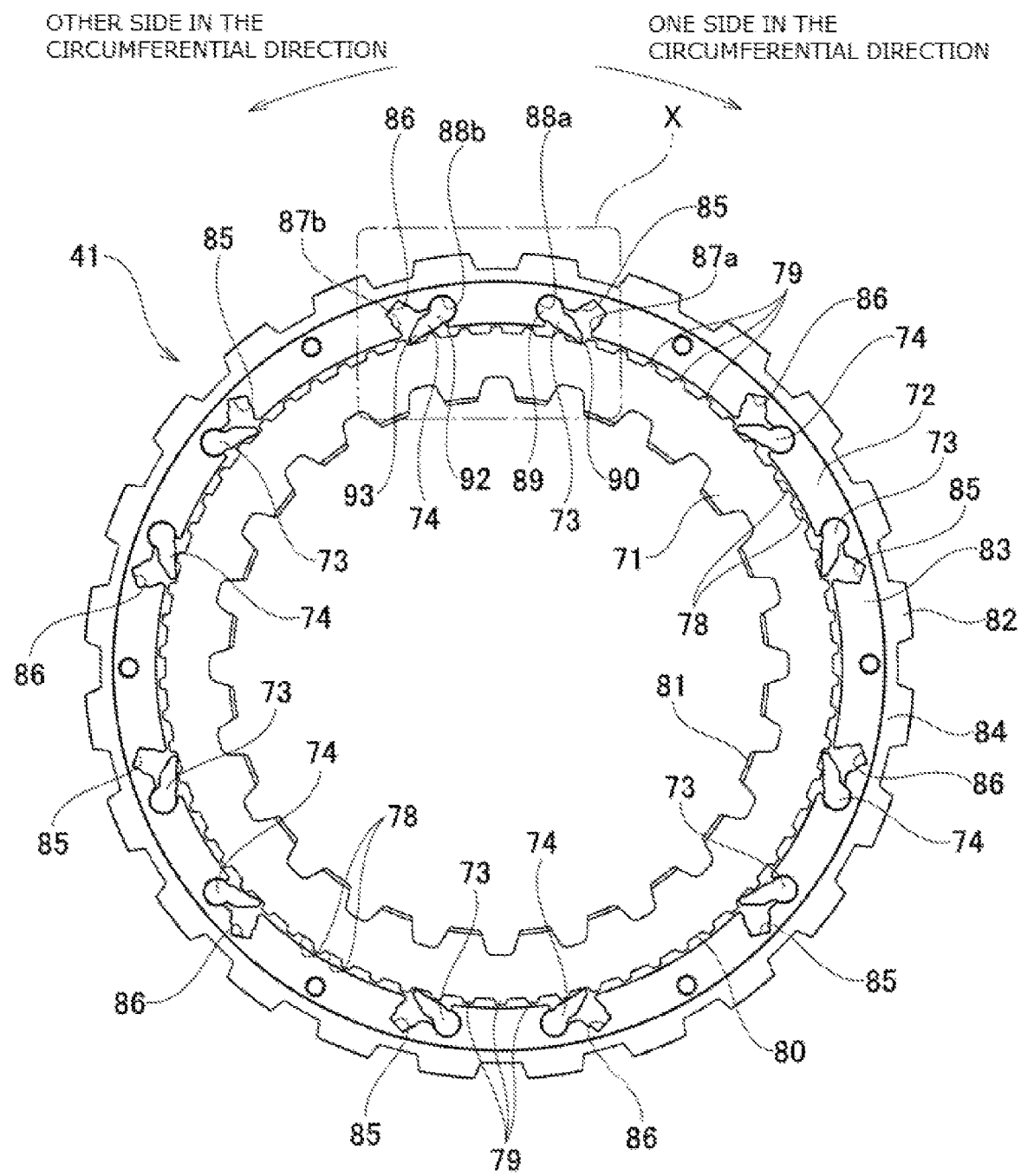
FIG. 13 is an end view as seen from one side in the axial direction of the rotation transmission state switching device in the first example in a state in which a selection plate is removed.
Figure 14:
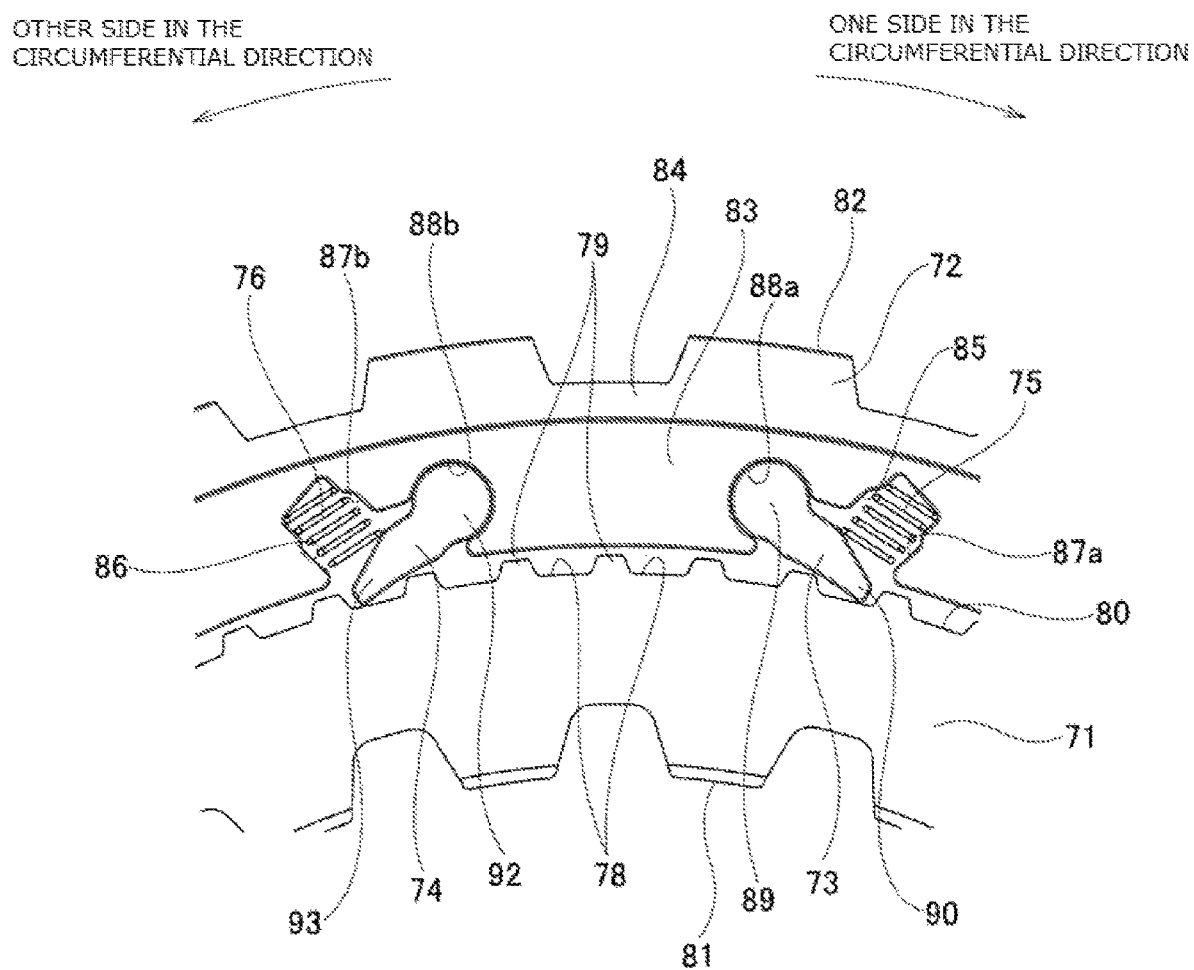
FIG. 14 is an enlarged view of portion X in FIG. 13.

The selection plate 77, as illustrated in FIG. 12, includes a base-plate portion 94 having a substantially annular plate shape, and a ring-shaped convex portion 91 that protrudes around the entire circumference toward the other side in the axial direction from an intermediate portion in the radial direction of a surface on the other side in the axial direction of the base-plate portion 94.

The base-plate portion 94 has plate-side engaging holes 95 that open to a surface on the one side in the axial direction at a plurality of locations (five locations in the illustrated example) that are uniformly spaced in the circumferential direction of an intermediate portion in the radial direction. The end portion on the other side in the axial direction of an engaging pin 52 is internally fitted (engaged) without looseness in each plate-side engaging hole 95. In other words, the selection plate 77 integrally rotates (at the same speed in the same direction) with the drive cam 50.

The ring-shaped convex portion 91 has protruding portions 96 that protrude toward the outer side in the radial direction at a plurality of locations in the circumferential direction of the outer-circumferential surface. In other words, the ring-shaped convex portion 91 has a gear-shaped concave-convex portion 97 on the outer-circumferential surface in which protruding portions 96 and concave portions are alternately arranged in the circumferential direction.

The first member 71, the second member 72, and the selection plate 77, by being combined using a cover 98 and a retaining ring 99 so that relative rotation is possible but relative displacement in the axial direction is not possible (so that there is no accidental separation in the axial direction), form the rotation transmission state switching device 41.

In other words, in a state in which the first member 71 is arranged on the inner side in the radial direction of a portion on the other side in the axial direction of the base portion 83 of the second member 72, the annular shaped cover 98 is supported by and fastened to a surface on the other side in the axial direction of the second member 72 by screws, and a surface on the one side in the axial direction of a portion on the inner side in the radial direction of the cover 98 faces a surface on the other side in the axial direction of the first member 71. As a result, displacement of the first member 71 toward the other side in the axial direction with respect to the second member 72 is prevented.

In a state in which the ring-shaped convex portion 91 of the selection plate 77 is arranged on the inner side in the radial direction of a portion on the one side in the axial direction of the base portion 83 of the second member 72, a tip-end surface (surface on the other side in the axial direction) of the ring-shaped convex portion 91 is made to come in sliding contact with or to closely face a surface on the one side in the axial direction of the first member 71, a surface on the other side in the axial direction of a portion on the outer side in the radial direction of the base-plate portion 94 is made to come in sliding contact with or to closely face a surface on the one side in the axial direction of the base portion 83 of the second member 72, the retaining ring 99 is locked to an end portion on the one side in the axial direction of the inner-circumferential surface of the cylindrical portion 84 of the second member 72. As a result, displacement of the first member 71 and the selection plate 77 toward the one side in the axial direction with respect to the second member 72 is prevented.

In the rotation transmission state switching device 41 of this example, the second member 72 is supported by and fastened to the housing 38 so that relative rotation and displacement in the axial direction is not possible. More specifically, the male spline portion 82 that is provided on the outer-circumferential surface of the second member 72 (outer-circumferential surface of the base portion 83 and the cylindrical portion 84) engages with the stationary-side female spline portion 46 of the housing 38 with a spline engagement, and the second member 72 and the cover 98 are held from both sides in the axial direction by a pair of retaining rings 101a, 101b that are locked to the inner-circumferential surface of the outer-diameter-side cylindrical portion 43 of the housing 38 (refer to FIG. 5).

The rotation transmission state switching device 41 of this example has a free mode in which relative rotation of the first member 71 and the second member 72 in both directions is possible, a lock mode in which relative rotation of the first member 71 and the second member 72 is not possible, and a one-way clutch mode in which rotation of the first member 71 with respect to the second member 72 is allowed in only one specified direction. More specifically, the rotation transmission state switching device 41, based on rotation of the selection plate 77, is configured to be able to switch among the free mode, lock mode, and one-way clutch mode by switching between the state of engagement between the first engaging pawls 90 of the first pawl member 73 and the concave engaging portions 78 of the first member 71 and the state of engagement between the second engaging pawls 93 of the second pawl member 74 and the concave engaging portions 78.

<Free Mode>

Figure 15A:
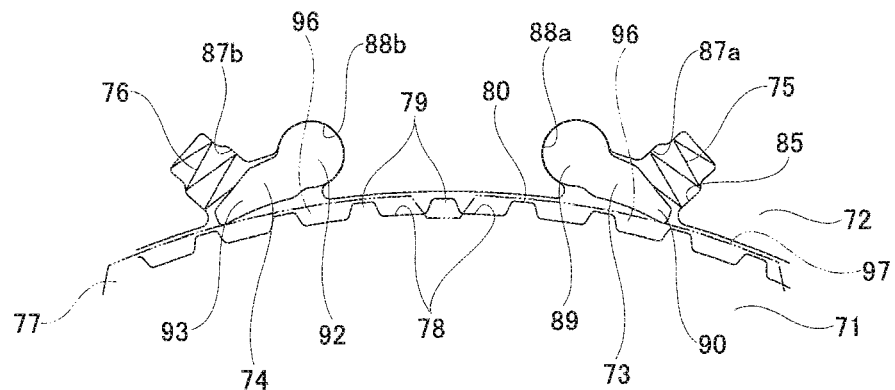
FIG. 15A is a schematic diagram of the rotation transmission state switching device in the first example, and illustrates the engagement relationship of a first engaging pawl, a second engaging pawl, concave engaging portions, and protruding portions in a free mode.

In the free mode, the phase in the circumferential direction of the selection plate 77 with respect to the second member 72 is adjusted, and as illustrated in FIG. 15A, the protruding portions 96 press the first engaging pawls 90 upward toward the outer side in the radial direction against the elastic force of the first pawl biasing members 75, and press the second engaging pawls 93 upward toward the outer side in the radial direction against the elastic force of the second pawl biasing members 76. As a result, the engagement between the concave engaging portions 78 of the first member 71 and the first engaging pawls 90 and the second engaging pawls 93 is released. In this state, regardless of the direction of relative rotation between the first member 71 and the second member 72, rotation of the first member 71 with respect to the second member 72 is allowed. In other words, regardless of the direction of rotation of the first member 71, rotation of the first member 71 with respect to the housing 38 is allowed. Moreover, regardless of the direction of rotation of the ring gear 12, rotation of the ring gear 12 with respect to the housing 38 is allowed.

<Lock Mode>

Figure 15B:
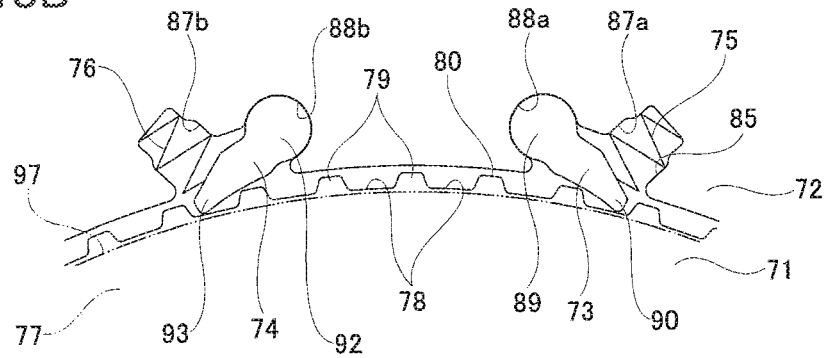
FIG. 15B is a schematic diagram illustrating the engagement relationship in a lock mode.

In the lock mode, the phase in the circumferential direction of the selection plate 77 with respect to the second member 72 is adjusted, and as illustrated in FIG. 15B, the protruding portions 96 are located in a portion separated in the circumferential direction from the first engaging pawls 90 of the first pawl member 73 and the second engaging pawls 93 of the second pawl member 74. In other words, the phases in the circumferential direction of the concave portions of the concave-convex portion 97 and the first engaging pawls 90 and second engaging pawls 93 are matched. As a result, the concave engaging portions 78 of the first member 71 and the first engaging pawls 90 and the second engaging pawls 93 are engaged. In this state, regardless of the direction of relative rotation between the first member 71 and the second member 72, rotation of the first member 71 with respect to the second member 72 is prohibited. In other words, regardless of the direction of rotation of the first member 71, rotation of the first member 71 with respect to the housing 38 is prohibited.

<One-way Clutch Mode>

Figure 15C:
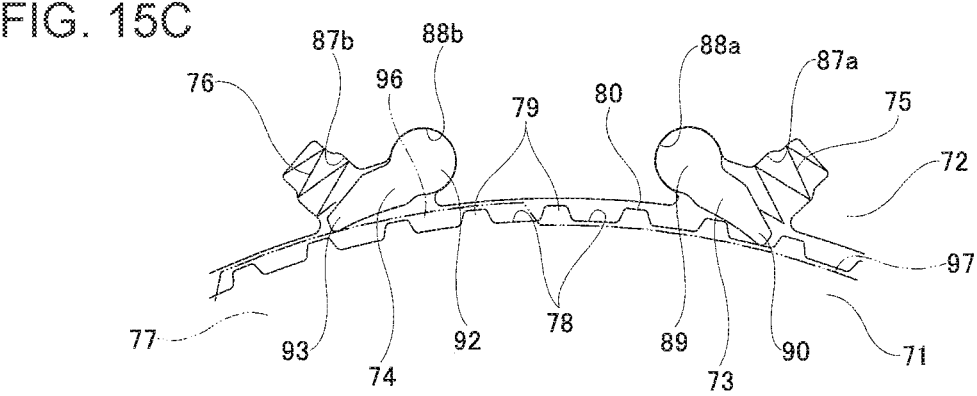
FIG. 15C is a schematic diagram illustrating the engagement relationship in a one-way clutch mode.

In the one-way clutch mode, the phase in the circumferential direction of the selection plate 77 with respect to the second member 72 is adjusted, and as illustrated in FIG. 15C, the protruding portions 96 press only the second engaging pawls 93 upward toward the outer side in the radial direction against the elastic force of the second pawl biasing members 76. As a result, the engagement between the concave engaging portions 78 of the first member 71 and the first engaging pawls 90, and the concave engaging portions 78 and the second engaging pawls 93 is released. In this state, rotation of the first member 71 with respect to the second member 72 is allowed in only a specified direction (clockwise direction in FIG. 15C), and rotation in a direction opposite the specified direction (counterclockwise direction in FIG. 15C) is prevented.

In other words, when the first member 71 tries to rotate in the specified direction with respect to the second member 72, the convex portions 79 of the concave-convex portion 80 press the first engaging pawls 90 upward toward the outer side in the radial direction against the elastic force of the first biasing members with pawls 75. As a result, rotation of the first member 71 in the specified direction is allowed. On the other hand, in a case where the first member 71 tries to rotate in a direction opposite to the specified direction with respect to the second member 72, the engagement between the concave engaging portions 78 and the first engaging pawls 90 prevent the first member 71 from rotating in the direction opposite to the specified direction. That is, the rotation transmission state switching device 41 operates as a ratchet type of one-way clutch.

Note that the specified direction coincides with the forward rotation direction of the input member. The forward rotation direction of the input member 2 refers to the rotation direction of the input member 2 when the automobile is traveling forward.

The power transmission path switching device 5 of this example switches the disconnected/connected state of the friction engaging device 40 by the electric actuator 58 rotating and driving the drive cam 50 and causing the driven cam 51 to displace in the axial direction, and at the same time, switches the operation mode by switching the mode of the rotation transmission state switching device 41 by adjusting the phase in the circumferential direction of the selection plate 77 with respect to the second member 72. The power transmission path switching device 5 includes a first mode that connects the friction engaging device 40 and sets the rotation transmission state switching device 41 to the free mode, a second mode that disconnects the friction engaging device 40 and sets the rotation transmission state switching device 41 to the lock mode, a third mode that is established during switching from the disconnected state to the connected state of the friction engaging device 40 and sets the rotation transmission state switching device 41 to the one-way clutch mode, and a fourth mode that connects the friction engaging device 40 and sets the rotation transmission state switching device 41 to the lock mode. Each of the modes will be described below.

<First Mode>

When switching the power transmission path switching device 5 to the first mode, the electric actuator 58 rotates and drives the drive cam 50, which connects the friction engaging device 40 and sets the rotation transmission state switching device 41 to the free mode.

In other words, as illustrated in FIG. 9B, the rotation of the drive cam 50 causes the rolling bodies 64 to ride up on to the flat surface portions 54a of the drive cam surface 54 and on to the flat surface portions 62a of the driven cam surface 62, which causes the driven cam 51 to displace in a direction (toward the other side in the axial direction) that increases the gap in the axial direction between the driven cam 51 and the drive cam 50. Consequently, the separation plate 66 located farthest on the one side in the axial direction is pressed toward the other side in the axial direction by way of the elastic member 68 and thrust rolling bearing 69. As a result, the friction plates 65 and the separation plates 66 are pressed together, which connects the friction engaging device 40 (the coupling force of the friction engaging device 40 becomes large), and the sun gear 11 and the carrier 13 integrally rotate.

As described above, at the same time that the friction engaging device 40 is connected, the phase in the circumferential direction of the selection plate 77 with respect to the second member 72 is adjusted, and as illustrated in FIG. 15A, the protruding portions 96 press the first engaging pawls 90 upward toward the outer side in the radial direction, and press the second engaging pawls 93 upward toward the outer side in the radial direction. As a result, the engagement between the concave engaging portions 78 of the first member 71 and the first engaging pawls 90 and second engaging pawls 93 is released, and the rotation transmission state switching device 41, regardless of the direction of relative rotation of the first member 71 and the second member 72, switches to the free mode that allows rotation of the first member 71 with respect to the second member 72.

<Second Mode>

When switching the power transmission path switching device 5 to the second mode, the electric actuator 58 rotates and drives the drive cam 50, which disconnects the friction engaging device 40 and sets the rotation transmission state switching device 41 to the lock mode.

In other words, as illustrated in FIG. 9A, the rotation of the drive cam 50 causes the rolling bodies 64 to move to the bottom portions 54c of the drive cam surface 54 and to the bottom portions 62c of the driven cam surface 62, which causes the driven cam surface 51 to displace in a direction (toward the one side in the axial direction) that reduces the gap in the axial direction between the driven cam 51 and the drive cam 50. Consequently, the force that presses the friction plates 65 and the separation plates 66 together is released. As a result, the action of the return spring 70 increases the gap between the separation plate 66 located farthest on the one side in the axial direction and the separation plate 66 located farthest on the other side in the axial direction, which disconnects the friction engaging device 40 (the coupling force of the friction engaging device 40 is lost).

As described above, at the same time that the friction engaging device 40 is disconnected, the phase in the circumferential direction of the selection plate 77 with respect to the second member 72 is adjusted, which, as illustrated in FIG. 15B, causes the protruding portions 96 to be located in positions separated in the circumferential direction from the first engaging pawls 90 of the first pawl member 73 and the second engaging pawls 93 of the second pawl member 74. As a result, the concave engaging portions 78 of the first member 71 and the first engaging pawls 90 and second engaging pawls 93 engage, and the rotation transmission state switching device 41, regardless of the direction of relative rotation of the first member 71 and the second member 72, switches to the lock mode that prevents rotation of the first member 71 with respect to the second member 72.

<Third Mode>

The power transmission path switching device 5 of this example is configured so as to switch to the third mode while in the progress of switching from the disconnected state to the connected state of the friction engaging device 40, or in other words, while in the progress of switching from the second mode to the first mode.

When in the process of switching from the disconnected state to the connected state of the friction engaging device 40, due to the rotation of the drive cam 50, the amount that the rolling bodies 64 ride up from the bottom portions 54c of the drive cam surface 54 and the amount that the rolling bodies 64 ride up from the bottom portions 62c of the driven cam surface 62 gradually increases, and as a result the force pressing the friction plates 65 and the separation plates 66 together gradually increases (the coupling force of the friction engaging device 40 gradually increases). At this time, while both side surfaces in the axial direction of the friction plates 65 and both side surfaces in the axial direction of the separation plates 66 are slid over each other (are brought into sliding contact with each other), the friction plates 65 and the separation plates 66 rotate in the same direction and are gradually synchronized with each other (the rotation speed is gradually matched).

In the power transmission path switching device 5 of this example, due to the rotation of the drive cam 50, the rotation transmission state switching device 41 is switched to the one-way clutch mode before starting to switch from the disconnected state to the connected state of the friction engaging device 40, or in other words, before starting to increase the force pressing the friction plates 65 and the separation plates 66 together. As illustrated in FIG. 15C, when switching the rotation transmission state switching device 41 to the one-way clutch mode, the protruding portions 96 press only the second engaging pawls 93 upward toward the outer side in the radial direction against the elastic force of the second pawl biasing members 76. As a result, only the first engaging pawls 90 engage with the concave engaging portions 78 of the first member 71, and the rotation transmission state switching device 41 allows only rotation in the specified direction (specified direction in FIG. 15C) of the first member 71 with respect to the second member 72 and prevents rotation in the direction opposite to the specified direction.

In this example, due to the rotation of the drive cam 50, the power transmission path switching device 5 is switched to the third mode by starting switching from the disconnected state to the connected state of the friction engaging device 40 at the same time that switching to the one-way clutch mode of the rotation transmission state switching device 41 is complete.

In this example, in a state in which the power transmission path switching device 5 is set to the third mode, due to the rotation of the drive cam 50, switching from the one-way clutch mode to the free mode of the rotation transmission state switching device 41 is started at the same time that connection of the friction engaging device 40 is completed.

<Fourth Mode>

When switching the power transmission path switching device 5 to the fourth mode, the electric actuator 58 rotates and drives the drive cam 50, which connects the friction engaging device 40 and sets the rotation transmission state switching device 41 to the lock mode.

In other words, as illustrated in FIG. 9B, due to the rotation of the drive cam 50, the driven cam 51 is displaced in a direction (toward the other side in the axial direction) that increases the gap in the axial direction between the driven cam 51 and the drive cam 50, and presses the friction plates 65 and the separation plates 66 together. Consequently, the separation plate 66 located farthest on the one side in the axial direction is pressed toward the other side in the axial direction by way of the elastic member 68 and thrust rolling bearing 69. As a result, by pressing the friction plates 65 and the separation plates 66 together, the friction engaging device 40 is connected and the sun gear 11 is prevented from rotating relative to the carrier 13.

As described above, at the same time that the friction engaging device 40 is connected, the phase in the circumferential direction of the selection plate 77 with respect to the second member 72 is adjusted, which, as illustrated in FIG. 15B, causes the protruding portions 96 to be located in positions separated in the circumferential direction from the first engaging pawls 90 of the first pawl member 73 and the second engaging pawls 93 of the second pawl member 74. As a result, the concave engaging portions 78 of the first member 71 and the first engaging pawls 90 and second engaging pawls 93 engage, and the rotation transmission state switching device 41, regardless of the direction of relative rotation of the first member 71 and the second member 72, switches to the lock mode that prevents rotation of the first member 71 with respect to the second member 72.

Figure 16:
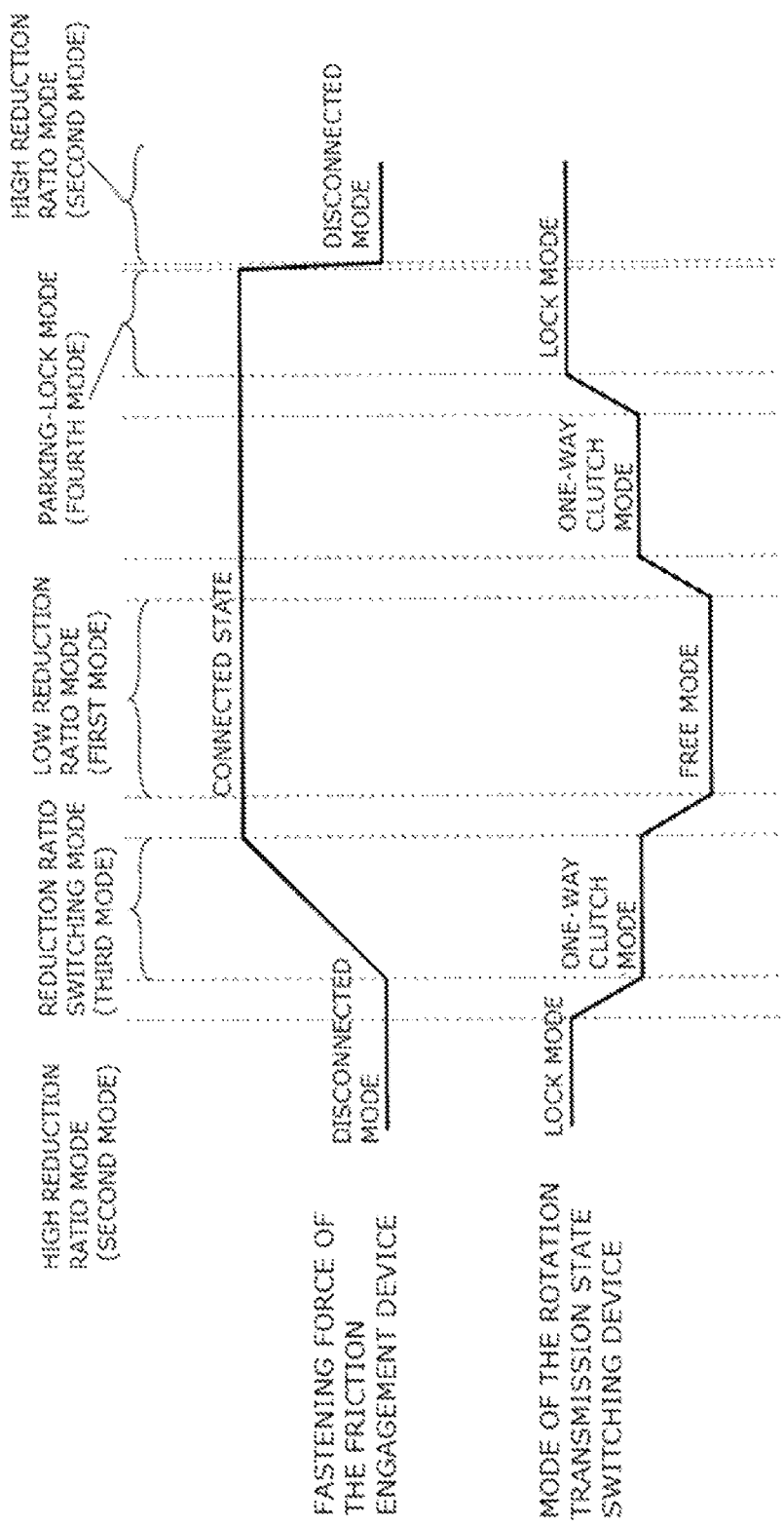
FIG. 16 is a graph schematically illustrating the disconnected/connected state of the friction engaging device and modes of the rotation transmission state switching device in the two-stage transmission in the first example.

The two-stage transmission 1 of this example, as illustrated in FIG. 16, by switching the operation mode of the power transmission path switching device 5, is able to switch between a low reduction ratio mode in which the reduction ratio between the input member 2 and the output member 3 is small (the reduction ratio is 1), and a high reduction ratio mode in which the reduction ratio is large compared with the low reduction ratio mode. Moreover, the two-stage transmission 1 passes through a reduction ratio switching mode while in the progress of switching from the high reduction ratio mode to the low reduction ratio mode. Furthermore, the two-stage transmission 1 is also able to switch to a parking-lock mode that locks rotation of the output member 3. Each case will be described below.

<Low Reduction Ratio Mode>

When switching the two-stage transmission 1 to the low reduction ratio mode, the electric actuator 58 rotates and drives the drive cam 50, which switches the power transmission path switching device 5 to the first mode in which the friction engaging device 40 is connected and the rotation transmission state switching device 41 is set to the free mode. When the power transmission path switching device 5 is switched to the first mode, as illustrated in FIG. 4A, the friction engaging device 40 is connected, the sun gear 11 and carrier 13 integrally rotate, and the rotation transmission state switching device 41 is switched to the free mode, which allows the ring gear to rotate with respect to the housing 38. In this kind of low reduction ratio mode, the rotation direction and rotation speed of the sun gear 11, the ring gear 12, and the carrier 13 are the same, and the entire planetary gear mechanism 4 integrally rotates in a so-called glued state. Therefore, the power of the input member 2 is transmitted to the output member 3 through the path indicated in (A) below.

(A) Input member 2 to Carrier 13 to Output member 3

In this way, in the low reduction ratio mode, the power of the input member 2 is transmitted to the output member 3 as is without the speed being reduced. In other words, in the low reduction ratio mode, the reduction ratio between the input member 2 and the output member 3 is 1.

<High Reduction Ratio Mode>

When switching the two-stage transmission 1 to the high reduction ratio mode, the electric actuator 58 rotates and drives the drive cam 50, which switches the power transmission path switching device 5 to the second mode in which the friction engaging device 40 is disconnected and the rotation transmission state switching device 41 is set to the lock mode. When the power transmission path switching device 5 is switched to the second mode, as illustrated in FIG. 4B, the friction engaging device 40 is disconnected, which allows relative rotation of the sun gear 11 and the carrier 13, and by the rotation transmission state switching device 41 being switched to the lock mode, the ring gear 12 is prevented from rotating with respect to the housing 38. In this kind of high reduction ratio mode, power of the input member 2 is transmitted to the output member 3 through the path indicated in (B) below.

(B) Input member 2 to Sun gear 11 to Spinning motion of the pinion gear 14 to Orbital motion of the pinion gear 14 due to engagement with the ring gear 12 to Carrier 13 to Output member 3

In this way, in the high reduction ratio mode, the power of the input member 2 is reduced by the planetary gear mechanism 4 and then transmitted to the output member 3. Note that in the high reduction ratio mode, the reduction ratio between the input member 2 and the output member 3 is determined according to the gear ratio of the ring gear 12 and sun gear 11 (number of teeth of the gear portion 24 of the ring gear 12/the number of teeth of the gear portion 19 of the sun gear 11).

Figure 32:
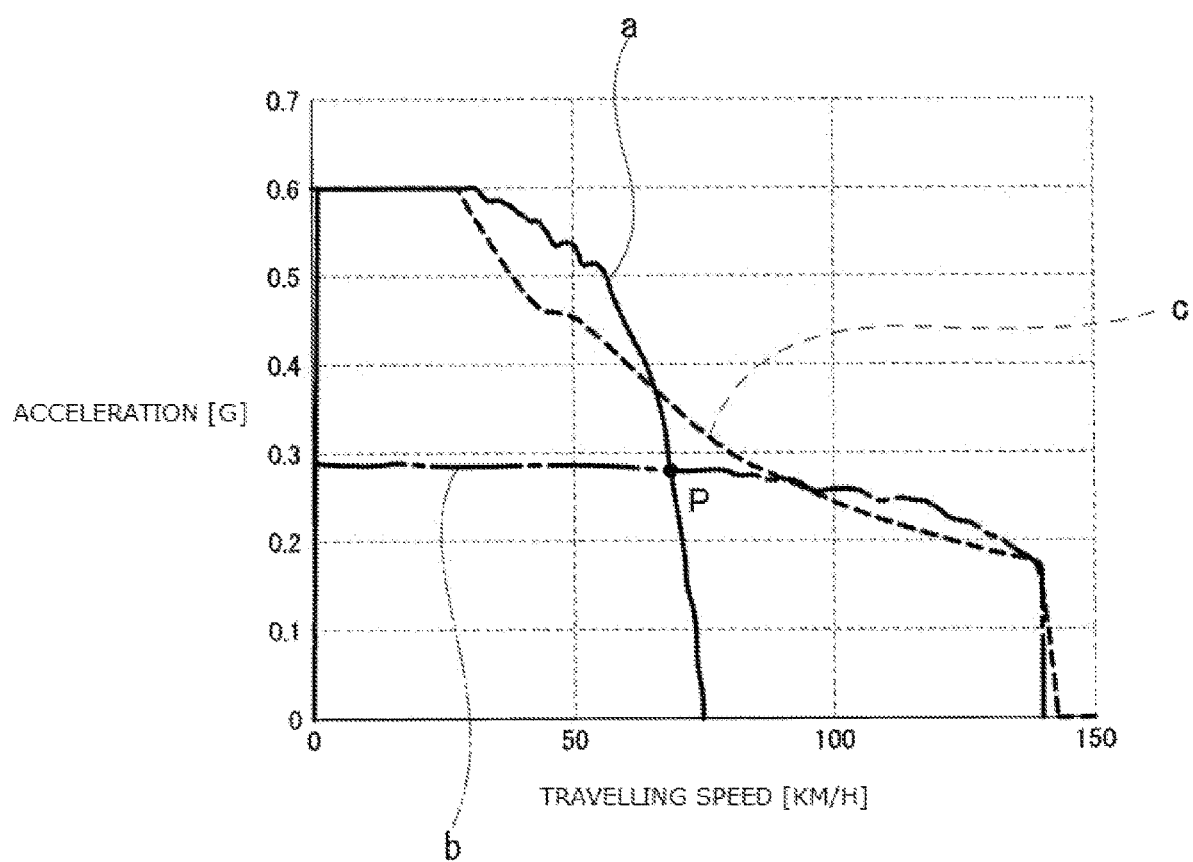
FIG. 32 is a graph for explaining the effect obtained by incorporating a transmission in a drive apparatus having an electric motor as the driving source.

As described above, in the two-stage transmission 1 of this example, one electric actuator 58 rotates and drives one drive cam 50, which switches the operation mode of the power transmission path switching device 5. In other words, by switching the disconnected/connected state of the friction engaging device 40 and the mode of the rotation transmission state switching device 41, it is possible to switch the reduction ratio between the input member 2 and output member 3 in two stages: high and low. More specifically, for example, in a region where the power inputted to the input member is in a low speed and high torque region, the two-stage transmission 1 is switched to the high reduction ratio mode, and when the input power is in a high speed and low torque region, the two-stage transmission 1 is switched to the low reduction ratio mode. Therefore, when an electric automobile or a hybrid automobile is traveling with only an electric motor as the driving source, the acceleration performance and high speed performance are characterized as if the portion on the left side of point P of solid line a in FIG. 32 described above and the portion on the right side of point P of chain line b are continuous, and can be made similar to those of a gasoline engine as indicated by the dashed line in FIG. 32.

Particularly, in the power transmission path switching device 5 of this example, electric power is supplied to the gear-shift motor 60 of the electric actuator 58 and the drive cam 50 is rotated by way of the worm 59 which switches the disconnected/connected state of the friction engaging device 40 and the mode of the rotation transmission state switching device 41. In other words, in the power transmission path switching device 5 of this example, there is no need for a hydraulic system for controlling a friction engaging device such as a clutch, brake or the like. Therefore, in an electric automobile or a hybrid automobile, it is possible to simplify and reduce the cost of the system, and it is possible to improve the electric cost performance.

The power transmission path switching device 5 of this example is configured so that one electric actuator 58 (gear-shift motor 60) rotates the drive cam 50, which rotates and drives the selection plate 77 to switch the disconnected/connected state of the friction engaging device 40 and the mode of the rotation transmission state switching device 41. However, in a case of implementing the power transmission path switching device of the present invention, it is also possible to switch the disconnected/connected state of the friction engaging device and switch the mode of the rotation transmission state switching device by separate actuators.

<Reduction Ratio Switching Mode>

The two-stage transmission 1 of this example, in a case where the input member 2 is rotating in a forward rotation direction, switches to a reduction ratio switching mode by setting the power transmission path switching device 5 to the third mode while in progress of switching from the high reduction ratio mode to the low reduction ratio mode.

In the reduction ratio switching mode, due to the rotation transmission state switching device 41 switching to the one-way clutch mode, rotation of the ring gear 12 with respect to the housing 38 in only the specified direction is allowed, and rotation in the opposite direction to the specified direction is prevented.

Moreover, in the reduction ratio switching mode, due to the coupling force of the friction engaging device 40 gradually increasing, rotation of the sun gear 11 and rotation of the carrier 13 are gradually synchronized. As the coupling force of the friction engaging device 40 gradually increases and the rotation of the sun gear 11 and rotation of the carrier 13 are gradually synchronized while the input member 2 is rotating in the forward rotation direction, the torque that is applied to the second member 72 of the rotation transmission state switching device 41 in the opposite direction to the specified direction is gradually reduced. Note that in the reduction ratio switching mode, the rotation transmission state switching device 41 is switched to the one-way clutch mode, and thus the second member 72 does not rotate even when torque is applied to the second member 72 in the opposite direction to the specified direction.

When the torque that is applied to the second member 72 in the opposite direction to the specified direction is gradually reduced and becomes zero, and then the direction of the torque applied to the second member 72 is reversed (torque is applied to the second member 72 in the specified direction), at that instant, rotation of the second member 72 in the specified direction is allowed. Therefore, with the two-stage transmission 1 of this example, it is possible to suppress a loss of torque in the two-stage transmission 1 while suppressing gear-shift shock due to switching the mode. The reason for this will be described with reference to FIG. 17 and FIG. 18.

Figure 17:
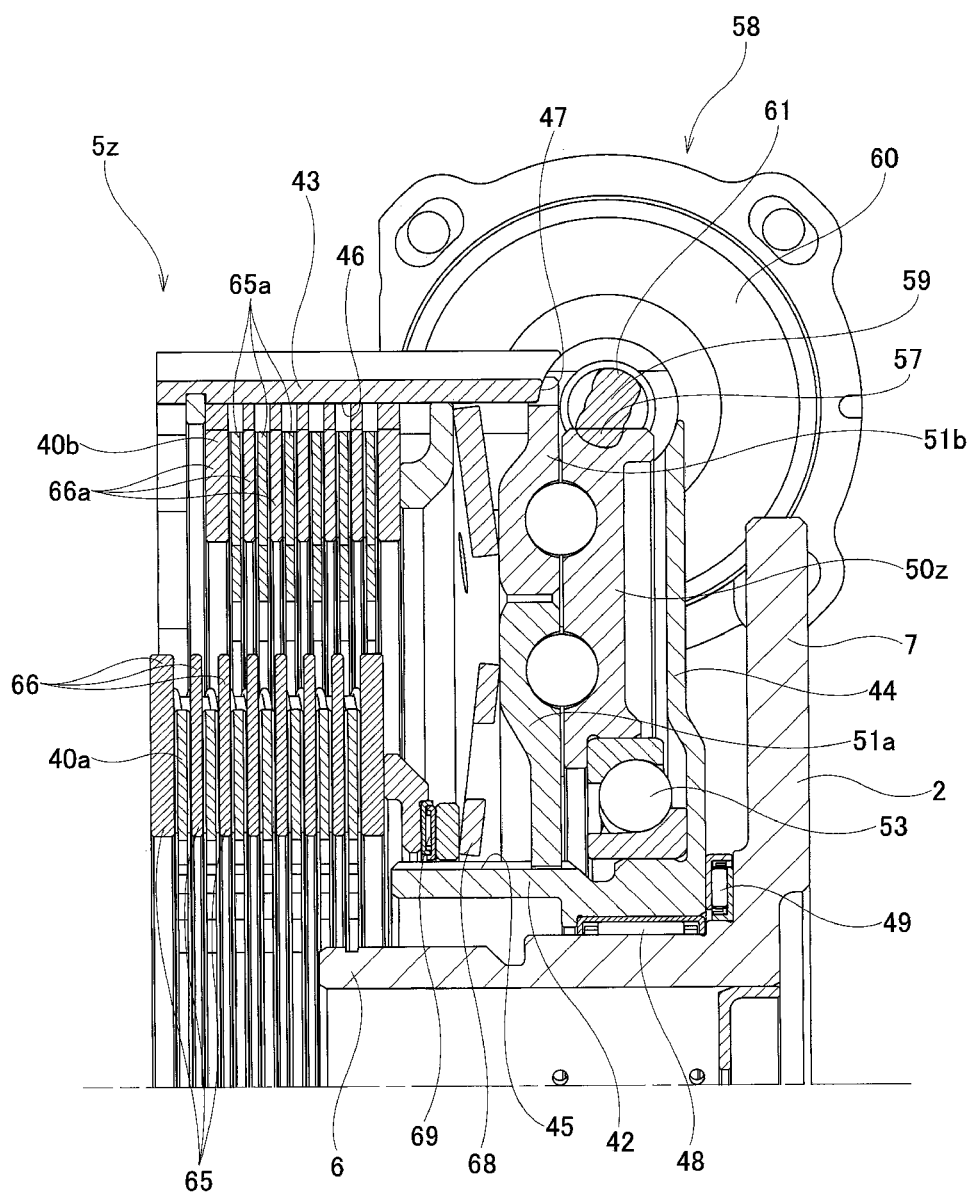
FIG. 17 is a cross-sectional view illustrating a comparative example of a power transmission path switching device.

FIG. 17 illustrates a power transmission path switching device 5z of a comparative example. The power transmission path switching device 5z includes a first friction engaging device 40a that switches between a state of allowing and a state of not allowing relative rotation of the sun gear 11 and the carrier 13, and a second friction engaging device 40b that switches between a state of allowing and a state of not allowing rotation of the ring gear 12. In other words, the power transmission path switching device 5z of the comparative example, instead of the rotation transmission state switching device 41 of the power transmission path switching device 5 of the present example, employs a second friction engaging device 40b that switches the disconnected/ connected state by pressing together or separating friction plates 65a and separation plates 66a.

The power transmission path switching device 5z of the comparative example switches between the disconnected/connected states of the first friction engaging device 40a and the second friction engaging device 40 by an electric actuator that rotates and drives a drive cam 50z of a cam device 39z which causes a first driven cam 51a and second driven cam 51b to displace in the axial direction. The first driven cam 51a and the second driven cam 51b displace at different phases (displace (forward or back) in opposite directions from each other in the axial direction) from each other as the drive cam 50z rotates.

In a two-stage transmission in which the power transmission path switching device 5z of the comparative example is assembled, while in the progress of switching from a high reduction ratio mode in which the reduction ratio is large to a low reduction ratio mode in which the reduction ratio is small, as illustrated in FIG. 18, the coupling force of the first friction engaging device 40a gradually increases and the coupling force of the second friction engaging device 40b gradually decreases. Therefore, while in the progress of switching from the high reduction ratio mode to the low reduction ratio mode, when the coupling force of the second friction engaging device 40b gradually becomes small and becomes insufficient, the ring gear 12 is dragged by the revolution of the pinion gear 14, and a loss of torque occurs between a ring gear 12 and housing 38.

Moreover, even in a two-stage transmission in which the power transmission path switching device 5z of the comparative example is assembled, as the coupling force of the first friction engaging device 40a gradually becomes large, rotation of the sun gear 11 and rotation of the carrier 13 are synchronized, and after the torque applied to the ring gear 12 in the opposite direction to the specified direction is reduced and becomes zero, the direction of the torque applied to the ring gear 12 is reversed. However, in the power transmission path switching device 5z of the comparative example, at the instant that the direction of the torque applied to the ring gear 12 is reversed and the direction of revolution of the pinion gear 14 and the direction of rotation of the ring gear 12 match, it is not possible for the coupling force of the second friction engaging device 40b to become sufficiently large. Therefore, the ring gear 12 is dragged with respect to the housing 38, and loss of torque between the ring gear 12 and the housing 38 occurs.

On the other hand, in the two-stage transmission 1 of the present example, due to the rotation of the drive cam 50, the rotation transmission state switching device 41 is set to the one-way clutch mode before starting to switch the friction engaging device 40 from the disconnected state to the connected state in order to switch from the high reduction ratio mode to the low reduction ratio mode. Therefore, by gradually increasing the coupling force of the friction engaging device 40 to gradually synchronize the rotation of the sun gear 11 and the rotation of the carrier 13 in order to switch the friction engaging device 40 from the disconnected state to the connected state, at the instant that the direction of the torque applied to the ring gear 12 is reversed, and rotation of the ring gear 12 in the specified direction is allowed. Therefore, it is possible to suppress torque loss in the two-stage transmission 1 while suppressing gear-shift shock due to switching the mode.

Note that in the reduction ratio switching mode, the reduction ratio between the input member 2 and the output member 3 is the same as the reduction ratio in the high reduction ratio mode in a state in which the size of the coupling force of the friction engaging device 40 is large enough that there is no loss of torque in the engagement portions between the friction plates 65 and the separation plates 66. On the other hand, the reduction ratio between the input member 2 and the output member 3 in the reduction ratio switching mode is the same as the reduction ratio in the low reduction ratio mode, or in other words is 1, in a state in which the coupling force of the friction engaging device 40 increases to a size large enough to enable transmission of torque without slippage occurring at the contact potions between the friction plates 65 and the separation plates 66. However, in a state in which the size of the coupling force of the friction engaging device 40 is such that slippage occurs at the contact portions between the friction plates 65 and the separation plates 66, the reduction ratio between the input member 2 and the output member 3 becomes a value corresponding to the size of the input torque, the rotational speed, or the like.

In a state in which the input member 2 is rotating in the forward rotation direction and while in the progress of switching from the high reduction ratio mode to the reduction ratio switching mode, torque is applied to the second member 72 of the rotation transmission state switching device 41 in the opposite direction to the specified direction. Here, in the rotation transmission state switching device 41, rotation of the second member 72 in the direction opposite to the specified direction is prevented while in the progress of switching from the lock mode to the one-way clutch mode. In other words, while in the progress of switching from the high reduction ratio mode to the reduction ratio switching mode, the reduction ratio between the input member 2 and the output member 3 is the same as the reduction ratio in the high reduction ratio mode.

In a state in which the input member 2 is rotating in the forward rotation direction and while in the progress of switching from the reduction ratio switching mode to the low reduction ratio mode, torque is applied to the second member 72 of the rotation transmission state switching device 41 in the specified direction. Here, in the rotation transmission state switching device 41, rotation of the second member 72 in the specified direction is allowed while in the progress of switching from the one-way clutch mode to the free mode. In other words, while in the progress of switching from the reduction ratio switching mode to the low reduction ratio mode, the reduction ratio between the input member 2 and the output member 3 is the same as the reduction ratio in the low reduction ratio mode.

Moreover, in the two-stage transmission of the present example, while the input member 2 is rotating in the reverse direction, or in other words, while the automobile is traveling backward, the vehicle rarely will be traveling at high speed. Therefore, when switching from the high reduction ratio mode to the low reduction ratio mode in a case where the input member 2 is rotating in the reverse direction, there is little need to allow the power transmission path switching device 5 to select the reduction ratio switching mode. Furthermore, when switching from the low reduction ratio mode to the high reduction ratio mode, the vehicle is mainly in a decelerating state. In this state, transmission of power from the input member 2 to the output member 3 is not performed, and thus there is little need for the power transmission path switching device 5 to select the reduction ratio switching mode.

<Parking-Lock Mode>

Furthermore, the two-stage transmission 1 of the present example includes a parking-lock mode that locks rotation of the output member 3. When switching the two-stage transmission 1 to the parking-lock mode, the electric actuator 58 rotates and drives the drive cam 50 in a direction as indicated by arrow a in FIG. 9A and FIG. 9B, which switches the power transmission path switching device 5 to the fourth mode in which the friction engaging device 40 is connected and the rotation transmission state switching device 41 is set to the lock mode. When the power transmission path switching device 5 is switched to the fourth mode, the friction engaging device 40 is connected, which prevents relative rotation of the sun gear 11 with respect to the carrier 13, and by the rotation transmission state switching device 41 being switched to the lock mode, the ring gear 12 is prevented from rotating with respect to the housing 38. As a result, rotation of the output member 3 (and input member 2) is locked.

Particularly, in this example, when switching the two-stage transmission 1 to the parking-lock mode, as illustrated in FIG. 16, after the friction engaging device 40 is connected, the rotation transmission state switching device 41 is switched to the lock mode with the friction engaging device 40 maintained in the connected state.

Switching the two-stage transmission 1 to the parking-lock mode is normally performed in a state in which the vehicle is completely stopped. Immediately before the vehicle is completely stopped, the two-stage transmission 1 is driven in one of the low reduction ratio mode, the high reduction ratio mode, and reduction ratio switching mode (normally the high reduction ratio mode since the vehicle is traveling at low speed before stopping). Regardless of which mode of the two-stage transmission the vehicle is being driven in, in a case where the vehicle is completely stopped and the shift lever is shifted or the like to select the P range, first, the electric actuator 58 rotates and drives the drive cam 50, and by setting the cam device 39 to the state illustrated in FIG. 9B, the friction engaging device 40 is connected. More specifically, by switching the power transmission path switching device 5 to the first mode in which the friction engaging device 40 is connected, and the rotation transmission state switching device 41 is set to the free mode, the two-stage transmission 1 is switched to the low reduction ratio mode.

From this state, the drive cam 50 is further rotated in the same direction a, the phase in the circumferential direction of the selection plate 77 with respect to the second member 72 is adjusted, and the rotation transmission state switching device 41 is switched from the free mode to the lock mode via the one-way clutch mode. Even while the rotation transmission state switching device 41 is being switched from the free mode to the lock mode, the connected state of the friction engaging device 40 is maintained. In this way, by switching the power transmission path switching device 5 to the fourth mode in which the friction engaging device 40 is connected, and the rotation transmission state switching device 41 is set to the lock mode, the two-stage transmission 1 is switched to the parking-lock mode.

Furthermore, in this example, when releasing the two-stage transmission 1 from the parking-lock mode, by disconnecting the friction engaging device 40 while maintaining the rotation transmission state switching device 41 in the lock mode, the two-stage transmission 1 is switched to the high reduction ratio mode.

To accomplish this, by the electric actuator 58 rotating the drive cam 50 in the direction indicated by arrow a in FIG. 9A and FIG. 9B (same direction as the rotation direction of the drive cam 50 when switching the friction engaging device 40 from the disconnected state to the connected state), the rolling bodies 64 are moved so as to roll down the steep sloping surface portions 54*d*, 62*d* from the flat surface portions 54*a* of the drive cam surface 54 and the flat surface portions 62*a* of the driven cam surface 62, and moved to the bottom portions 54*c*, 62*c*. Accordingly, the driven cam 51 is moved in a direction that reduces the gap in the axial direction between the driven cam 51 and the drive cam 50, and releases the force pressing the friction plates 65 and the separation plates 66 together. As a result, the action of the return spring 70 increases the gap between the separation plate 66 located farthest on the one side in the axial direction and the separation plate 66 located farthest on the other side in the axial direction, which disconnects the friction engaging device 40. Even while switching the friction engaging device 40 from the connected state to the disconnected state, the rotation transmission state switching device 41 is maintained in the lock mode. In this way, by switching the power transmission path switching device 5 to the first mode in which the friction engaging device 40 is disconnected and the rotation transmission state switching device 41 is set to the lock mode, the two-stage transmission 1 is switched to the high reduction ratio mode.

As described above, in the two-stage transmission 1 of this example, when switching to the parking-lock mode from one of the low reduction ratio mode, high reduction ratio mode, and reduction ratio switching mode, and then after that, while releasing the parking-lock mode and switching to the high reduction ratio mode, the drive cam 50 is rotated and driven in the same direction a.

In this example, when switching the two-stage transmission 1 to the parking-lock mode, the rotation transmission state switching device 41 is switched to the lock mode after the friction engaging device 40 is connected. Therefore, while the vehicle is traveling, it is possible to prevent the two-stage transmission 1 from accidentally switching to the parking-lock mode. The reason for this will be described below.

A case is supposed in which while a vehicle is traveling the shift lever is accidentally shifted to select the P range and the two-stage transmission 1 is switched to the parking-lock mode while the output member 3 is in a state of rotating. First, due to the rotation of the drive cam 50, the power transmission path switching device 5 is switched to the first mode and the two-stage transmission 1 is switched to the low reduction ratio mode. When the two-stage transmission 1 is switched to the low reduction ratio mode, the planetary gear mechanism 4 is set to a glued state, and the first member 71 that is supported with respect to the ring gear 12 also rotates in the same direction and at the same speed as the output member 3.

From this state, in order to switch the power transmission path switching device 5 to the fourth mode, the drive cam 50 is further rotated, which adjusts the phase in the circumferential direction of the selection plate 77 with respect to the second member 72. As a result, the protruding portions 96 are positioned at portions separated in the circumferential direction from the first engaging pawls 90 of the first pawl members 73 and the second engaging pawls 93 of the second pawl members 74. In this state, each of the first engaging pawls 90 and the second engaging pawls 93 displace toward the inner side in the radial direction due to the elastic force of the first pawl biasing members 75 and second pawl biasing members 76 to engage with the concave engaging portions 78. However, when the first member 71, together with the output member 3, rotates at a speed equal to or greater than a specified speed, the first engaging pawls and the second engaging pawls 93 are prevented from displacing toward the inner side in the radial direction by the convex portions 79 of the first member 71, and do not engage with the concave engaging portions 78. As a result, while the output member 3 is rotating, it is possible to prevent the rotation transmission state switching device 41 from being switched to the lock mode, and while the vehicle is traveling, it is possible to prevent the two-stage transmission 1 from being accidentally switched to the parking-lock mode.

In this example, when releasing the two-stage transmission 1 from the parking-lock mode by disconnecting the friction engaging device 40 while maintaining the rotation transmission state switching device 41 in the lock mode, the two-stage transmission 1 is switched to the high reduction ratio mode. Therefore, even in a case of releasing the parking-lock mode from a state in which a large torque is applied to the output member 3, it is possible to prevent the force required for release from becoming excessively large. The reason for this will be described below.

When parking a vehicle on a slope, in a case where the service brake (foot brake) is released before the shift lever is switched to the P range and the parking brake is set, or when braking by the parking brake is not sufficient, the drive wheels will try to rotate, and due to this, the output member 3 will also try to rotate (a rotational torque is applied to the output member 3). When a rotational torque is applied to the output member 3, a rotational torque will also be applied to the ring gear 12 by way of the carrier 13 and pinion gear 14, and a rotational torque will also be further applied to the first member 71 that is supported by the ring gear 12. As a result, the side surfaces in the circumferential direction of the concave engaging portions 78 of the first member 71 will be strongly pressed against the tip-end portions of the first engaging pawls 90 or the second engaging pawls 93.

From this state, supposing a case in which, by releasing the engagement between the concave engaging portions 78 and the first engaging pawls 90 and/or the second engaging pawls 93, the parking-lock mode of the two-stage transmission 1 is released, it is necessary to press the first engaging pawls 90 and/or the second engaging pawls 93 upward toward the outer side in the radial direction while sliding the tip-end portions of the first engaging pawls 90 and/or the second engaging pawls 93 with respect to the side surfaces in the circumferential direction of the concave engaging portions 78. Therefore, a large force is necessary for releasing the parking-lock mode of the two-stage transmission 1, and thus it is necessary to use a motor having a large output as the gear-shift motor 60.

On the other hand, in the present example, the parking-lock mode of the two-stage transmission 1 is released by rotating the drive cam 50 to displace the driven cam 51 in the axial direction and disconnect the friction engaging device 40 with the lock mode of the rotation transmission state switching device 41 maintained as is. Therefore, in a case of releasing the parking-lock mode from a state in which a large torque is applied to the output member 3, it is possible to prevent the force required for release from becoming large, and it is easy to ensure the release performance of the parking lock. More specifically, even in a state, for example, in which a vehicle is carrying a maximum load and is parked on a steep grade, it is possible to release the parking-lock mode of the two-stage transmission 1.

In this example, the inclination angle of the steep sloping surface portions 54d of the drive cam surface 54 and the steep sloping surface portions 62d of the driven cam surface 62 is made to be large enough that the rolling bodies 64 cannot ride up when rotating the driving the drive cam 50 by the electric actuator 58. Therefore, when the two-stage transmission 1 is set to the high reduction ratio mode and the vehicle is traveling at a low speed, it is possible to prevent the two-stage transmission 1 from switching to the parking-lock mode even when some kind of trouble or the like occurs.

As described above, with the two-stage transmission 1 of the present example, it is possible to both prevent accidentally switching to the parking-lock mode while the vehicle is traveling, and also ensure the release performance of the parking lock.

Note that in the power transmission path switching device 5 of the present example, an elastic member 68 is arranged between the separation plate 66 located farthest on the one side in the axial direction and the driven cam 51. Accordingly, the elastic member 68 is able to absorb assembly error of the power transmission path switching device 5, and misalignment due to wear of the friction plates 65 and the separation plates 66. Therefore, it is possible to control the coupling force of the friction engaging device 40 by controlling the force for pressing the driven cam 51 (force for pressing the driven cam 51 toward the other side in the axial direction with respect to the separation plate 66 farthest on the one side in the axial direction). As a result, it is possible to sufficiently maintain the coupling force of the friction engaging device 40 in the low reduction ratio mode.

In this example, in a state in which the power transmission path switching device 5 is switched to the first mode and the friction engaging device 40 is in a connected state, the rolling bodies 64 ride up on the flat surface portions 54a of the drive cam surface 54. Therefore, with the power transmission path switching device 5 of the present example, it is possible to maintain the friction engaging device 40 in a connected state even when the supply of electric power to the gear-shift motor 60 is stopped after switching the mode is complete, and from this aspect as well, it is possible to improve the power cost performance.

In addition to the flat surface portions 54a of the drive cam surface 54, by providing a self-lock function in a worm reducer composed of the wheel gear portion 57 of the drive cam 50 and the worm gear portion 61 of the worm 59, it is possible to maintain the connected state of the friction engaging device 40 even after the supply of electric power to the gear-shift motor 60 has stopped.

In the two-stage transmission 1 of the present invention, the planetary gear mechanism 4 is arranged around the output member 3, and the power transmission path switching device 5 is arranged around the input member 2. However, in a case of implementing the two-stage transmission according to this first embodiment of the present invention, it is possible to adopt various configurations. For example, it is possible to arrange the planetary gear mechanism around the input member and arrange the power transmission path switching device around the output member. Alternatively, the planetary gear mechanism and/or the power transmission path switching device can be arranged without overlapping them with the input member or the output member in the radial direction. In any case, the shapes of the components are appropriately changed according to the configuration used.

In the cam device 39 of the power transmission path switching device 5 of the present example, the rolling bodies 64 are held between the drive cam 50 and the driven cam 51. However, in a case of implementing the power transmission path switching device of the present invention, the configuration is not limited to that of the present example, and various configurations may be used as long as the cam device is able to cause the driven cam to displace in the axial direction due to the rotation of the drive cam. For example, it is possible to bring the drive cam surface provided on the drive cam in direct sliding contact with the driven cam surface provided on the driven cam.

In the rotation transmission state switching device 41 of the present example, the second member 72 is arranged around the first member 71, and the first pawl member 73 and the second pawl member 74 are pivotally supported with respect to the second member 72. However, in a case of implementing the present invention, the rotation transmission state switching device is not particularly limited as long as the configuration is such that it is possible to switch the rotation transmission state between the first member and the second member. For example, it is possible to pivotally support the first pawl member and the second pawl member with respect to the first member that is arranged on the inner side in the radial direction, or arrange the first member and the second member so as to face each other in the axial direction.

First Modification and Second Modification of the First Example

Figure 19A:
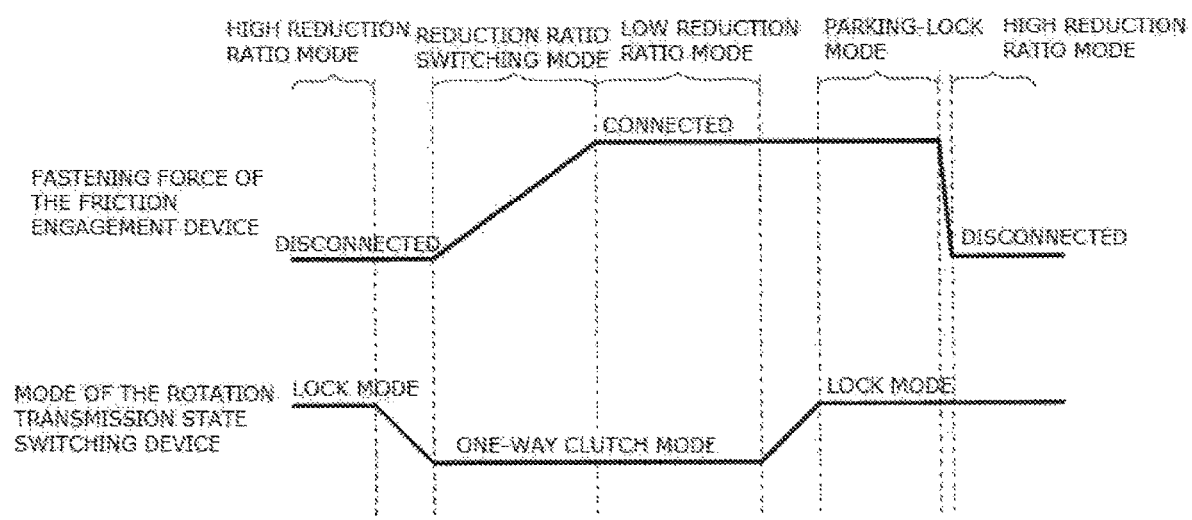
FIG. 19A is graph corresponding to FIG. 16 and is a first modification of the first example.

A first modification and a second modification of the first example of an embodiment of the present invention will be described with reference to FIG. 19A and FIG. 19B.

The rotation transmission state switching device 41 of the first modification (refer to FIG. 11 to FIG. 14) does not have a free mode in which the first member 71 and the second member 72 are able to rotate relative to each other in both directions. In other words, the rotation transmission state switching device 41, as illustrated in FIG. 19A, has a one-way clutch mode in which rotation of the first member 71 with respect to the second member 72 is allowed in only one direction, and a lock mode in which relative rotation of the first member 71 and the second member 72 is not possible. More specifically, by adjusting the installation position in the circumferential direction and the length in the circumferential direction of the protruding portions 96 of the selection plate 77, the rotation transmission state switching device 41 is configured such that it is possible to switch between two modes: the one-way clutch mode and the lock mode.

The two-stage transmission 1 of this first modification, as in the case of the two-stage transmission 1 of the first example, is also able to switch between a high reduction ratio mode, reduction ratio switching mode, a low reduction ratio mode, and a parking-lock mode based on the rotation of one drive cam 50 that is rotated and driven by one electric actuator 58.

In the first modification, the low reduction ratio mode is achieved by connecting the friction engaging device 40 and setting the rotation transmission state switching device 41 to the one-way clutch mode. In other words, after switching the friction engaging device 40 from the disconnected state to the connected state in the reduction ratio switching mode, the rotation transmission state switching device 41 is maintained as is in the one-way clutch mode. Here, in a state in which the rotation transmission state switching device 41 is set to the one-way clutch mode, the second member 72 is allowed to rotate in a specified direction. Therefore, in a case where the input member 2 is rotating in the forward rotation direction, the rotation direction and rotational speed of the sun gear 11, the ring gear 12, and the carrier 13 become the same, the planetary gear mechanism 4 integrally rotates as a whole, and the power of the input member 2 is transmitted as is to the output member 3 without being reduced.

Moreover, when the two-stage transmission 1 is switched to the parking-lock mode by connecting the friction engaging device 40 and setting the rotation transmission state switching device 41 to the lock mode, rotation of the output member 3 (and input member 2) is locked.

Figure 19B:
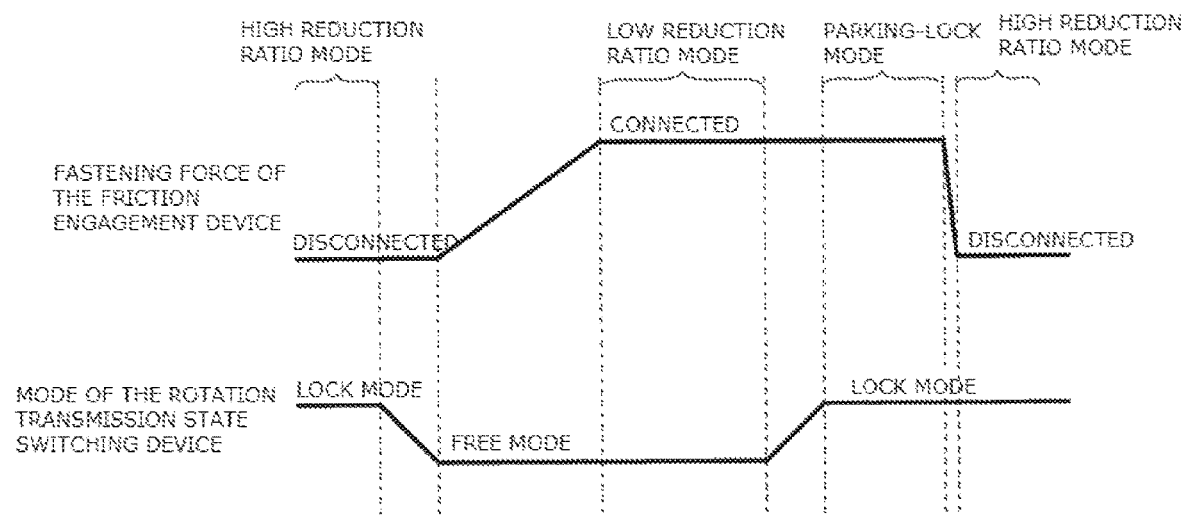
FIG. 19B is graph corresponding to FIG. 16 and is a second modification of the first example.

On the other hand, the rotation transmission state switching device 41 of the second modification illustrated in FIG. 19B does not have a one-way clutch mode in which rotation of the first member 71 with respect to the second member 72 is allowed in only a specified direction. In other words, the rotation transmission state switching device 41 of the second modification has only a free mode in which the first member 71 and the second member 72 are able to rotate relative to each other in both directions, and a lock mode in which relative rotation of the first member 71 and the second member 72 is not possible. More specifically, by adjusting the installation position in the circumferential direction and the length in the circumferential direction of the protruding portions 96 of the selection plate 77, the rotation transmission state switching device 41 is configured such that it is possible to switch between two modes: the free mode and the lock mode.

The two-stage transmission 1 of the second modification does not have a one-way clutch mode, and thus one electric actuator 58 rotates and drives one drive cam 50, which switches between a high reduction ratio mode, low reduction ratio mode, and parking-lock mode. In the second modification, when switching from the high reduction ratio mode to the low reduction ratio mode, the friction engaging device 40 is switched from the disconnected state to the connected state after switching the rotation transmission state switching device 41 from the lock mode to the free mode.

Moreover, in the second modification as well, when the two-stage transmission 1 is switched to the parking-lock mode by connecting the friction engaging device 40 and setting the rotation transmission state switching device 41 to the lock mode, rotation of the output member 3 (and input member 2) is locked.

In the first modification and second modification, by switching between the connected state and the disconnected state of the friction engaging device 40 and switching the rotation transmission state switching device 41 between two modes, it is possible to switch the two-stage transmission 1 among the high reduction ratio mode, reduction ratio switching mode, low reduction ratio mode, and parking-lock mode. Therefore, with the two-stage transmission 1 of the first modification and second modification, it is possible to simplify control compared with the two-stage transmission 1 of the first example.

Second Example

Figure 20:
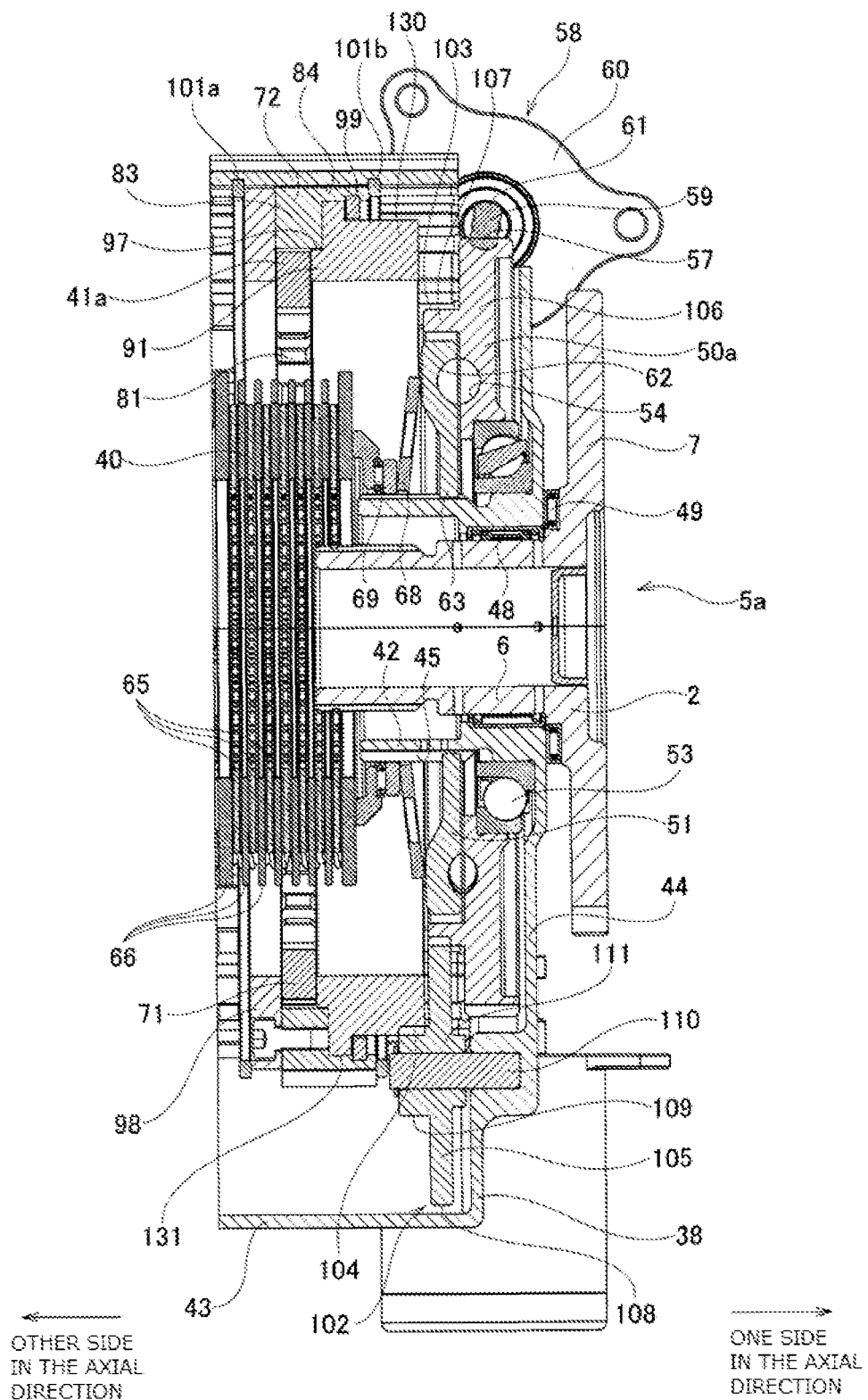
FIG. 20 is a cross-sectional view of the power transmission path switching device in a second example of an embodiment of the present invention.
Figure 21:
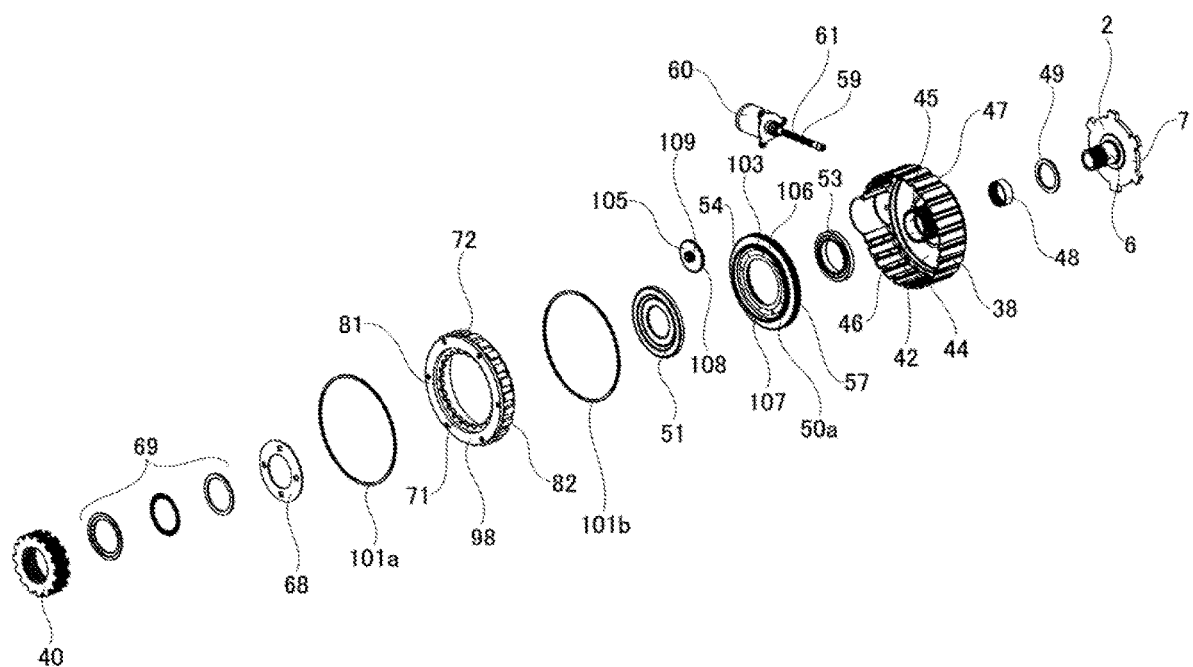
FIG. 21 is an exploded perspective view of the power transmission path switching device in the second example.
Figure 22:
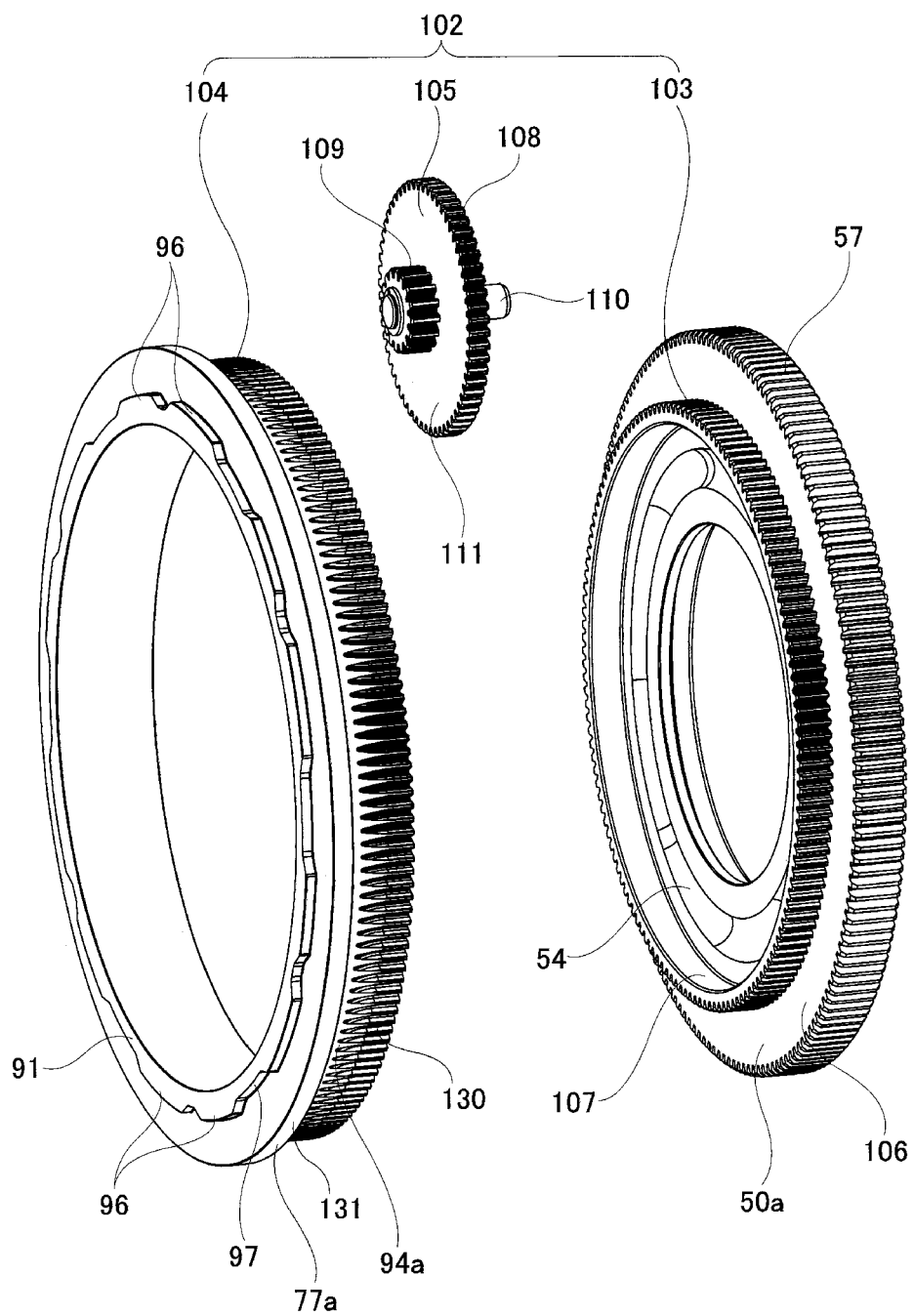
FIG. 22 is an exploded perspective view of a drive cam, a two-stage gear, and a selection plate in the second example.
Figure 23A:
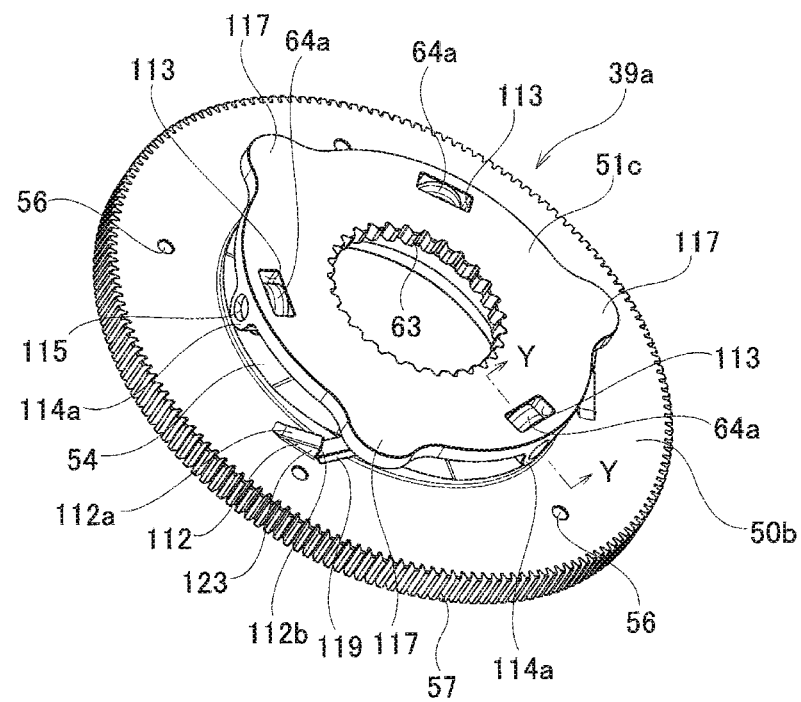
FIG. 23A is a perspective view of a cam device in a third example, and illustrates a state in which a stopper piece comes in contact with a protrusion.
Figure 23B:
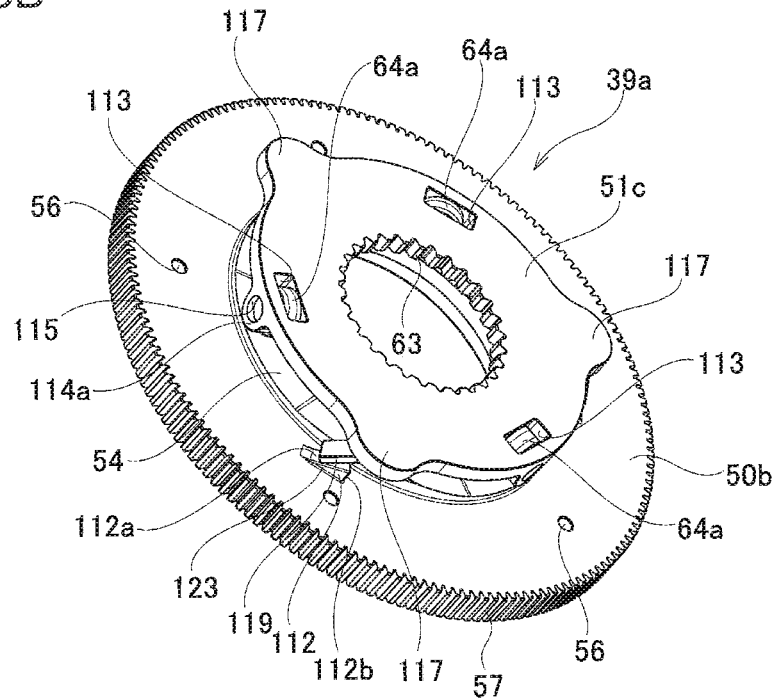
FIG. 23B is a perspective view of the cam device in the third example, and illustrates a state in which a stopper piece rides over a protrusion.
Figure 24:
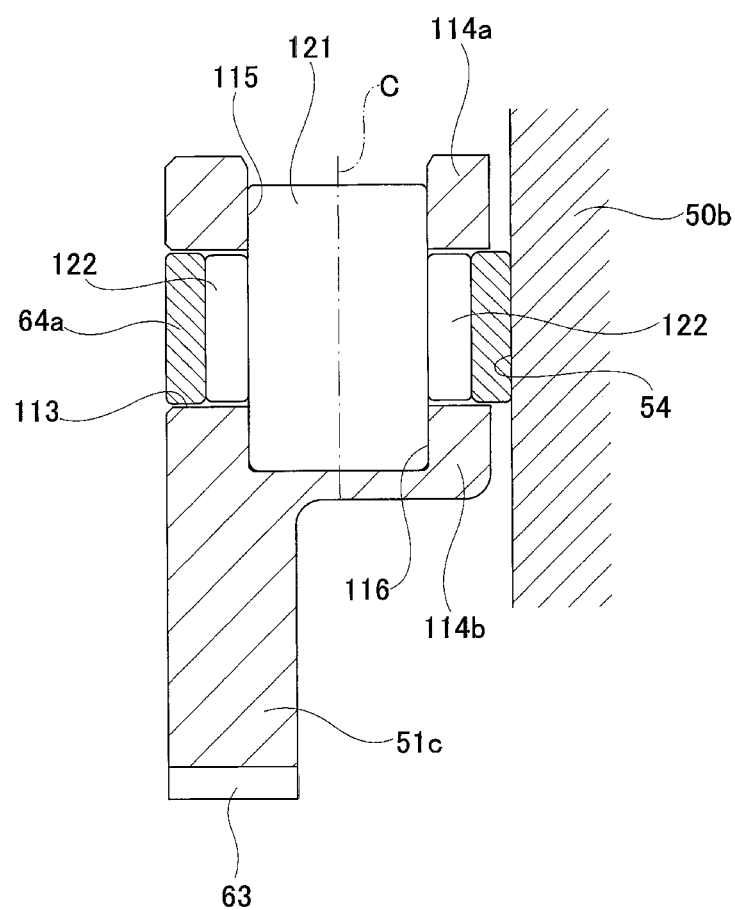
FIG. 24 is a cross-sectional view of section Y-Y in FIG. 23A.
Figure 25:
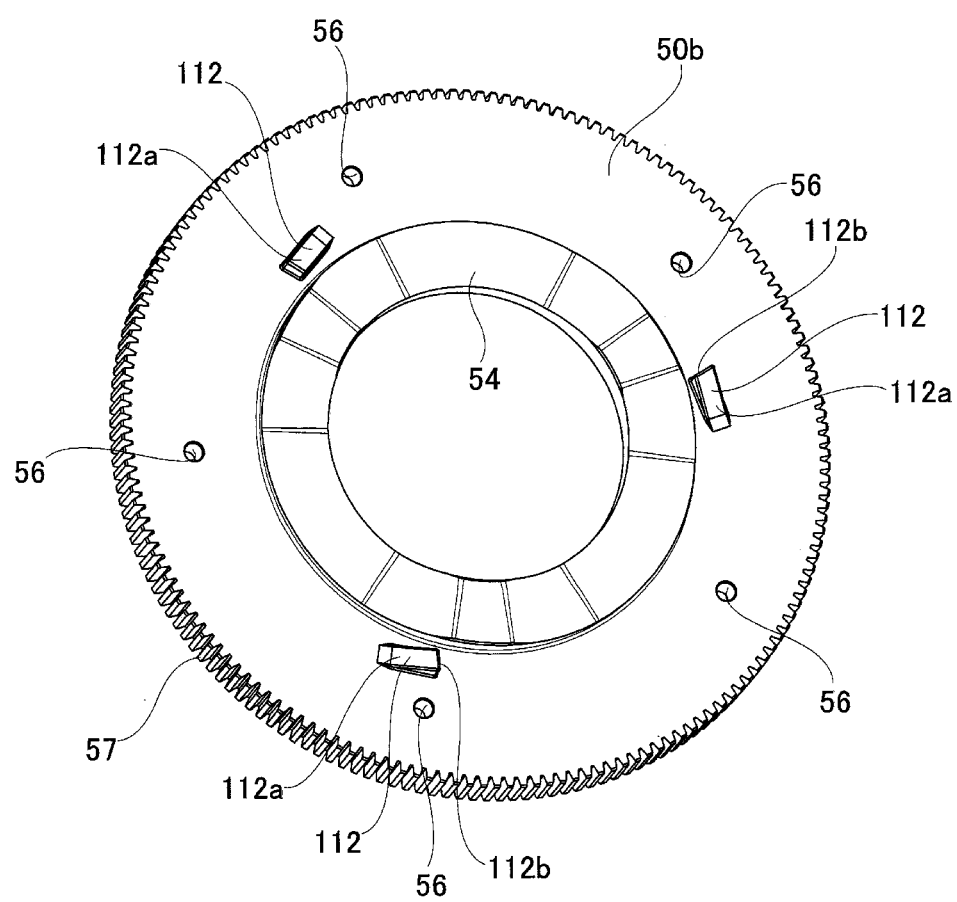
FIG. 25 is a perspective view of a drive cam in the third example.
Figure 26:
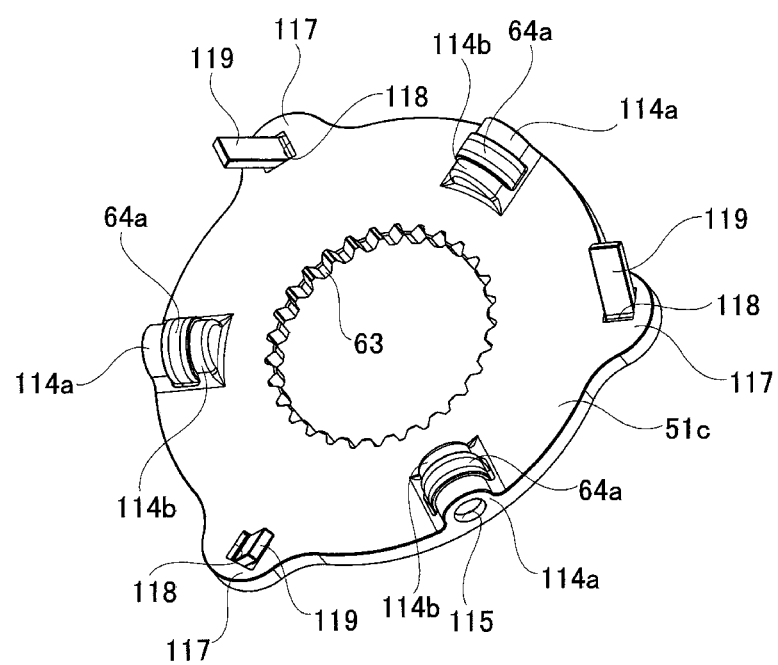
FIG. 26 is a perspective view of a driven cam in the third example.
Figure 27:
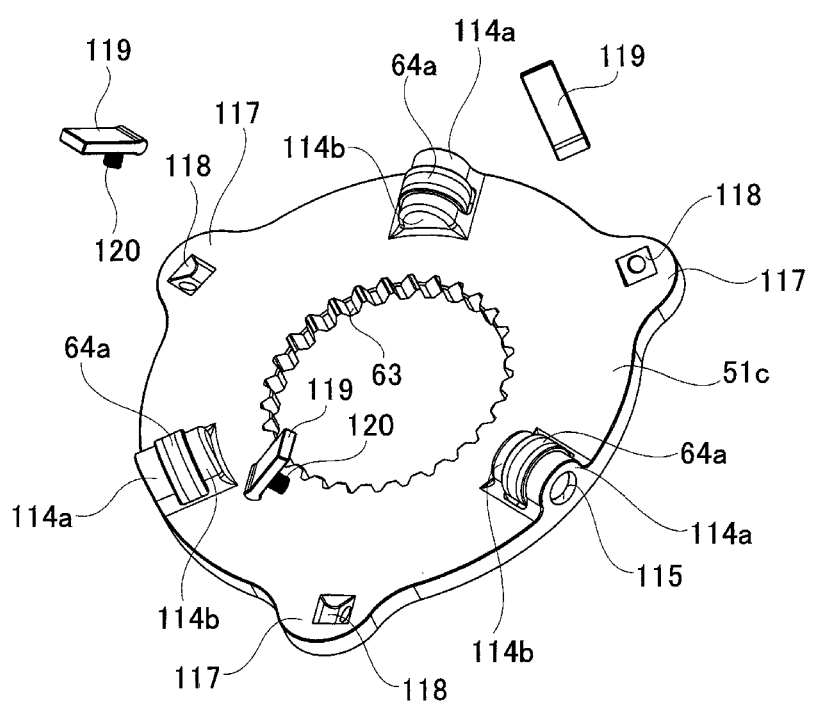
FIG. 27 is a partial exploded perspective view of the driven cam in the third example.

FIG. 20 to FIG. 22 illustrate a second example of an embodiment of the present invention. A power transmission path switching device 5*a* of the present example includes a speed reducer 102 between a drive cam 50*a* and selection plate 77*a*. The speed reducer 102 reduces the rotational speed of the drive cam 50*a* and transmits the rotation of the drive cam 50*a* to the selection plate 77*a*. In other words, the power transmission path switching device 5*a* of the present example does not include engaging pins 52 that span between the drive cam 50 and the selection plate 77 as in the first example, but is configured so as to transmit the rotation of the drive cam 50*a* to the selection plate 77*a* by through the speed reducer 102.

The speed reducer 102 includes a cam-side gear portion 103 that is provided on the drive cam 50a, a plate-side gear portion 104 that is provided on the selection plate 77a, and a two-stage gear 105.

The drive cam 50a has a substantially circular plate shape and includes a base portion 106 that has a drive cam surface 54 in a portion on an inner side in the radial direction of the other side in the axial direction, and a cylindrical portion 107 that protrudes around the entire circumference from an intermediate portion in the radial direction of a surface on the other side in the axial direction of the base portion 106 toward the other side in the axial direction. Furthermore, the drive cam 50a has the cam-side gear portion 103 on the outer-circumferential surface of the cylindrical portion 107 around the entire circumference.

The selection plate 77a includes a base portion 94a having a stepped cylindrical shape, and a ring-shaped convex portion 91 that protrudes around the entire circumference from an intermediate portion in the radial direction of a surface on the other side in the axial direction of the base portion 94a toward the other side in the axial direction. The base portion 94a has a small-diameter portion 130 on the one side in the axial direction and a large-diameter portion 131 on the other side in the axial direction. In the present example, the selection plate 77a has the plate-side gear portion 104 on the outer-circumferential surface of the small-diameter portion 130 around the entire circumference. In the present example, the plate-side gear portion 104 has a pitch-circle diameter that is larger than the pitch-circle diameter of the cam-side gear portion 103, and has a larger number of teeth than the number of teeth of the cam-side gear portion 103.

The two-stage gear 105 has a first gear portion 108 that engages with the cam-side gear portion 103, and a second gear portion 109 that engages with the plate-side gear portion 104. The first gear portion 108 has a pitch-circle diameter that is larger than the pitch-circle diameter of the second gear portion 109, and has a larger number of teeth than the number of teeth of the second gear portion 109. The two-stage gear 105 of the present example includes a center shaft 110 that is supported with respect to a housing 38a, and a main portion 111 that has the first gear portion 108 around the entire circumference of an outer-circumferential surface of a portion on the one side in the axial direction, has the second gear portion 109 around the entire circumference of an outer-circumferential surface of a portion on the other side in the axial direction, and is rotatably supported around the center shaft 110.

With the power transmission path switching device 5a of the present example, it is possible to suitably maintain an allowable load torque of the rotation transmission state switching device 41a even without using a particularly high-output motor as the gear-shift motor 60. The reason for this will be described in comparison with the power transmission path switching device 5 of the first example.

In the power transmission path switching device 5 of the first example, in order to suitably maintain the allowable load torque of the rotation transmission state switching device 41, increasing the number of first pawl members 73 and second pawl members 74 is effective. However, in a case of a large number of first pawl members 73 and second pawl members 74, the rotation angle of the drive cam 50 when switching between the first mode and the second mode is reduced. In a case where the rotation angle of the drive cam 50 when switching modes is reduced, in order to sufficiently maintain the coupling force of the friction engaging device 40 by sufficiently maintaining the amount of displacement (stroke) of the driven cam 51 in the axial direction, it is necessary to increase the angle of inclination (lead angle) of the gently sloping surface portions 54b of the drive cam 54 and/or the gently sloping surface portions 62b of the driven cam surface 62 with respect to a virtual plane that is orthogonal to the center axis of the cam device 39. However, in a case where the angle of inclination of the gently sloping surface portions 54b and/or the gently sloping surface portions 62b is increased, it is necessary to use a motor having a high output as the gear-shift motor 60 in order for the rolling bodies 64 to roll smoothly between the drive cam surface 54 and the driven cam surface 62.

On the other hand, the power transmission path switching device 5a of this example includes a speed reducer 102 between the drive cam 50a and the selection plate 77a. Therefore, the rotation angle of the selection plate 77a per rotation of the drive cam 50a can be made less than the rotation angle of the driven cam 51a per rotation of the drive cam 50a. Accordingly, in order to suitably maintain the allowable load torque of the rotation transmission state switching device 41a, even in a case where there is a large number of first pawl members 73 and second pawl members 74, it is not necessary to increase the angle of inclination of the gently sloping surface portions 54 and/or gently sloping surface portions 62b in order to suitably maintain the amount of displacement in the axial direction of the driven cam 51. That is, it is not necessary to specially use a motor having high output as the gear-shift motor 60. The configuration and operational effects of the other portions are the same as in the first example.

Third Example

A third example of an embodiment of the present invention will be described using FIG. 23A to FIG. 28. In this example, the structure of the cam device 39a of the control device is changed from the structure of the cam device 39 in the first example. The cam device 39a includes a drive cam 50b, a driven cam 51c, a plurality of engaging pins 52 (refer to FIG. 5 to FIG. 7), and a plurality (three in the illustrated example) of rolling bodies 64a. Particularly, in the present example, rollers are used as the rolling bodies 64a. Moreover, the cam device 39a has a lock release prevention mechanism 123 that prevents switching from a state in which the friction engaging device 40 (refer to FIG. 2 and FIG. 5) is connected and the rotation transmission state switching device 41 is set to the lock mode, or in other words, from a state in which the two-stage transmission 1 is set to the parking-lock mode to a state in which the rotation transmission state switching device 41 is set to the one-way clutch mode with the friction engaging device 40 connected as is.

The drive cam 50b is configured into a hollow circular plate shape and has a drive cam surface 54 with the same number of concave portions and convex portions alternately arranged in the circumferential direction in a portion on an inner side in the radial direction of a surface on the other side in the axial direction. Moreover, the drive cam 50b has cam-side engaging holes 56 that open to a surface on the other side in the axial direction at a plurality of locations uniformly spaced in the circumferential direction of a portion on the outer side in the radial direction, and has a wheel gear portion 57 on an outer circumferential surface. Furthermore, the drive cam 50b has protrusions 112 that protrude toward the other side in the axial direction at a plurality of locations (three locations in the illustrated example) in the circumferential direction of an intermediate portion in the radial direction of a surface on the other side in the axial direction.

Each protrusion 112 has a substantially right-angled triangular side surface shape as viewed in the radial direction. In other words, each protrusion 112 has a gently sloping surface portion 112a on a surface on one side in the circumferential direction that is inclined in a direction going toward the other side in the axial direction while going from the one side toward the other side in the circumferential direction, and has a stopper surface portion 112b that is nearly orthogonal to a portion of a surface on the other side in the axial direction of the drive cam 50b that is separated from the drive cam surface 54, cam-side engaging hole 56, and protrusion 112.

The drive cam 50b is supported by an outer-circumferential surface of an end portion on the one side in the axial direction of the inner-diameter-side cylindrical portion 42 of the housing 38 (refer to FIG. 2 and FIG. 5) by way of an angular ball bearing 53, and is supported so as to be able to rotate but not be able to displace in the axial direction.

The driven cam 51c is configured into a substantially circular plate shape, and has rectangular holes 113 at a plurality of locations in the circumferential direction (three locations uniformly spaced in the circumferential direction in the illustrated example) of a portion on an outer side in the radial direction, and that penetrate through the driven cam 51c in the axial direction, and the driven cam 51c has support plate portions 114a, 114b having a substantially semi-circular plate shape that protrude toward the one side in the axial direction from portions on both sides in the radial direction of each rectangular hole 113. Of the support plate portions 114a, 114b, the support plate portion 114a on the outer side in the radial direction includes a support hole 115 that is a circular hole penetrating in the radial direction, and the support plate portion 114b on the inner side in the radial direction includes a concave support portion 116 having a circular opening.

The driven cam 51c has ear portions 117 at a plurality of locations in the circumferential direction (three locations in the illustrated example) that protrude farther toward the outer side in the radial direction than portions adjacent on both sides in the circumferential direction, and has concave portions 118 on a surface on the one side in the axial direction of the ear portions 117 that are recessed toward the other side in the axial direction. A rectangular flat plate-shaped stopper piece 119 is supported in each concave portion 118 so as to be able to pivot about a base-end portion thereof. More specifically, the base-end portion of the stopper piece 119 is supported by the inner surface of the concave portion 118 so as to be able to pivot about a pivot shaft that extends in the radial direction centered on the center axis of the driven cam 51c. Moreover, a biasing member 120 is held between a bottom surface of the concave portion 118 and the stopper piece 119. As a result, the tip-end portion of the stopper piece 119 is elastically biased in a direction such that the angle between the stopper piece 119 and a surface on the one side in the axial direction of the driven cam 51c increases. Note that the biasing member 120 may be configured by a torsion coil spring, a plate spring, or an elastomer such as rubber.

The driven cam 51c is supported by the driven-side female spline portion 63 provided on the inner-circumferential surface engaging with the stationary-side male spline portion 45 of the housing 38 with a spline engagement so that displacement is only possible in the axial direction with respect to the housing 38.

Each of the rolling bodies 64a has a cylindrical shape and is supported by way of a circular column shaped support shaft 121 and plurality of rollers 122 so as to be able to freely roll with respect to the support plate portions 114a, 114b of the driven cam 51c. In other words, an end portion on the one side in the axial direction of the support shaft 121 (end portion on the outer side in a radial direction centered on the center axis of the driven cam 51c) is internally fitted in the support hole 115 of the support plate portion 114a on the outer side in the radial direction, and an end portion on the other side in the axial direction of the support shaft 121 (end portion on the inner side in the radial direction centered on the center axis of the driven cam 51c) is internally fitted in the concave support portion 116 of the support plate portion 114b on the inner side in the radial direction. The plurality of rollers 122 are held between an inner-circumferential surface of the rolling body 64a and an outer-circumferential surface of an intermediate portion in the axial direction of the support shaft 121. As a result, the rolling body 64a is supported by the driven cam 51c so as to be able to freely rotate (revolve) about a rotation axis C directed in the radial direction centered on the center axis of the driven cam 51c.

In a state in which the rolling body 64a is supported by the driven cam 51c, a portion on the other side in the axial direction of the rolling body 64a is arranged on the inner side of the rectangular hole 113. Moreover, the outer-circumferential surface of each rolling body 64a comes in rolling contact with the drive cam surface 54 that is provided on a surface on the other side in the axial direction of the drive cam 50b.

In the present example, rollers are used as the rolling bodies 64a, and the rolling bodies 64a are supported by the driven cam 51c so as to be able to freely rotate (revolve) about the rotation axis C directed in the radial direction centered on the center axis of the driven cam 51c. Therefore, it is possible to reliably displace the driven cam 51c in the axial direction by rotating the drive cam 50b. In other words, in the cam device 39 of the first example, balls are used as the rolling bodies 64, and thus when the drive cam 50 is rotated, there is a possibility that slippage will occur at areas of rolling contact between the surfaces of the rolling bodies 64 and the drive cam surface 54 and/or the driven cam surface 62. In a case where slippage occurs at areas of rolling contact between the surfaces of the rolling bodies 64 and the drive cam surface 54 and/or driven cam surface 62, there is a possibility that the driven cam 51 will not be able to displace in the axial direction, and thus it may not be possible to sufficiently maintain displacement in the axial direction of the driven cam 51 with respect to the amount of rotation of the drive cam 50.

In the present example, rollers having a cylindrical shape are used as the rolling bodies 64a, and the rolling bodies 64a are supported so as to be able to freely roll by the driven cam 51c that does not rotate during operation. Therefore, in a case where the drive cam 50b is rotated, slippage at the areas of rolling contact between the outer-circumferential surfaces of the rolling bodies 64a and the drive cam surface 54 is reliably prevented, and thus it is possible to reliably displace the driven cam 51c in the axial direction based on rotating the drive cam 50b. As a result, it is possible to reliably perform switching of modes of the power transmission path switching device 5 (refer to FIG. 2 and FIG. 5).

In the present example, protrusions 112 are provided on the drive cam 50b, stopper pieces 119 are pivotally supported by the driven cam 51c, and the biasing members 120 bias the tip-end portions of the stopper pieces 119. Therefore, switching from a state in which the friction engaging device 40 is connected and the rotation transmission state switching device 41 is set to the lock mode to a state in which the friction engaging device 40 remains connected as is and the rotation transmission state switching device 41 is changed from the lock mode to the one-way clutch mode is prevented.

Figure 28:
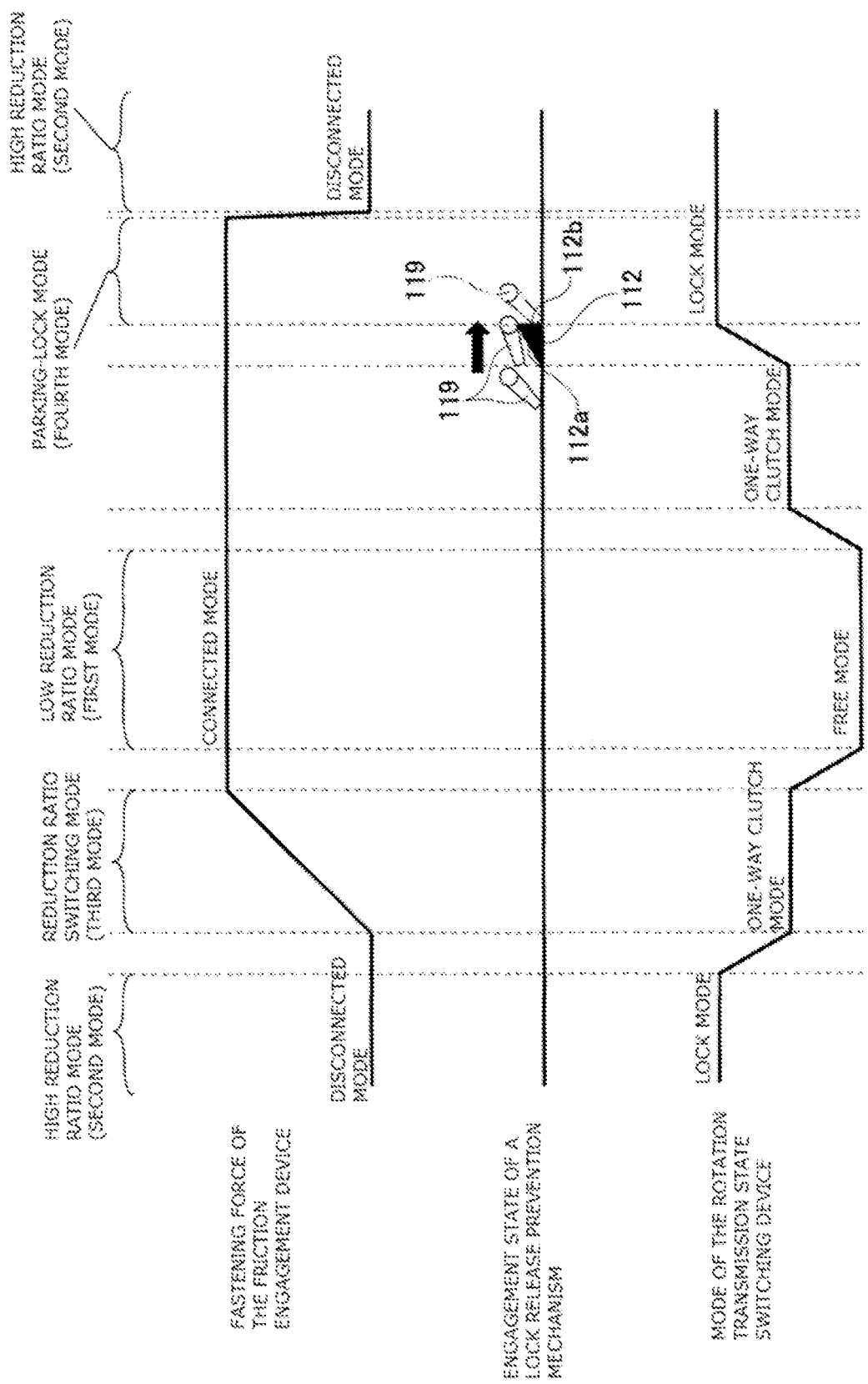
FIG. 28 is a graph schematically illustrating the disconnected/connected state of the friction engaging device, the engagement state of a lock release prevention mechanism, and the modes of the rotation transmission state switching device in the third example.

In other words, as indicated by the two-dot chain line in FIG. 28, when a force is applied to the drive cam 50b in a direction to switch the rotation transmission state switching device 41 from the lock mode to the one-way clutch mode in a state in which the shift lever is shifted to select the P range, for example, and the two-stage transmission 1 (refer to FIG. 1 and FIG. 2) is switched to the parking-lock mode, the stopper surface portions 112b of the protrusions 112 provided on the drive cam 50b come in contact with the tip-end portions of the stopper pieces 119 that are supported by the driven cam 51c. As a result, the drive cam 50b is prevented from further rotating with respect to the driven cam 51c, and the rotation transmission state switching device 41 is prevented from switching to the one-way clutch mode.

Therefore, in the present example, the lock release prevention mechanism 123 is configured by the protrusions 112, the stopper pieces 119, and the biasing members 120, for preventing switching from a state in which the friction engaging device 40 is connected and the rotation transmission state switching device 41 is set to the lock mode to a state in which the friction engaging device 40 remains connected as is and the rotation transmission state switching device 41 is changed from the lock mode to the one-way clutch mode.

On the other hand, as illustrated by the arrow in FIG. 28, when leaving the friction engaging device 40 connected as is and switching the rotation transmission state switching device 41 from the one-way clutch mode to the lock mode in order to switch the two-stage transmission 1 to the parking-lock mode, the protrusions 112 provided on the drive cam 50b ride over the stopper pieces 119 while the gently sloping surface portions 112a press base-end-side portions of the stopper pieces 119 against the elastic form of the biasing members 120. In this way, the drive cam 50b is allowed to rotate with respect to the driven cam 51c in a direction that switches the rotation transmission state switching device 41 from the one-way clutch mode to the lock mode.

Note that in a state in which the stopper surface portions 112b of the protrusions 112 provided on the drive cam 50b are in contact with the tip-end portions of the stopper pieces 119 supported by the driven cam 51c, the zero-point of the drive cam 50b can also be corrected.

In the two-stage transmission 1, by changing the rotation phase of the drive cam 50b, it is possible to switch the disconnected/connected state of the friction engaging device 40 and switch the mode of the rotation transmission state switching device 41, and thus it is possible to switch the mode of the two-stage transmission 1. Here, the rotation phase of the drive cam 50b is controlled according to information from an encoder and/or the number of steps of the gear-shift motor 60.

However, when slippage occurs at the areas of rolling contact between the drive cam surface 54 and the rolling bodies 64a, there is a possibility that a difference will occur between the mode of the rotation transmission state switching device 41 estimated according to the rotation phase of the drive cam 50 and the actual mode of the rotation transmission state switching device 41. Such a difference will increase over time.

Therefore, by correcting the zero-point of the drive cam 50b by the stopper surface portions 112b of the protrusions 112 provided on the drive cam 50b coming in contact with the tip-end portions of the stopper pieces 119 supported by the driven cam 51c in a state in which the two-stage transmission 1 is switched to the parking-lock mode, it is possible to suppress an increase in the difference. The configuration and operational effects of the other portions are the same as in the first example.

Fourth Example

Figure 29:
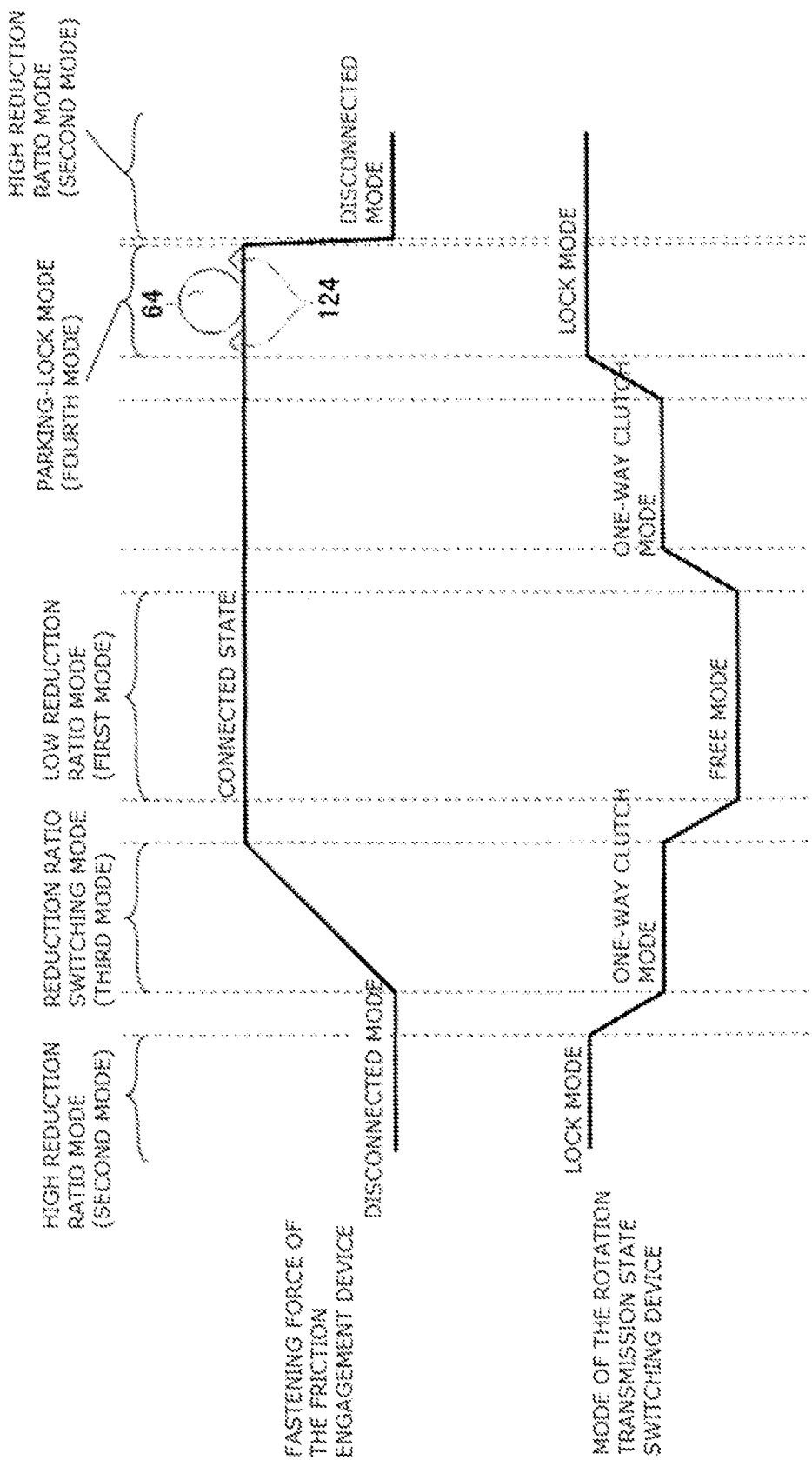
FIG. 29 is a graph schematically illustrating the disconnected/connected state and cam stroke of the friction engaging device and the modes of the rotation transmission state switching device in a fourth example of an embodiment of the present invention.

A fourth example of an embodiment of the present invention will be described using FIG. 29. In this example, by devising the shape of the drive cam surface 54 provided on the drive cam 50 (refer to FIG. 2, FIG. 5 to FIG. 7, and FIG. 9), accidentally switching from a state in which the two-stage transmission 1 (refer to FIG. 1 and FIG. 2) is set to the parking-lock mode to a state in which the friction engaging device 40 is disconnected or the rotation transmission state switching device 41 is switched to the one-way clutch mode is prevented.

More specifically, convex portions 124 that protrude toward the other side in the axial direction are provided on both sides in the circumferential direction of portions of the flat surface portions 54a of the drive cam surface 54 where the rolling bodies 64 are located in a state in which the two-stage transmission 1 is set to the parking-lock mode. The convex portions 124 have a height in the axial direction that allows the rolling bodies 64 to ride over the convex portions 124 due to the electric actuator 58 rotating and driving the drive cam 50.

With the present example, when in a state in which the two-stage transmission 1 is switched to the parking-lock mode and a force is applied that tries to rotate the drive cam 50, the rolling bodies 64 interfere with (get caught on) the convex portions 124. As a result, the rolling bodies 64 are prevented from accidentally rolling, and thus the friction engaging device 40 is prevented from being accidentally disconnected, and the rotation transmission state switching device 41 is prevented from being accidentally switched to the one-way clutch mode.

Note that the convex portions 124 for preventing the rolling bodies 64 from accidentally rolling may be provided on the driven cam surface 62 of the driven cam 51 instead of or in addition to being provided on the drive cam surface 54 of the drive cam 50. Moreover, the construction of the present example can be implemented in combination with the lock release prevention mechanism 123 of the third example. The configuration and operational effects of the other portions are the same as in the first example.

Fifth Example

Figure 30:
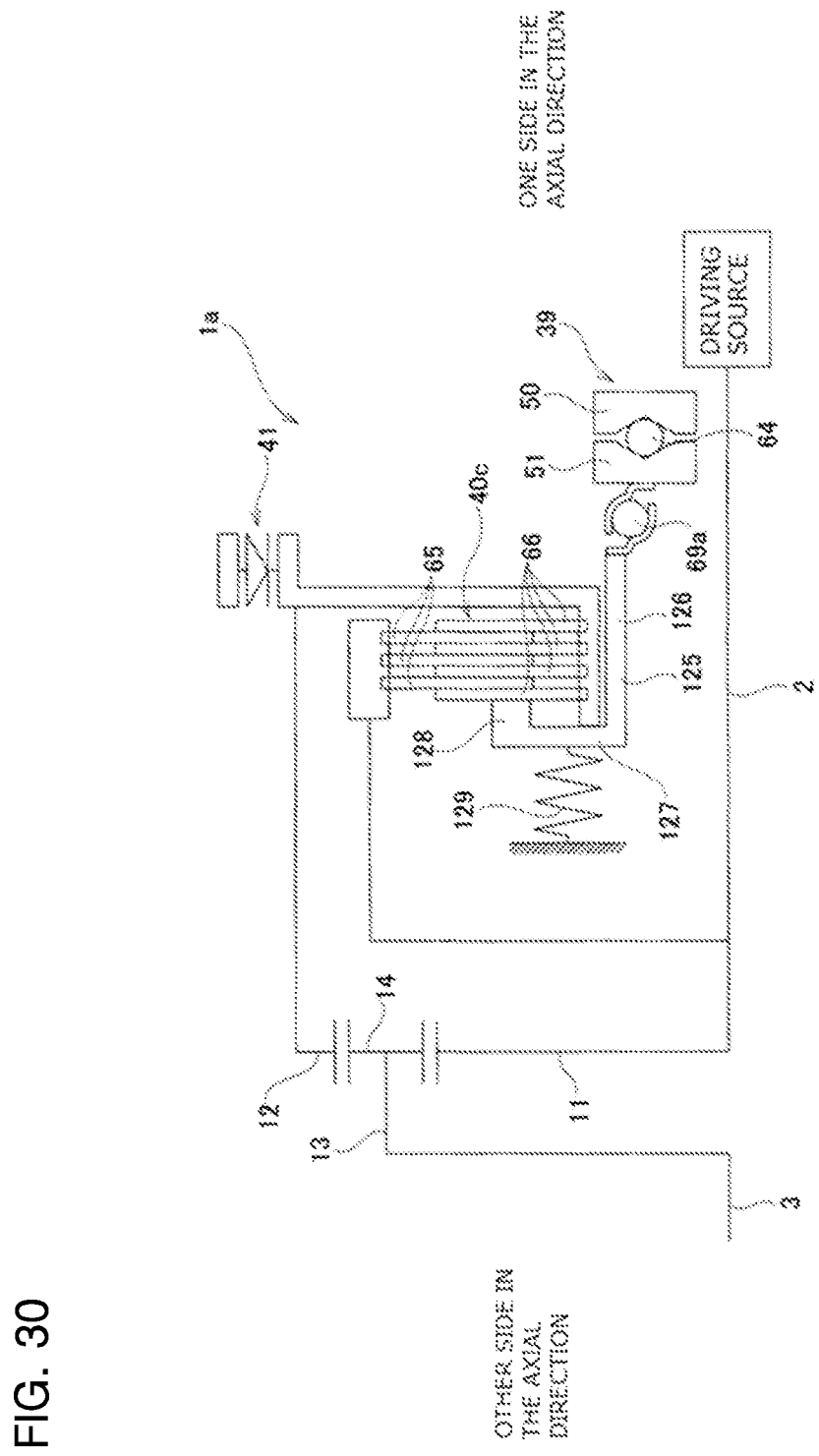
FIG. 30 is a schematic view illustrating the two-stage transmission in a fifth example of an embodiment of the present invention.

A fifth example of an embodiment of the present invention will be described using FIG. 30 to FIG. 31B. In the two-stage transmission 1a of this example, a so-called normally-closed type clutch is used as a friction engaging device 40c of a power transmission path switching device 5b, and in the stand-alone state, the friction engaging device 40c is connected in a state in which electric power to the electric actuator 58 (refer to FIG. 1 and FIG. 2) is stopped, and is disconnected by supplying electric power to the electric actuator 58 and widening a gap in the axial direction between the drive cam 50 and the driven cam 51. The friction engaging device is arranged between the sun gear 11 and the ring gear 12.

The friction engaging device 40c has a plurality each of friction plates 65 and separation plates 66. Each of the friction plates 65 is supported by the sun gear 11 so as to be able to displace in only the axial direction. Each of the separation plates 66 is supported by the ring gear 12 so as to be able to displace in only the axial direction.

The friction engaging device 40c is switched to the disconnected/connected state by the cam device 39 pressing the separation plate 66 farthest on the other side in the axial direction in a direction toward the one side in the axial direction by way of a pressing member 125, or by releasing the pressing force. The pressing member 125 has a cylindrical portion 126 that is supported around the input member 2 so as to be able to freely rotate with respect to the input member 2, a flange portion 127 that is bent from an end portion on the other side in the axial direction of the cylindrical portion 126 toward the outer side in the radial direction, and a plate pressing portion 128 that is bent from an end portion on an outer side in the radial direction of the flange portion 127 toward the one side in the axial direction.

A thrust rolling bearing 69a is held between an end portion on the one side in the axial direction of the cylindrical portion 126 and the driven cam 51. In other words, the cam device 39 is able to press the pressing member 125 toward the other side in the axial direction by way of the thrust rolling bearing 69a. An elastic member 129 is held between a surface on the other side in the axial direction of the flange portion 127 and a portion fixed to the housing 38 (refer to FIG. 1 and FIG. 2). The elastic member 129 elastically biases the pressing member 125 toward the one side in the axial direction. The elastic member 129 can be configured by a disc spring, a torsion coil spring, or the like. Moreover, a tip-end portion of the plate pressing portion 128 (end portion on the one side in the axial direction) faces a surface on the other side in the axial direction of the separation plate 66 farthest on the other side in the axial direction.

The friction engaging device 40c is switched to the disconnected/connected state by the driven cam 51 being displaced in the axial direction due to the electric actuator 58 rotating and driving the drive cam 50.

Figure 31A:
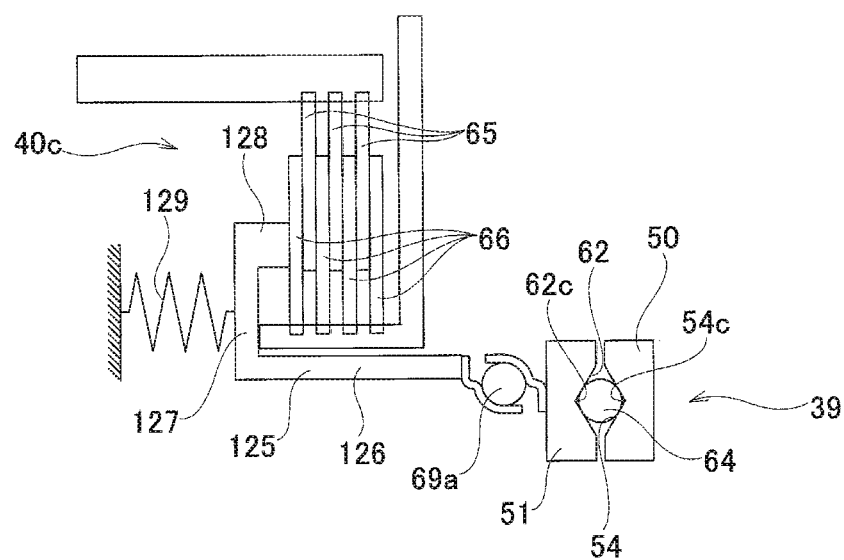
FIG. 31A is a schematic diagram of the friction engaging device and cam device in the fifth example, and illustrates a state in which the friction engaging device is connected.

As illustrated in FIG. 31A, to connect the friction engaging device 40c, the rolling bodies 64 are caused to move to the bottom portions 54c of the drive cam surface 54 and to the bottom portions 62c of the driven cam surface 62, which causes the driven cam 51 to displace in a direction (toward the one side in the axial direction) that reduces the gap in the axial direction between the driven cam 51 and the drive cam 50. As a result, the action of the elastic member 129 elastically presses the pressing member 125 toward the one side in the axial direction, and the tip-end portion of the plate pressing portion 128 presses the separation plate 66 farthest on the other side in the axial direction toward the one side in the axial direction. As a result, the friction engaging device 40 is connected (the coupling force of the friction engaging device 40 is increased) by the friction plates 65 and the separation plates 66 being pressed against each other.

Figure 31B:
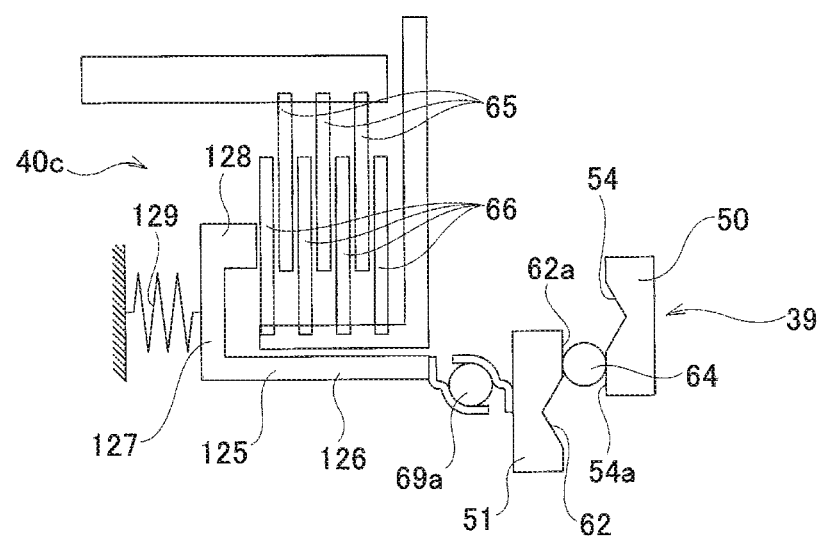
FIG. 31B is a schematic diagram of the friction engaging device and cam device in the fifth example, and illustrates a state in which the friction engaging device is disconnected.

As illustrated in FIG. 31B, to disconnect the friction engaging device 40c, the rolling bodies 64 are caused to move to the flat surface portions 54a of the drive cam surface 54 and to the flat surface portions 62a of the driven cam surface 62, which causes the driven cam surface 51 to displace in a direction (toward the other side in the axial direction) that increases the gap in the axial direction between the driven cam 51 and the drive cam 50. As a result, the driven cam 51 presses the pressing member 125 toward the other side in the axial direction against the elastic force of the elastic member 129. As a result, the force pressing the friction plates 65 and the separation plates 66 against each other is released and the friction engaging device 40 (the coupling force of the friction engaging device 40 is lost) is disconnected by the action of the return spring 70 (refer to FIG. 8) increasing the gap between the separation plate 66 farthest on the one side in the axial direction and the separation plate 66 farthest on the other side in the axial direction.

In this example as well, by causing the driven cam 51 to displace in the axial direction due to the electric actuator 58 rotating and driving the drive cam 50, the mode of the rotation transmission state switching device 41 is switched at the same time that the friction engaging device 40 is switched to the disconnected/connected state. By switching the disconnected/connected state of the friction engaging device 40c and the mode of the rotation transmission state switching device 41, it is possible to switch the operating mode of the power transmission path switching device 5 and to switch the two-stage transmission 1a among the low reduction ratio mode, high reduction ratio mode, reduction ratio switching mode, and parking-lock mode.

In the present example, a normally-closed type clutch is used as the friction engaging device 40c, and thus it is easier to increase the efficiency of the two-stage transmission 1a and to make the two-stage transmission 1a more compact. Note that it is also possible to apply the lock release prevention mechanism 123 of the third example and/or the convex portions 124 of the fourth example to the two-stage transmission 1a of the present example. The configuration and operational effects of the other portions are the same as in the first example.

The first to fifth examples of embodiments described above can be implemented in combination as long as no contradiction occurs.

REFERENCE SIGNS LIST 1, 1a Two-stage transmission
2 Input member
3 Output member
4 Planetary gear mechanism
5a, 5z Power transmission path switching device
6 Input cylindrical portion
7 Input flange portion
8 Female spline portion
9 Output cylindrical portion
10 Output flange portion
11 Sun gear
12 Ring gear
13 Carrier
14 Pinion gear
15 Small-diameter cylindrical portion
16 Large-diameter cylindrical portion
17 Flange portion
18 Sun-side male spline portion
19 Gear portion
20 Small-diameter cylindrical portion
21 Large-diameter cylindrical portion
22 Annular portion
23 Ring-side male spline portion
24 Gear portion
25b Rim portion
26 Column portion
27 Cylindrical portion
28a, 28b Circular hole
29 Carrier-side female spline portion 30 Support shaft
31 Main portion
32 Radial needle bearing
33 Gear portion
34a, 34b Retaining ring
35 Spacer
36a, 36b Thrust bearing
37 Pressure plate
38 Housing
39, 39a, 39z Cam device
40c Friction engaging device
40a First friction engaging device
40b Second friction engaging device
41, 41a Rotation transmission state switching device
42 Inner-diameter-side cylindrical portion
43 Outer-diameter-side cylindrical portion
44 Side plate portion
45 Stationary-side male spline portion
46 Stationary-side female spline portion
47 Through hole
48 Radial needle bearing
49 Thrust needle bearing
50a, 50b, 50z Drive cam
51, 51c Driven cam
51a First driven cam
51b Second driven cam
52 Engaging pin
53 Angular ball bearing
54 Drive cam surface
54a Flat surface portion
54b Gently sloping surface portion
54c Bottom portion
54d Steep sloping surface portion
56 Cam-side engaging hole
57 Wheel gear portion
58 Electric actuator
59 Worm
60 Gear-shift motor
61 Worm gear portion
62 Driven cam surface
62a Flat surface portion
62b Gently sloping surface portion
62c Bottom portion
62d Steep sloping surface portion
63 Driven-side female spline portion
64, 64a Rolling body
65a Friction plate
66, 66a Separation plate
67 Retaining ring
68 Elastic member
69 Thrust rolling bearing
70 Return spring
71 First member
72 Second member
73 First pawl member
74 Second pawl member
75 First pawl biasing member
76 Second pawl biasing member
77, 77a selection plate
78 Concave engaging portion
79 Convex portion
80 Concave-convex portion
81 Female spline portion
82 Male spline portion
83 Base portion
84 Cylindrical portion
85 First concave holding portion
86 Second concave holding portion
87a, 87b Spring holding portion
88a, 88b Seat portion
89 First base portion
90 First engaging pawl
91 Ring-shaped convex portion
92 Second base portion
93 Second engaging pawl
94, 94a Base-plate portion
95 Plate-side engaging hole
96 Protruding portion
97 Concave-convex portion
98 Cover
99 Retaining ring
101a, 101b Retaining ring
102 Speed reducer
103 Cam-side gear portion
104 Plate-side gear portion
105 Two-stage gear
106 Base portion
107 Cylindrical portion
108 First gear portion
109 Second gear portion
110 Center axis
111 Main portion
112 Protrusion
112a Gently sloping surface portion
112b Stopper surface portion
113 Rectangular hole
114a, 114b Support plate portion
115 Support hole
116 Concave support portion
117 Ear portion
118 Concave portion
119 Stopper piece
120 Biasing member
121 Support shaft
122 Roller
123 Lock release prevention mechanism
124 Convex portion
125 Pressing member
126 Cylindrical portion
127 Flange portion
128 Plate pressing portion
129 Elastic member
130 Small-diameter portion
131 Large-diameter portion

The invention claimed is:

1. A power transmission path switching device, comprising:
a friction engaging device comprising at least one each of a friction plate and a separation plate that are supported so as to be able to displace in an axial direction relative to each other, and configured so as to be connected by pressing the friction plate and the separation plate against each other, and to be disconnected by releasing a force pressing the friction plate and the separation plate against each other;
a rotation transmission state switching device comprising a first member and a second member arranged coaxial with each other, and having:
at least one mode of a free mode in which, regardless of a relative rotational direction of the first member and the second member, rotation of the first member with respect to the second member is allowed; and a one-way clutch mode in which rotation of the first member with respect to the second member is allowed in only a specified direction, and rotation of the first member with respect to the second member in a direction opposite to the specified direction is prevented; and a lock mode in which, regardless of a relative rotational direction of the first member and the second member, rotation of the first member with respect to the second member is prevented; and a control device that, when connecting the friction engaging device and setting the rotation transmission state switching device to the lock mode, has a function of connecting the friction engaging device, and then while maintaining the friction engaging device in a connected state, switches the rotation transmission state switching device to the lock mode.

2. The power transmission path switching device according to claim 1, wherein the control device, in a state in which the friction engaging device is connected and the rotation transmission state switching device is set to the lock mode, has a function of disconnecting the friction engaging device while maintaining the rotation transmission state switching device in the lock mode.

3. The power transmission path switching device according to claim 2, wherein the control device, in a state in which the friction engaging device is disconnected and the rotation transmission state switching device is set to the lock mode, has a function of preventing the friction engaging device from being switched from a disconnected state to a connected state while the rotation transmission state switching device is maintained in the lock mode.

4. The power transmission path switching device according to claim 1, wherein the rotation transmission state switching device has a one-way clutch mode, and the control device has a function of setting the rotation transmission state switching device to the one-way clutch mode while switching the friction engaging device from a disconnected state to a connected state and/or while switching the friction engaging device from a connected state to a disconnected state.

5. The power transmission path switching device according to claim 1, wherein the control device, in a state in which the friction engaging device is connected and the rotation transmission state switching device is set to the lock mode, has a function of preventing the rotation transmission state switching device from switching from the lock mode to the free mode or the one-way clutch mode while the friction engaging device is connected.

6. The power transmission path switching device according to claim 1, wherein the control device comprises a drive cam supported so as to be able to rotate and so as not to be able to displace in the axial direction, and switches the disconnected/connected state of the friction engaging device and the mode of the rotation transmission state switching device based on rotation of the drive cam.

7. The power transmission path switching device according to claim 6, wherein the control device comprises a cam device having the drive cam, and a driven cam supported so as to be able to rotate and displace in the axial direction relative to the drive cam, the driven cam displacing in the axial direction as the drive cam rotates.

8. The power transmission path switching device according to claim 7, wherein the cam device has a plurality of rolling bodies held between the drive cam and the driven cam.

9. The power transmission path switching device according to claim 8, wherein the rolling bodies are configured by rollers having a rotation axis oriented in a radial direction and supported by the driven cam so as to freely roll about the rotation axis.

10. The power transmission path switching device according to claim 7, wherein the control device, by causing the drive cam to rotate, connects the friction engaging device by causing the driven cam to displace in a direction increasing a gap in the axial direction between the driven cam and the drive cam, and disconnects the friction engaging device by causing the driven cam to displace in a direction reducing the gap in the axial direction between the driven cam and the drive cam.

11. The power transmission path switching device according to claim 10, comprising an elastic member arranged between the driven cam and the friction engaging device and configured to elastically bias the driven cam and the friction engaging device in directions away from each other.

12. The power transmission path switching device according to claim 7, wherein the control device, by causing the drive cam to rotate, connects the friction engaging device by causing the driven cam to displace in a direction reducing a gap in the axial direction between the driven cam and the drive cam, and disconnects the friction engaging device by causing the driven cam to displace in a direction increasing the gap in the axial direction between the driven cam and the drive cam.

13. The power transmission path switching device according to claim 1, wherein one member of the first member and the second member has concave engaging portions at a plurality of locations in a circumferential direction thereof; and the rotation transmission state switching device comprises:

a mode-selection portion having protruding portions at a plurality of locations in the circumferential direction that protrude in a radial direction or the axial direction;

a first pawl member having a first base portion pivotally supported by the other member of the first member and the second member, and a first engaging pawl extending from the first base portion toward one side in the circumferential direction;

a second pawl member having a second base portion pivotally supported by the other member of the first member and the second member, and a second engaging pawl extending from the second base portion toward the other side in the circumferential direction;

a first pawl biasing member configured to elastically bias the first engaging pawl in a direction engaging with the concave engaging portion; and a second pawl biasing member configured to elastically bias the second engaging pawl in a direction engaging with the concave engaging portion.

14. The power transmission path switching device according to claim 13, wherein the control device comprises a drive cam supported so as to be able to rotate and so as not to be able to displace in the axial direction, and switches the disconnected/ connected state of the friction engaging device and the mode of the rotation transmission state switching device based on rotation of the drive cam; and the mode-selection portion rotates or displaces in the axial direction as the drive cam rotates.

15. The power transmission path switching device according to claim 14, wherein the rotation transmission state switching device comprises a selection plate having the mode-selection portion.

16. The power transmission path switching device according to claim 1, wherein the friction engaging device comprises a return spring configured to elastically bias the friction plate and the separation plate in directions away from each other.

17. A two-stage transmission, comprising:

an input member;

an output member coaxially arranged with the input member;

a planetary gear mechanism arranged between the input member and the output member in a direction of power transmission; and a power transmission path switching device configured to switch a power transmission path between the input member and the output member; wherein the power transmission path switching device is the power transmission path switching device according to claim 1;

the planetary gear mechanism comprises:

a sun gear connected to the input member so as to integrally rotate with the input member;

a ring gear arranged around the sun gear and coaxial with the sun gear;

a carrier coaxially arranged with the sun gear and connected to the output member so as to integrally rotate with the output member; and a plurality of pinion gears configured to engage with the sun gear and the ring gear, and supported by the carrier so as to freely rotate about an own center axis;

one of the friction plate and the separation plate is supported so as to be able to relatively displace in the axial direction but not to be able to relatively rotate with respect to the sun gear or the input member;

the other of the friction plate and the separation plate is supported so as to be able to relatively displace in the axial direction but not to be able to relatively rotate with respect to the carrier or the output member;

one of the first member and the second member is supported so as not to be able to rotate with respect to a portion that does not rotate even during operation; and the other one of the first member and the second member is supported so as not to be able to rotate with respect to the ring gear.

18. The two-stage transmission according to claim 17, wherein the two-stage transmission comprises an electric actuator configured to rotate and drive a drive cam.

\* \* \* \* \*